(12) United States Patent
Kawakami et al.

(10) Patent No.: US 8,154,742 B2
(45) Date of Patent: Apr. 10, 2012

(54) PRINT INTERRUPTION PROCESSING

(75) Inventors: Shuuhei Kawakami, Yokohama (JP); Jin Sunata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1251 days.

(21) Appl. No.: 11/212,672

(22) Filed: Aug. 29, 2005

(65) Prior Publication Data
US 2006/0044593 A1 Mar. 2, 2006

(30) Foreign Application Priority Data

Aug. 31, 2004 (JP) .................................. 2004-252334
May 30, 2005 (JP) .................................. 2005-156884

(51) Int. Cl.
G06F 15/00 (2006.01)
G06F 3/12 (2006.01)
G06K 15/00 (2006.01)

(52) U.S. Cl. .......................... 358/1.15; 350/1.9; 350/1.14
(58) Field of Classification Search .................... 358/1.9, 358/1.14, 1.15
See application file for complete search history.

(56) References Cited

U.S. PATENT DOCUMENTS

| | | | |
|---|---|---|---|
| 6,809,831 B1 | 10/2004 | Minari | 358/1.15 |
| 7,265,855 B2* | 9/2007 | Patton | 358/1.15 |
| 2002/0018221 A1* | 2/2002 | Senay et al. | 358/1.1 |
| 2002/0147739 A1* | 10/2002 | Clements et al. | 707/500 |
| 2003/0014368 A1* | 1/2003 | Leurig et al. | 705/64 |
| 2003/0081242 A1* | 5/2003 | Simpson et al. | 358/1.15 |
| 2003/0103236 A1* | 6/2003 | Kato | 358/1.15 |
| 2004/0218213 A1 | 11/2004 | Shimizu et al. | 358/1.15 |
| 2004/0239974 A1 | 12/2004 | Uchida et al. | 358/1.14 |
| 2004/0252322 A1* | 12/2004 | Gassho et al. | 358/1.14 |
| 2005/0052679 A1* | 3/2005 | Green et al. | 358/1.14 |
| 2005/0100378 A1 | 5/2005 | Kimura et al. | 400/76 |
| 2005/0286078 A1* | 12/2005 | Maruyama | 358/1.15 |

FOREIGN PATENT DOCUMENTS

| | | |
|---|---|---|
| CN | 1530821 | 9/2004 |
| CN | 1619456 | 5/2005 |
| JP | 4-369166 | 12/1992 |
| JP | 8-286895 | 11/1996 |
| JP | 9-311770 | 12/1997 |
| JP | 2000-035867 | 2/2000 |
| JP | 2004-054355 A | 2/2004 |
| JP | 2004-157992 | 6/2004 |
| JP | 2004-157992 A | 6/2004 |

* cited by examiner

*Primary Examiner* — King Poon
*Assistant Examiner* — Ming Hon
(74) *Attorney, Agent, or Firm* — Fitzpatrick, Cella, Harper & Scinto

(57) ABSTRACT

A printing method in a system which receives a designated document from a print service server and prints the received document by a printer in order to print it from the state upon interruption by a simple operating instruction at the same or different base without re-inputting printed matter information, print setting information, and the like by the user. A print interrupting instruction is inputted from a first print control apparatus. Information indicative of an interrupting print position of the designated document is stored into a print interruption information storing unit of the print service server on the basis of the inputted print interrupting instruction. In accordance with a restarting request from a second print control apparatus, the designated document is obtained from a printed matter information storing unit or the like on the basis of the information indicative of the interrupting print position of the designated document. The printing is restarted by a second printing apparatus which is controlled by the second print control apparatus which can print.

9 Claims, 30 Drawing Sheets

FIG. 5A  PRINTED MATTER INFORMATION

| PRINTED MATTER INFORMATION ID | FILE NAME | THE NUMBER OF PAGES |
|---|---|---|
| 0001 | test_pdf | 30 |

FIG. 5B  PRINT SETTING INFORMATION

| PRINTED SETTING INFORMATION ID | THE NUMBER OF PRINT COPIES | COLOR | SIZE | SHEET KIND | DUPLEX | FINISHING | LAYOUT |
|---|---|---|---|---|---|---|---|
| 0001 | 10 | 1 | A4 | COLOR PAPER | 1 | STAPLE | 2up |
| 0002 | 50 | 0 | A3 | PLAIN PAPER | 0 | NONE | NONE |

FIG. 5C  USER INFORMATION

| USER ID | PASSWORD | NAME | ADDRESS |
|---|---|---|---|
| 0001 | password | TAROH KIYANO | SHIMOMARUKO, OTA-KU, TOKYO |

FIG. 5D  STATE INFORMATION

| STATE INFORMATION ID | THE NUMBER OF PRINT INTERRUPTION COPIES | PRINT INTERRUPTION PAGE NUMBER | PRINT INTERRUPTION TIME/DATE |
|---|---|---|---|
| 0001 | 6 | 25 | 2004/07/01 12:50 |
| 0002 | 2 | 12 | 2004/07/05 15:30 |

FIG. 5E  PRINT INTERRUPTION INFORMATION

| PRINT INTERRUPTION INFORMATION ID | USER ID | PRINTED MATTER INFORMATION ID | PRINTED SETTING INFORMATION ID | STATE INFORMATION ID |
|---|---|---|---|---|
| 0001 | 0001 | 0001 | 0001 | 0001 |
| 0002 | 0001 | 0000 | 0002 | 0002 |

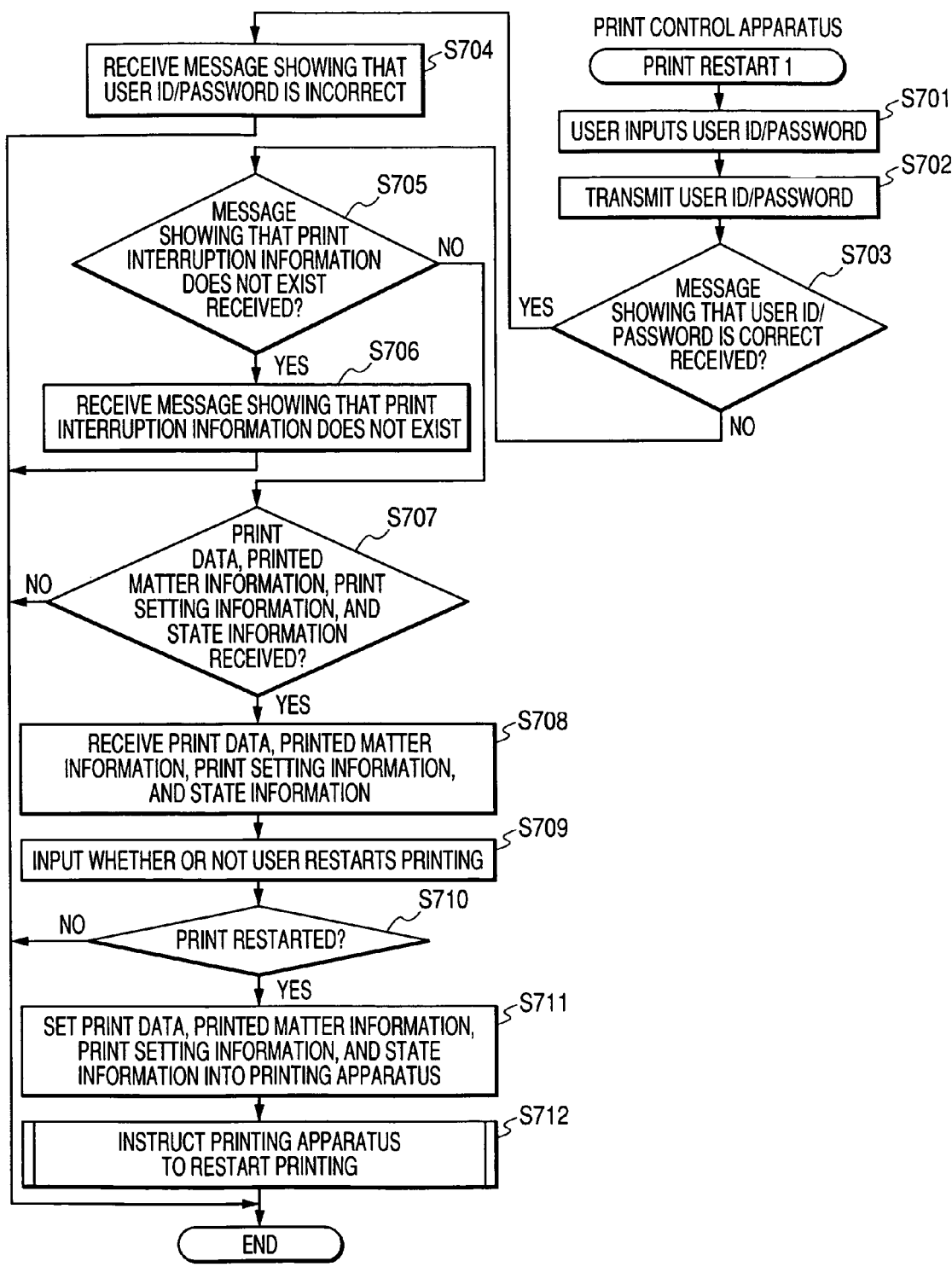

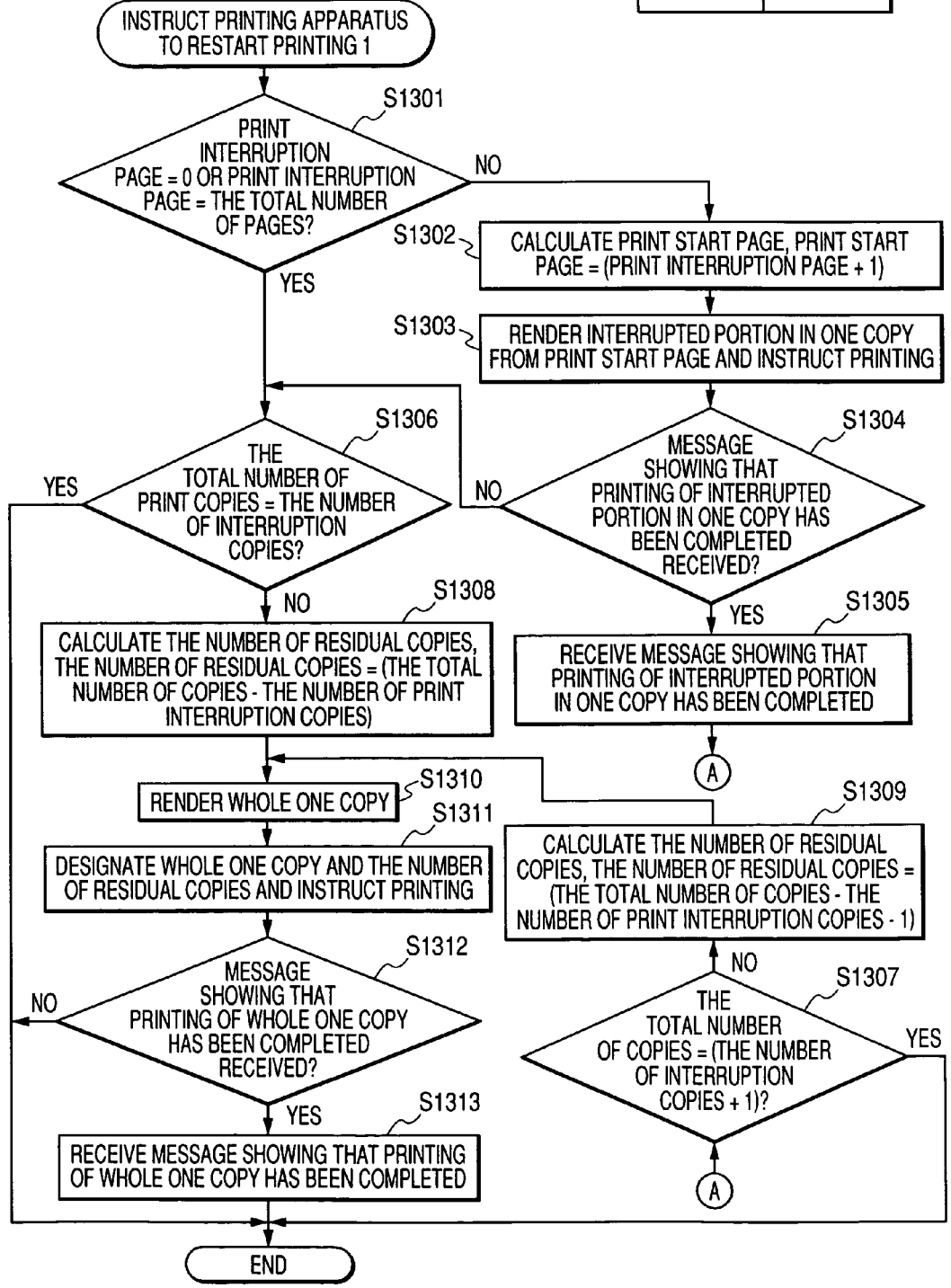

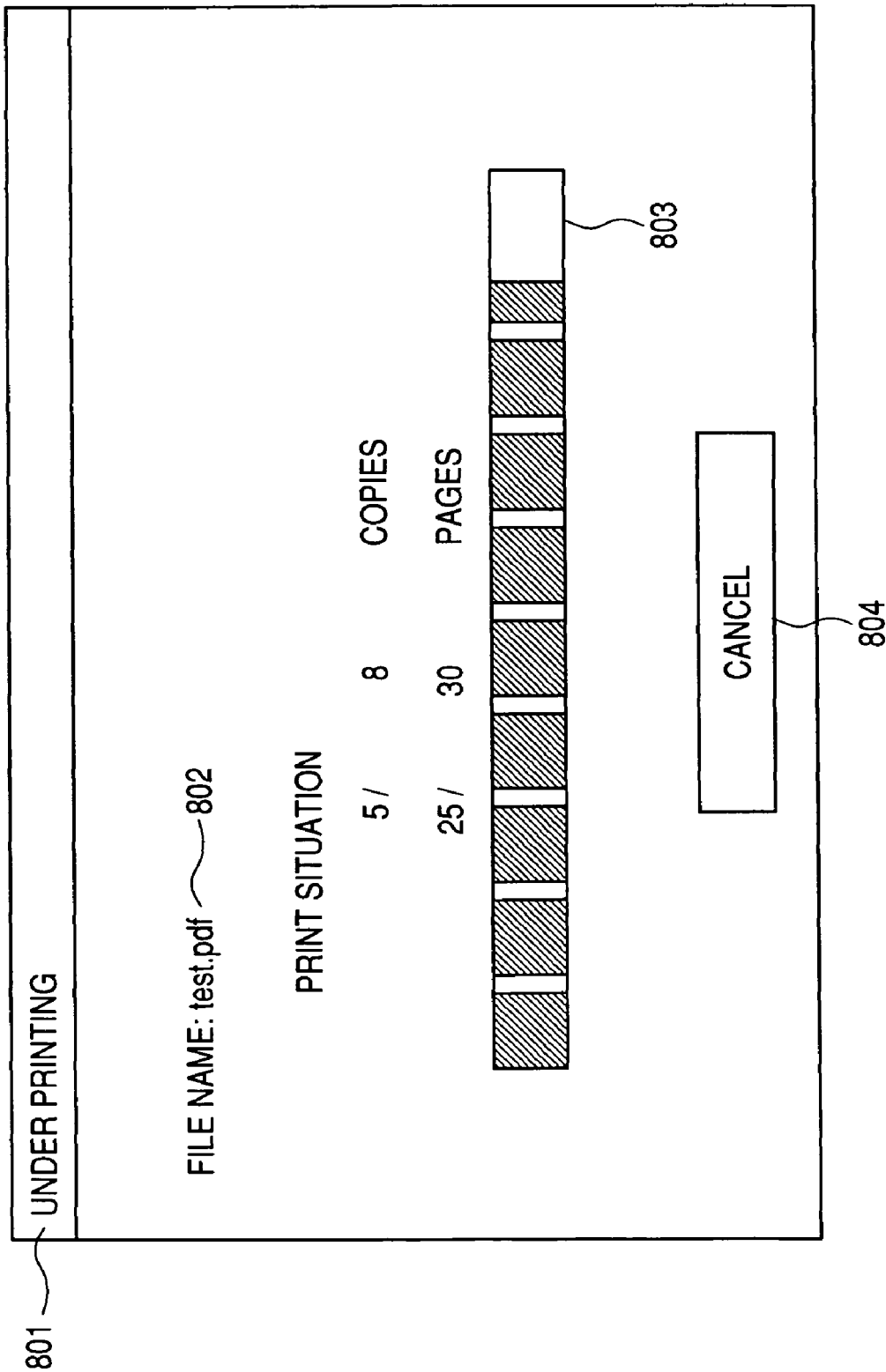

FIG. 27

CONFIRMATION OF UPDATING OF HALFWAY PRINTING ID INFORMATION — 2701

THE INFORMATION OF HALFWAY PRINTING ID HAS BEEN UPDATED AS FOLLOWS.

ID  3 3 3 3 4 4 4 5 5 5

PRINT FROM THE 5TH SHEET
→
PRINT FROM THE 8TH SHEET

FIG. 28

STORING MEDIUM SUCH AS FD/CD-ROM, ETC.

| DIRECTORY INFORMATION |
|---|
| 1ST DATA PROCESSING PROGRAM, PROGRAM CODE GROUP CORRESPONDING TO STEPS OF FLOWCHARTS SHOWN IN FIGS. 6 AND 7 |
| 2ND DATA PROCESSING PROGRAM, PROGRAM CODE GROUP CORRESPONDING TO STEPS OF FLOWCHART SHOWN IN FIG. 8 |
| 3RD DATA PROCESSING PROGRAM, PROGRAM CODE GROUP CORRESPONDING TO STEPS OF FLOWCHART SHOWN IN FIG. 9 |
| 4TH DATA PROCESSING PROGRAM, PROGRAM CODE GROUP CORRESPONDING TO STEPS OF FLOWCHART SHOWN IN FIG. 10 |
| 5TH DATA PROCESSING PROGRAM, PROGRAM CODE GROUP CORRESPONDING TO STEPS OF FLOWCHARTS SHOWN IN FIGS. 15 AND 16 |
| 6TH DATA PROCESSING PROGRAM, PROGRAM CODE GROUP CORRESPONDING TO STEPS OF FLOWCHARTS SHOWN IN FIGS. 17 AND 18 |
| 7TH DATA PROCESSING PROGRAM, PROGRAM CODE GROUP CORRESPONDING TO STEPS OF FLOWCHARTS SHOWN IN FIGS. 19 AND 21 |
| 8TH DATA PROCESSING PROGRAM, PROGRAM CODE GROUP CORRESPONDING TO STEPS OF FLOWCHART SHOWN IN FIG. 24 |
| 9TH DATA PROCESSING PROGRAM, PROGRAM CODE GROUP CORRESPONDING TO STEPS OF FLOWCHARTS SHOWN IN FIGS. 25 AND 26 |

MEMORY MAP IN STORING MEDIUM

PRINT INTERRUPTION PROCESSING

BACKGROUND OF THE INVENTION

1. Field of the Invention

The invention relates to a printing method, a print system, a print control apparatus, and a program, in which a server apparatus and a plurality of print control apparatuses are connected through the Internet so that they can communicate with each other and the server apparatus receives and stores print interruption information from the print control apparatuses.

2. Related Background Art

In recent years, in association with the spread of the Internet, the number of membership print services in which formed documents and recorded images are transmitted to a print service server through the Internet and stored therein and print data stored in the print service server can be obtained and printed by printing apparatuses which are set in a plurality of print bases such as convenience stores, print shops, and the like and connected to the Internet has been increasing.

In an image forming apparatus such as a printing apparatus or the like, there is a technique (for example, Japanese Patent Application Laid-open No. H4-369166) in which image forming conditions for interrupting on the basis of an interrupting request are managed and stored into an external storing apparatus, thereby enabling the interrupted image forming apparatus to be restarted anytime.

There is also a technique (for example, Japanese Patent Application Laid-open No. 2000-35867) in which when printing fails, the printing is restarted by automatically transmitting a print job including a print program and print data to a printing apparatus existing in the same local area network (LAN).

There is also a system (for example, Japanese Patent Application Laid-open No. 2004-157992) in which print targets (data) are managed in a print system connected to the Internet and an ID is unconditionally issued every user or every document.

However, in the print service system as mentioned above, when the user prints the data at the print base, if a fault occurs in the print base or the user cancels the printing and the printing is interrupted, in the case of printing the same data again at the same print base or another print base, it is necessary to re-input all print information such as printed matter information, print setting information, and the like.

By storing the information regarding a state at the time of the interruption into a portable external storing apparatus such as a magnetooptic disk or the like by using the technique disclosed in Japanese Patent Application Laid-open No. H4-369166, the information is read out of the external storing apparatus by the printing apparatus in which the printing is to be restarted (hereinafter, also referred to as print-restarting printing apparatus), and the printing process can be restarted by the printing apparatus.

In this case, however, it is necessary for the user to convey the external storing apparatus in which the information regarding the state at the time of the interruption has been stored to a place where the print-restarting printing apparatus exists.

By automatically transmitting the print job including the print program and the print data from the print base at which the printing has been interrupted (hereinafter, also referred to as print-interrupted print base) to the print base at which the printing is to be restarted (hereinafter, also referred to as print-restarting print base) by using the technique disclosed in Japanese Patent Application Laid-open No. 2000-35867, the printing can be restarted.

In this case, however, it is necessary that the print-interrupted print base and the print-restarting print base exist in the same LAN. In the case where the print service server and the print bases are connected through the Internet and their networks are connected through a router or the like as in the print service system, the print job including the print program and the print data cannot be automatically transmitted.

Further, it is necessary to decide the print-restarting print base at the time of the print interruption. The printing cannot be restarted at the print bases other than the print base at which the print restart has been determined.

Although there is a method of directly designating a print document by using the technique disclosed in Japanese Patent Application Laid-open No. 2004-157992, nothing is considered about the recovery printing in the case where the printing has been once interrupted.

SUMMARY OF THE INVENTION

The invention is made to solve the above problems and it is an object of the invention to provide a printing method in a system which receives a designated document from a server and prints the received document by a printer, wherein an interrupting instruction of the printing is inputted, information showing an interrupting position of the printing in the designated document is transmitted to the server on the basis of the inputted print interrupting instruction, new document information is issued on the basis of the transmitted information showing the print interrupting position of the designated document, and the printing process of the designated document is executed from the middle by using the document information which was newly issued at the next printing time, so that even if a print-restarting print base is not determined upon print interruption, at an arbitrary print base such as same print base, another print base, or the like, the user does not need to re-input printed matter information, print setting information, and the like and execute such operations that the user removes an external storing apparatus and the like attached to a print control apparatus and the like by himself, conveys and attaches them to another print control apparatus, and the like, but he can obtain the document information adapted to the information upon interruption from the server by a simple operating instruction from the print control apparatus and restart the printing from the state upon interruption, and in the case of using the original print information without using the print information issued at the time of the print interruption, the document can be printed from the first page; therefore, when the third party prints the same print document by using the same document information, it is printed from the first page instead of the middle. The object of the invention is to also provide a print system, a print control apparatus, and a program for such a printing method.

A printing method of the invention to accomplish the above object has the following construction.

There is provided a printing method in a system which receives a designated document from a server and prints the received document by a printer, comprising: an input step of inputting an interrupting instruction of the printing; a storing step of storing information indicative of an interrupting position of the printing of the designated document on the basis of the print interrupting instruction inputted in the input step; and an executing step of restarting the printing of the designated document on the basis of the information indicative of the print interrupting position of the designated document stored in the storing step.

There is provided a printing method in a system which receives a designated document from a server and prints the received document by a printer, comprising: an input step of inputting an interrupting instruction of the printing; a storing step of storing information indicative of an interrupting position of the printing of the designated document on the basis of the print interrupting instruction inputted in the input step; a registering step of registering the designated document stored in the storing step as a halfway print document; and an executing step of, when the document registered in the registering step is printed, restarting the printing of the designated document on the basis of the information indicative of the interrupting position.

A print system of the invention to accomplish the above object has the following construction.

There is provided a print system which receives a designated document from a server and prints the received document by a printer, comprising: input means for inputting an interrupting instruction of the printing; storing means for storing information indicative of an interrupting position of the printing of the designated document on the basis of the print interrupting instruction inputted by the input means; and printing means for printing the designated document from the middle on the basis of the information indicative of the print interrupting position of the designated document stored by the storing means.

A printing method of the invention to accomplish the above object has the following construction.

There is provided a printing method in a system which receives a designated document from a server and prints the received document by a printer, comprising: an input step of inputting an interrupting instruction of the printing; a transmitting step of transmitting information indicative of an interrupting position of the printing of the designated document to the server on the basis of the print interrupting instruction inputted in the input step; and an executing step of executing the printing process of the designated document on the basis of the information indicative of the print interrupting position of the designated document transmitted in the transmitting step.

There is provided a printing method in a system which receives a designated document from a server and prints the received document by a printer, comprising: an instructing step of receiving the designated document from the server and instructing print interruption when the received document is being printed; and a step of allowing the document to be printed from the middle of the document whose print interruption has been instructed in the instructing step.

A print control apparatus of the invention to accomplish the above object has the following construction.

There is provided a print control apparatus which receives a designated document from a server and prints the received document, comprising: input means for inputting an interrupting instruction of the printing; transmitting means for transmitting information indicative of an interrupting position of the printing of the designated document to the server on the basis of the print interrupting instruction inputted by the input means; and executing means for executing the printing process of the designated document on the basis of the information indicative of the print interrupting position of the designated document transmitted by the transmitting means.

A print system of the invention to accomplish the above object has the following construction.

There is provided a print system in which one of a plurality of print control apparatuses receives a designated document stored in storing means from a server and the received document is printed by a printer which is controlled by such one print control apparatus. The server has document managing means for receiving an interrupting instruction of the document, registering interruption information of the interrupted document into the storing means, receiving a restart requesting instruction of the interrupted document, reading out the print-restarting document from the storing means on the basis of the interruption information, and transferring it to the print control apparatus of a restart requesting source side. And, one of the plurality of print control apparatuses has input means for inputting the print interrupting instruction, transfer means for transferring interruption information showing an interrupting position of the printing in the designated document to the server on the basis of the print interrupting instruction inputted by the input means, restart requesting means for inputting a restarting request for the interruption-instructed document, obtaining means for obtaining print information, from the document managing means, for printing the interrupted document from the middle on the basis of the interruption information showing the print interrupting position of the document whose print-restart has been requested by the restart requesting means and which has been stored by the storing means, and print control means for allowing the printer to print the print information obtained by the obtaining means.

There is provided a print system which receives a designated document from a server and prints the received document by a printer, comprising: instructing means for receiving the designated document from the server and instructing print interruption when the received document is being printed; and means for allowing the document to be printed from the middle of the document whose print interruption has been instructed by the instructing means.

BRIEF DESCRIPTION OF THE DRAWINGS

FIGS. 5A, 5B, 5C, 5D and 5E are diagrams for explaining data structures of a printed matter information storing unit, a print setting information storing unit, a user information storing unit, a state information storing unit, and a print interruption information storing unit stored in an HDD shown in FIG. 2;

FIG. 11 is a diagram showing an example of an under-printing display screen which is displayed on a display unit of the first print control apparatus shown in FIG. 1;

FIG. 27 is a diagram showing an example of a confirming display screen of updating of halfway printing ID information which is displayed on the display unit of the first print control apparatus shown in FIG. 1; and FIG. 28 is a diagram for explaining a memory map of a storing medium for storing various data processing programs which can be read by the print system including the print control apparatuses and the print service server according to the invention.

DETAILED DESCRIPTION OF THE PREFERRED EMBODIMENTS

The best modes for embodying the invention will now be described with reference to the drawings.

<Whole Constructional Diagram of a Print Service System>

First, a construction of a print service system will be described with reference to FIG. 1.

First Embodiment

Figure 1:
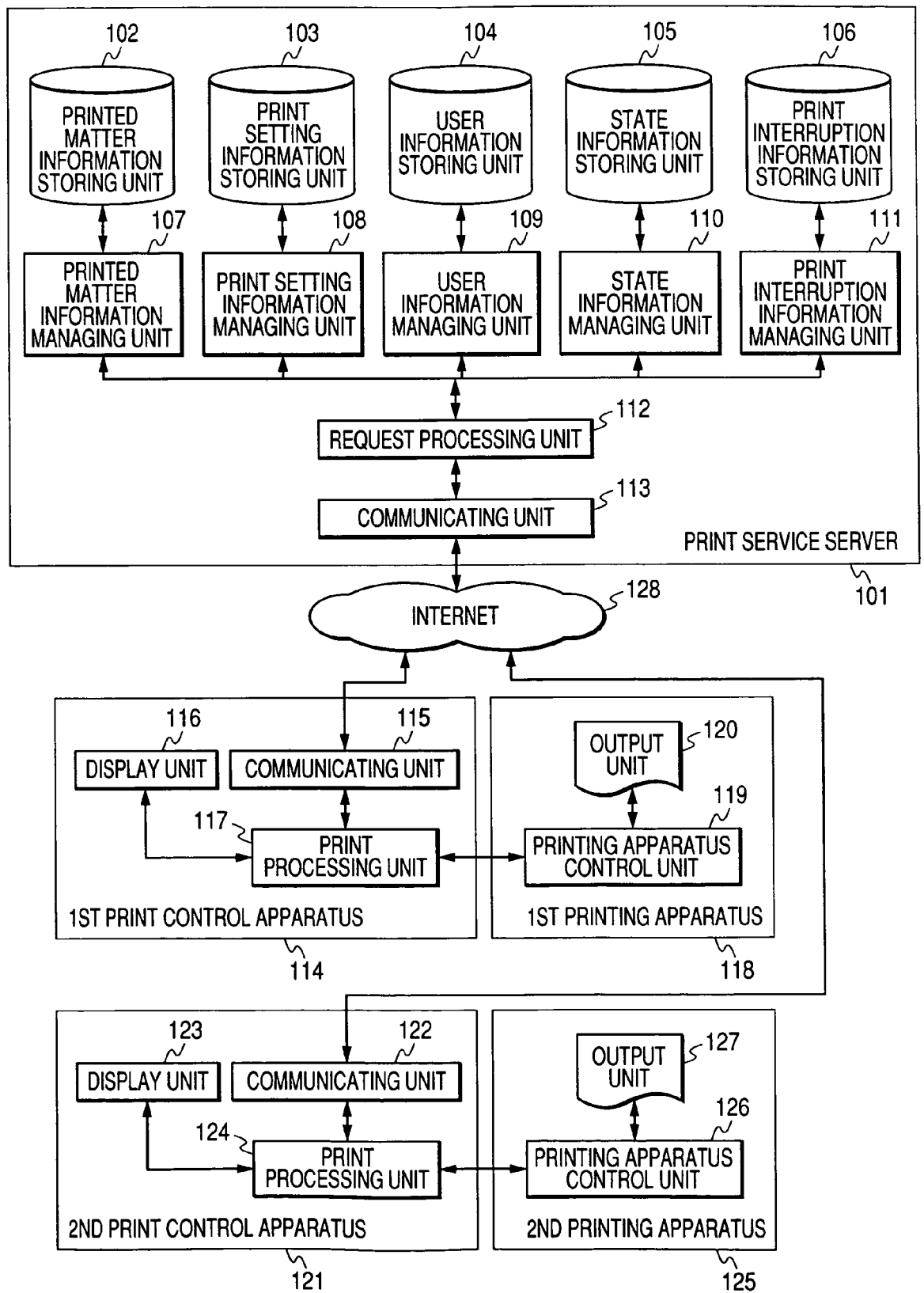
FIG. 1 is a block diagram showing a construction of a print system including print control apparatuses and a print service server according to the first embodiment of the invention.

FIG. 1 is a block diagram showing a construction of a print system including print control apparatuses and a print server according to the first embodiment of the invention.

As shown in FIG. 1, the print service system is constructed by: a print service server 101 which provides print services; a first print control apparatus 114 and a second print control apparatus 121 each for receiving services which are provided by the print service server 101 through an Internet 128; a first printing apparatus 118 connected to the first print control apparatus 114 by an external input/output (I/O) control apparatus (10C) 314 (shown in FIG. 3), which will be explained hereinafter; and a second printing apparatus 125 connected to the second print control apparatus 121 by the external input/output (I/O) control apparatus (10C) 314 (shown in FIG. 3), which will be explained hereinafter.

Although only the two print control apparatuses are shown in FIG. 1, actually, three or more print control apparatuses can be connected to the print service server through the Internet 128 in order to receive the print services.

Although the first print control apparatus 114 and the second print control apparatus 121 are independently shown in FIG. 1, those print control apparatuses can be replaced by the same print control apparatus. In this case, the first printing apparatus 118 and the second printing apparatus 125 are the same printing apparatus.

The print service server 101 has a printed matter information storing unit 102, a print setting information storing unit 103, a user information storing unit 104, a state information storing unit 105, a print interruption information storing unit 106, a printed matter information managing unit 107, a print setting information managing unit 108, a user information managing unit 109, a state information managing unit 110, a print interruption information managing unit 111, a request processing unit 112, and a communicating unit 113.

The printed matter information storing unit 102 is provided in an HDD 213 (shown in FIG. 2), which will be explained hereinafter, and has a function of storing printed matter information (document information, etc.) which has been set, for example, at the time of print interruption in the first print control apparatus 114, for example, a file name, the number of pages, and the like. The printed matter information managing unit 107 has functions of managing the printed matter information received from the request processing unit 112, storing them into the printed matter information storing unit 102, and reading out the printed matter information stored in the printed matter information storing unit 102.

In the embodiment, it is assumed that the document information includes an electronic document according to a predetermined form, PDL data according to a predetermined page description language, rendered image data (also including the case where it has been compressed), XML data, and the like.

The print setting information storing unit 103 is provided in the HDD 213 (shown in FIG. 2), which will be explained hereinafter, and has a function of storing the print setting information which has been set, for example, at the time of the print interruption in the first print control apparatus 114, for example, the number of print copies, a color mode, a sheet size, a sheet kind, a duplex printing mode, a finishing method, and the like. The print setting information managing unit 108 has functions of managing the print setting information received from the request processing unit 112, storing it into the print setting information storing unit 103, and reading out the print setting information stored in the print setting information storing unit 103.

The user information storing unit 104 is provided in the HDD 213 (shown in FIG. 2), which will be explained hereinafter, and has a function of storing user information of the print service, for example, a user ID, a password, and the like. The user information managing unit 109 has a function of reading out the user information corresponding to the user ID from the user information storing unit 104 by using the user ID of the user information received from the request processing unit 112.

The state information storing unit 105 is provided in the HDD 213 (shown in FIG. 2), which will be explained hereinafter, and has a function of storing the state information of the first printing apparatus 118 at the time of the print interruption in the first print control apparatus 114, for example, the number of print interruption copies, a print interruption page number, print interruption time/date, and the like. The state information managing unit 110 has functions of managing the state information received from the request processing unit 112, storing it into the state information storing unit 105, and reading out the state information stored in the state information storing unit 105.

The print interruption information storing unit 106 is provided in the HDD 213 (shown in FIG. 2), which will be explained hereinafter, and has a function of, for example, storing management information corresponding to the print interruption information at the time of the print interruption in the first print control apparatus 114.

The management information corresponding to the print interruption information includes a printed matter ID, a print setting information ID, a user ID, a state information ID, and the like.

The print interruption information managing unit 111 has functions of storing the print interruption information received from the request processing unit 112 into the print interruption information storing unit 106, and reading out the print interruption information stored in the print interruption information storing unit 106.

The request processing unit 112 has a function of executing processes corresponding to a print interrupting request issued from the first print control apparatus 114 through the communicating unit 113 and a user information authenticating request and a print restarting request issued from the second print control apparatus 121 through the communicating unit 113.

In response to a storing request of the print interruption information from the first print control apparatus 114, the printed matter information managing unit 107 is requested to store the printed matter information, the print setting information managing unit 108 is requested to store the print setting information, and the state information managing unit 110 is requested to store the state information. The print interruption information managing unit 111 is requested to store the printed matter information ID received from the printed matter information managing unit 107, the print setting information ID received from the print setting information managing unit 108, and the state information ID received from the state information managing unit 110 into the print interruption information storing unit 106. A message showing that the print interruption information has been stored is transmitted to the first print control apparatus 114 of the interruption requesting source side through the communicating unit 113.

In response to a user information authenticating request from the second print control apparatus 121, the user information is transmitted to the user information managing unit 109 and the unit 109 is requested to authenticate. An authentication result is transmitted to the second print control apparatus 121 through the communicating unit 113.

Further, for example, in response to a print restarting request from the second print control apparatus 121 (in the case where a fault occurs in the first print control apparatus 114 and the restarting request is made from the second print control apparatus 121), user information which is inputted by a panel operation, which will be explained hereinafter, is transmitted to the print interruption information managing unit 111 and the unit 111 is requested to read out the print interruption information.

From the print interruption information read out of the print interruption information storing unit 106, the printed matter information ID is transmitted to the printed matter information managing unit 107. The unit 107 is requested to read out the relevant printed matter information. The print setting information ID is transmitted to the print setting information managing unit 108. The unit 108 is requested to read out the relevant print setting information. The state information ID is transmitted to the state information managing unit 110. The unit 110 is requested to read out the relevant state information. The printed matter information, print setting information, and state information are transmitted to the second print control apparatus 121 through the communicating unit 113.

The communicating unit 113 receives, for example, the print interruption information transmitted from a communicating unit 115 in the first print control apparatus 114, transmits the received print interruption information to the request processing unit 112, and transmits a result to the communicating unit 115.

The communicating unit 113 receives, for example, the user information transmitted from a communicating unit 122 in the second print control apparatus 121, transmits the received user information to the request processing unit 112, receives the print interruption information transmitted from the request processing unit 112, and transmits it to the communicating unit 122.

The first print control apparatus 114 has the communicating unit 115, a display unit 116, and a print processing unit 117. The communicating unit 115 has functions of receiving the print interruption information transmitted from the print processing unit 117 and transmitting it as a print interruption information storing request to the communicating unit 113. The communicating unit 115 also has a function of receiving a result of the print interruption information storing request transmitted from the communicating unit 113.

The print processing unit 117 has such functions that when it is detected that the print interrupting request has been issued by a panel operating instruction of the user in a print interruption instructing display screen (shown in FIG. 12) which has been displayed by the display unit 116 and will be explained hereinafter, the unit 117 requests a printing apparatus control unit 119 to obtain the state information such as the number of copies which are at present being printed, page number, and the like and the received state information and the printed matter information, print setting information, and user information are together transmitted as print interruption information to the communicating unit 115.

The display unit 116 has a function of displaying an under-printing display screen (shown in FIG. 11), which will be explained hereinafter, and the print interruption instructing display screen (shown in FIG. 12), which will be explained hereinafter, onto a CRT 309 (shown in FIG. 3), which will be explained hereinafter. The first printing apparatus 118 has the printing apparatus control unit 119 and an output unit 120.

The printing apparatus control unit 119 has a function of making control of a print outputting process to the output unit 120. The printing apparatus control unit 119 has such a function that, when it is requested by the print processing unit 117 to obtain the state information, the unit 119 requests the output unit 120 to cancel the print outputting process and transmits the state information to the print processing unit 117.

The output unit 120 has a function of executing the print outputting process on the basis of control information from the printing apparatus control unit 119. The output unit 120 also has a function of cancelling the print outputting process in response to a cancelling request of the print outputting process from the printing apparatus control unit 119.

The second print control apparatus 121 has the communicating unit 122, a display unit 123, and a print processing unit 124.

The communicating unit 122 has functions of receiving the user authenticating request transmitted from the print processing unit 117 and transmitting the received user authenticating request to the communicating unit 113. The communicating unit 122 also has a function of receiving the print interruption information transmitted from the communicating unit 113 and transmitting it to the print processing unit 117.

The print processing unit 124 has such a function that when the user information has been inputted by the user in a user authenticating display screen (shown in FIG. 13) which has been displayed by the display unit 123 and will be explained hereinafter, the unit 124 transmits it to the communicating unit 122. The print processing unit 124 also has functions of receiving the print interruption information from the communicating unit 113 which was received by the communicating unit 122 and requesting the display unit 123 to display a print restarting display screen (shown in FIG. 14), which will be explained hereinafter.

The print processing unit 124 also has such functions that, when the user instructs the print restart on the print restarting display screen (shown in FIG. 14), which will be explained hereinafter, on the display unit 123, the unit 124 transmits the print interruption information to the printing apparatus control unit 126 and requests the print restart.

The display unit 123 has a function of allowing the CRT 309 (shown in FIG. 3), which will be explained hereinafter, to display a user authenticating display screen (shown in FIG. 13), which will be explained hereinafter. The display unit 123 also has a function of allowing the CRT 309 (shown in FIG. 3), which will be explained hereinafter, to display a print restarting display screen (shown in FIG. 14), which will be explained hereinafter, in accordance with a request from the print processing unit 124.

The second printing apparatus 125 has the printing apparatus control unit 126 and an output unit 127. The printing apparatus control unit 126 has a function of making control of the print outputting process to the output unit 127. The printing apparatus control unit 126 also has such functions that, when the printing apparatus control unit 126 is requested by the print processing unit 124 to restart the printing, the unit 126 issues a print output restarting request to the output unit 127 in accordance with the state information received from the print processing unit 124 and the print outputting process is restarted. The printing apparatus control unit 126 also has a function of transmitting the state information of the output unit 127 to the print processing unit 124.

The output unit 127 has a function of executing the print outputting process on the basis of control information from the printing apparatus control unit 126. The output unit 127 also has a function of restarting the print output in response to a print output restart processing request from the printing apparatus control unit 126.

<Constructional Diagram of a Print Service Server>

A construction of the print service server 101 will now be described with reference to FIG. 2.

Figure 2:
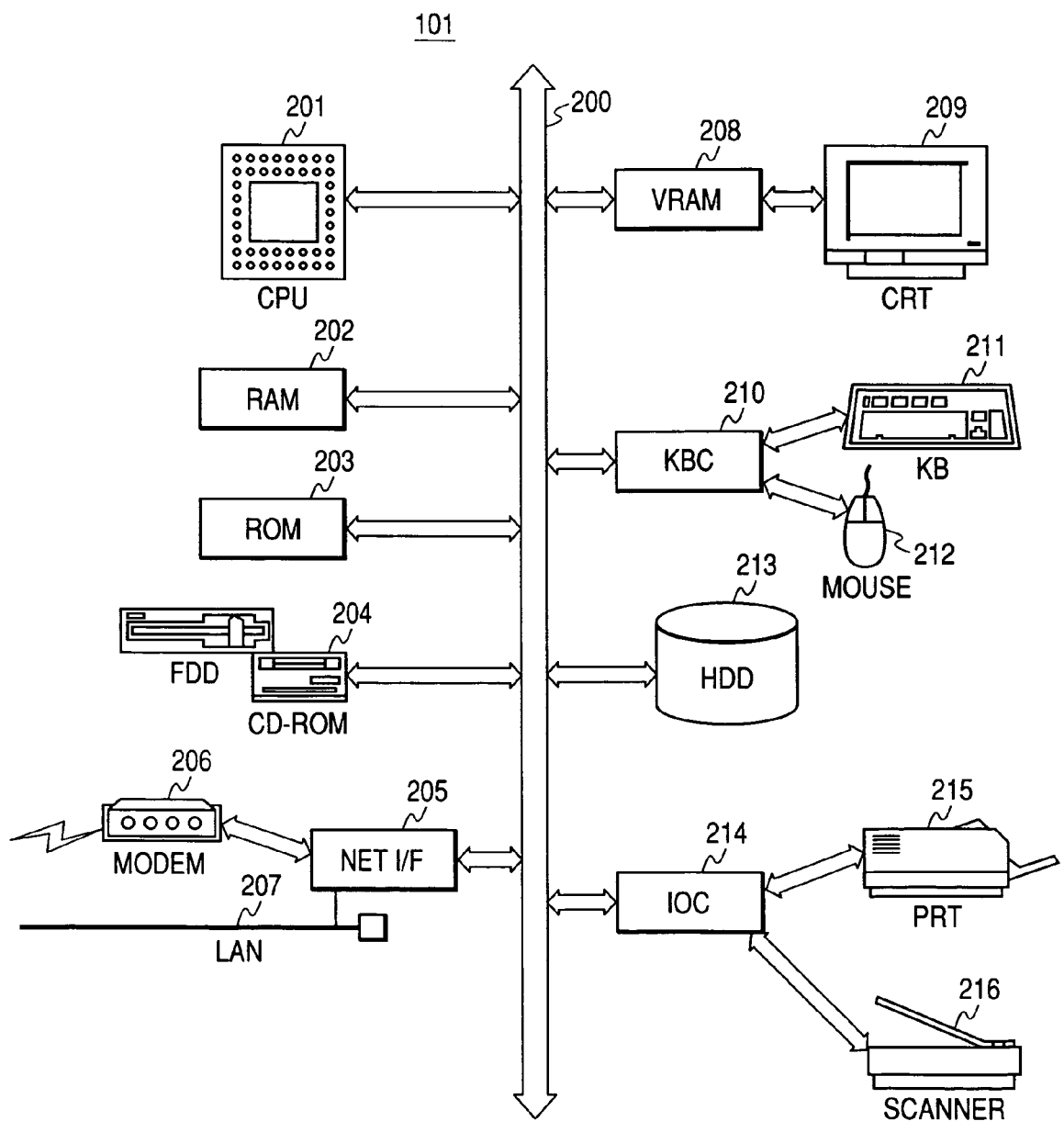
FIG. 2 is a block diagram showing a construction of the print service server shown in FIG. 1.

FIG. 2 is a block diagram showing the construction of the print service server 101 shown in FIG. 1.

As shown in FIG. 2, the print service server 101 has: a CPU 201; a RAM 202; a ROM 203; an external storing medium reading/writing unit 204; an NET I/F 205; a VRAM 208; a KBC 210; the HDD 213; an IOC (input/output controller) 214; and a system bus 200 for connecting those units. The system bus 200 is a transmission path to transmit data and control information among those units.

The CPU 201 is a central processing unit for executing various kinds of control, arithmetic operations, and the like of the print service server 101. The RAM 202 is a random access memory and provides a storing area of an executing program, an executing area of such a program, and a data storing area as a main memory of the CPU 201.

The ROM 203 is a read only memory in which an operation processing procedure of the CPU 201 has been stored. The ROM 203 stores a basic program (generally called BIOS) for controlling each unit in the print service server 101, information necessary for making the system operative, and the like. The external storing medium reading/writing unit 204 is a unit group for executing data input/output of a detachable external storing medium such as flexible disk (FDD), CD-ROM, or the like.

The NET I/F 205 is a network interface for connecting to an external network through a modem 206 or to a LAN (Local Area Network) 207. The NET I/F 205 makes control for a data transfer among other apparatuses including the first print control apparatus 114 and the second print control apparatus 121 through the Internet 128 and diagnoses their connecting states.

The modem 206 comprises a modem for connecting the external network and the print service server 101 through a telephone line, a terminal adapter (TA) for ISDN connection, and the like. The LAN 207 is a network system such as Ethernet (registered trademark) or the like.

In the embodiment, the print service server 101 is connected to the Internet 128 through the modem 206 or through a communicating device such as router, gateway, or the like connected to the LAN 207.

The VRAM 208 is a video RAM for developing image data which is displayed on a CRT 209 and controls its display. A liquid crystal display apparatus or the like can be also used in place of the CRT 209.

The KBC 210 is a controller for controlling input signals from a keyboard 211 and a mouse 212. The HDD 213 is a hard disk drive which is used as a memory to store application programs, various kinds of data, and the like. The application programs used in the embodiment are a software program and the like for executing various kinds of processing means.

The printed matter information storing unit 102, print setting information storing unit 103, user information storing unit 104, state information storing unit 105, and print interruption information storing unit 106 shown in FIG. 1 can be assured in the HDD 213.

The input/output controller (IOC) 214 is used to control a printer 215 and a scanner 216. External input/output apparatuses other than the printer 215 and the scanner 216, for example, an externally connected HDD, an MO drive, and the like can be also connected to the IOC 214.

<Constructional Diagram of a Print Control Apparatus>

The constructions of the first print control apparatus 114 and the second print control apparatus 121 will now be described with reference to FIG. 3.

Figure 3:
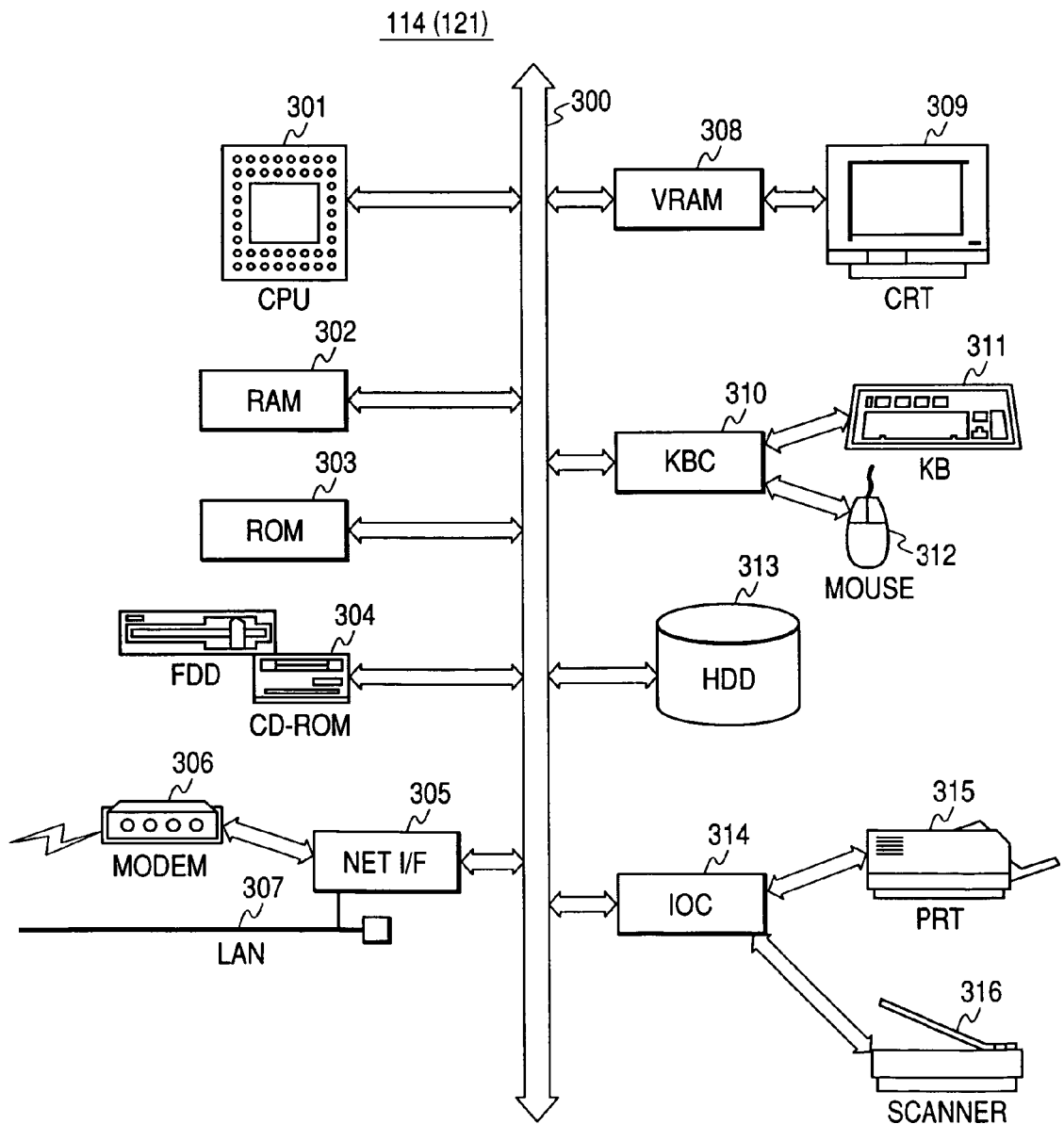
FIG. 3 is a block diagram showing constructions of the first and second print control apparatuses shown in FIG. 1.

FIG. 3 is a block diagram showing the constructions of the first print control apparatus 114 and the second print control apparatus 121 shown in FIG. 1.

As shown in FIG. 3, each of the first print control apparatus 114 and the second print control apparatus 121 has: a CPU 301; a RAM 302; a ROM 303; an external storing medium reading/writing unit 304; an NET I/F 305; a VRAM 308; a KBC 310; the HDD 313; an 10C 314; and a system bus 300 for connecting those units. The system bus 300 is a transmission path to transmit data and control information among those units.

The CPU 301 is a central processing unit for executing various kinds of control, arithmetic operations, and the like of the first print control apparatus 114 and the second print control apparatus 121. The RAM 302 is a random access memory and provides a storing area of an executing program, an executing area of such a program, and a data storing area as a main memory of the CPU 301.

The ROM 303 is a read only memory in which an operation processing procedure of the CPU 301 has been stored. The ROM 303 stores a basic program (generally called BIOS) for controlling each unit in the first print control apparatus 114 and the second print control apparatus 121, information necessary for making the system operative, and the like.

The external storing medium reading/writing unit 304 is a unit group for executing data input/output of a detachable external storing medium such as flexible disk (FDD), CD-ROM, or the like. The NET I/F 305 is a network interface for connecting to an external network through a modem 306 or to a LAN 307. The NET I/F 305 makes control for a data transfer among other apparatuses including the print service server 101 through the Internet 128 and diagnoses their connecting states.

The modem 306 comprises a modem for connecting the external network and the first print control apparatus 114 and the second print control apparatus 121 through the telephone line, the terminal adapter (TA) for ISDN connection, and the like. The LAN 307 is a network system such as Ethernet (registered trademark) or the like. The LAN 307 is arranged such that the first print control apparatus 114 and the second print control apparatus 121 can communicate with the communicating unit 113 of the print service server 101 through the Internet 128 shown in FIG. 1 via a router or the like (not shown). By the communicating function, for example, the print interruption information or the like from the first print control apparatus 114 can be transmitted to the print interruption information managing unit 111 and the print interruption information from the first print control apparatus 114 which has been stored and managed by the print service server 101 can be obtained on the basis of the interruption information obtaining request from the second print control apparatus 121.

In the embodiment, the first print control apparatus 114 and the second print control apparatus 121 are connected to the Internet 128 through the modem 306 or through a communicating device such as router, gateway, or the like connected to the LAN 307.

The VRAM 308 is a video RAM for developing image data which is displayed on the CRT 309 and controls its display. A liquid crystal display apparatus, a touch panel type liquid crystal display apparatus, or the like can be also used in place of the CRT 309. The KBC 310 is a controller for controlling input signals from input devices such as keyboard 311, mouse 312, and the like.

The keyboard 311 and the mouse 312 are the input devices for receiving the input from the user. An input unit of the touch panel type liquid crystal display apparatus can be also used in place of the keyboard 311 and the mouse 312.

The HDD 313 is a hard disk drive which is used as a memory to store application programs, various kinds of data, and the like. The application programs used in the embodiment are a software program and the like for executing various kinds of processing means.

The IOC 314 controls a printer 315 and a scanner 316. External input/output apparatuses other than the printer 315 and the scanner 316, for example, an externally connected HDD, an MO drive, and the like can be also connected to the IOC 314.

In the case of the first print control apparatus 114, the printer 315 denotes the first printing apparatus 118. In the case of the second print control apparatus 121, it denotes the second printing apparatus 125.

<Constructional Diagram of a Printing Apparatus>

The first printing apparatus 118 and the second printing apparatus 125 will now be described with reference to FIG. 4.

Figure 4:
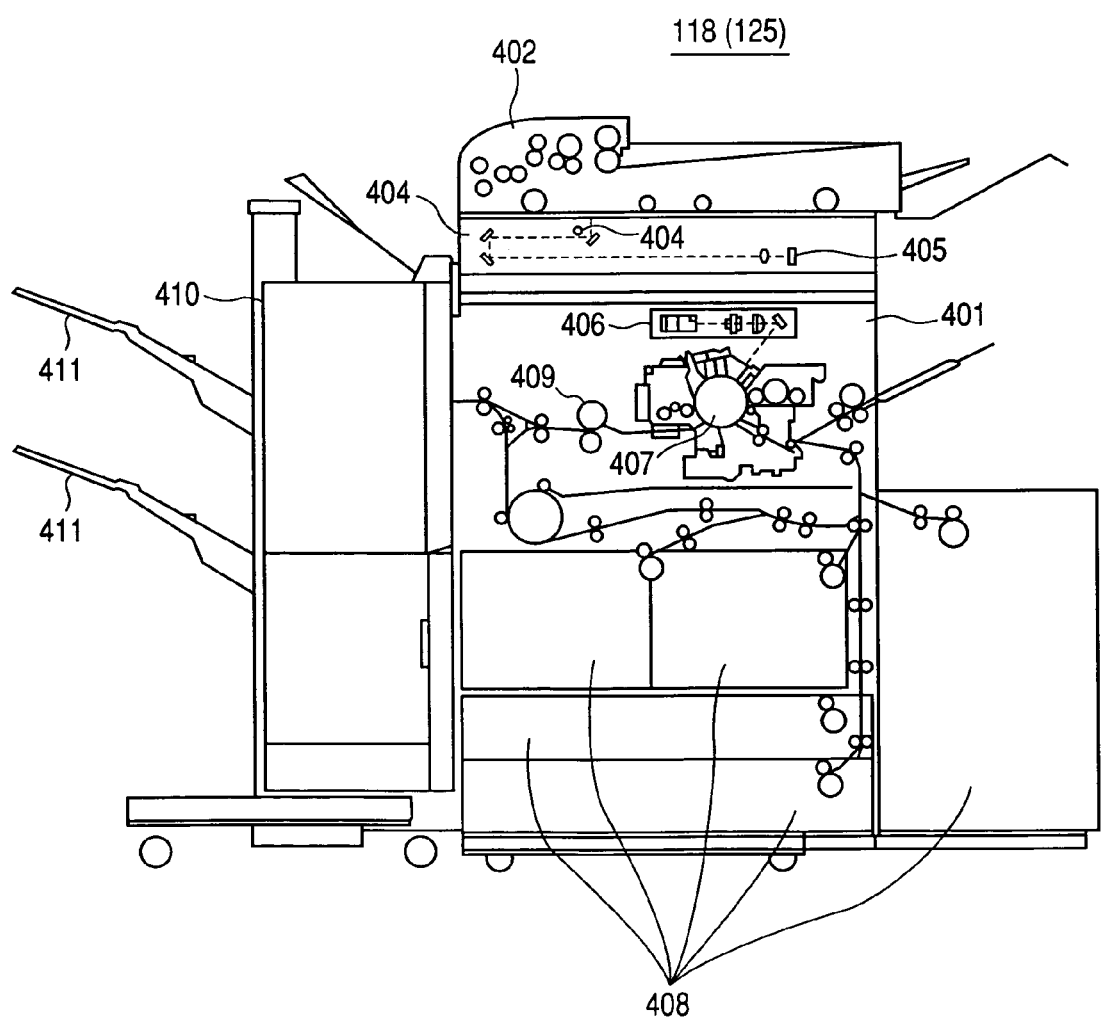
FIG. 4 is a cross sectional view showing the constructions of the first and second print apparatuses shown in FIG. 1.

FIG. 4 is a cross sectional view showing the constructions of the first printing apparatus 118 and the second printing apparatus 125 shown in FIG. 1.

As shown in FIG. 4, each of the first printing apparatus 118 and the second printing apparatus 125 has: a print engine 401; a document feeder (DF) 402; an original reading unit 403; a light source 404; a CCD 405; a laser recording unit 406; a sheet cassette 408; a fixing unit 409; a finisher 410; and paper delivery trays 411.

Each of the first printing apparatus 118 and the second printing apparatus 125 is, for example, a digital hybrid (multifunction) apparatus. The digital hybrid apparatus has functions of a copying apparatus, a printer, and a facsimile apparatus.

The print engine 401 is a print engine for monochromatic print recording. The document feeder (DF) 402, original reading unit 403, light source 404, CCD 405, laser recording unit 406, sheet cassette 408, fixing unit 409, finisher 410, and paper delivery tray 411 are accessories.

When an original is put on the document feeder (DF) 402 in, for example, a face-up state and the user presses a start key arranged on an operation panel, the original is conveyed onto an upper surface of the original reading unit 403. The original is irradiated by the light source 404 and its reflection light is read and converted into a digital signal by the CCD 405. By executing desired image processes to the digital signal, it is converted into a laser recording signal. In the laser recording unit 406, the recording signal is converted into a recording laser beam, the laser beam is irradiated onto a photosensitive body, and a latent image is formed on the photosensitive body.

The latent image is developed by toner. An obtained toner image is transferred to copy transfer paper fed from the sheet cassette 408, the toner is fixed by the fixing unit 409, the paper on which the toner image has been fixed is ejected to the finisher 410.

The finisher 410 executes various operations according to the functions designated by the operator.

Specifically speaking, the finisher 410 has various functions such as stapling and the like. There are two paper delivery trays 411 and can be separately used for every function such as copy, printer, or facsimile in accordance with the setting of the printing apparatus control unit 119 and the printing apparatus control unit 126.

When the print engine 401 is used as a printer, the following functions can be set in accordance with the setting of the printing apparatus control unit 119 and the printing apparatus control unit 126. For example, the print engine 401 has a function of making various settings about monochromatic print/color print, sheet size, duplex, stapling, and start page number.

<Print Interruption Information>

FIGS. 5A to 5E are diagrams for explaining data structures of the printed matter information storing unit 102, print setting information storing unit 103, user information storing unit 104, state information storing unit 105, and print interruption information storing unit 106 stored in the HDD 213 shown in FIG. 2. They are constructed by: a database 501 of the printed matter information (FIG. 5A); a database 502 of the print setting information (FIG. 5B); a database 503 of the user information (FIG. 5C); a database 504 of the state information (FIG. 5D); and a database 505 of the print interruption information (FIG. 5E).

A row of the database 501 of the printed matter information indicates the printed matter information in the print interruption information. A row of the database 502 indicates the print setting information in the print interruption information. A row of the database 503 indicates the user information in the print interruption information. A row of the database 504 indicates the state information in the print interruption information. A row of the database 505 indicates the print interruption information.

Columns of the database 501 indicate data of a printed matter information ID 506, a file name 507, the total number of pages 508 of the printed matter, and the like, respectively. Columns of the database 502 indicate data of a print setting information ID 510, the number of print copies 511, distinction 512 about whether or not the color printing is executed, a print sheet size 513, a kind of print sheet 514, distinction 515 about whether or not the duplex printing is executed, a finishing method 516 after the printing, layout information 509, and the like, respectively.

Columns of the database 503 indicate data of a user ID 517, a password 518, a name 519, an address 520, and the like, respectively. Columns of the database 504 indicate data of a state information ID 521, the number of print interruption copies 522, a print interruption page number 523, a print interruption time/date 524, and the like, respectively. Columns of the database 505 indicate data of a print interruption information ID 525, a user ID 526, a printed matter information ID 527, a print setting information ID 528, and a state information ID 529, and the like, respectively.

In the data of each attribute shown in the distinction 512 about whether or not the color printing is executed and the distinction 515 about whether or not the duplex printing is executed, "1" indicates that the process of the relevant attribute is executed and "0" indicates that the process of the relevant attribute is not executed. The user ID 526, printed matter information ID 527, print setting information ID 528, and state information ID 529 indicate the user ID 517, printed matter information ID 506, print setting information ID 510, and state information ID 521, respectively.

In the embodiment, the data in the databases 501 to 505 are shown as examples and further many databases can be also provided. Other additional information (information such as a file size or the like in the example of the database 501) in each database can be also stored.

Further, in the embodiment, although the records in the databases 501 to 505 have been stored in a database format in the storing apparatus, naturally, those records can be also stored in a file format in the storing apparatus.

<Flowchart at the Time of the Print Interruption>

The print interrupting process by the first print control apparatus 114 will now be described with reference to FIGS. 6 and 7.

Figure 6:
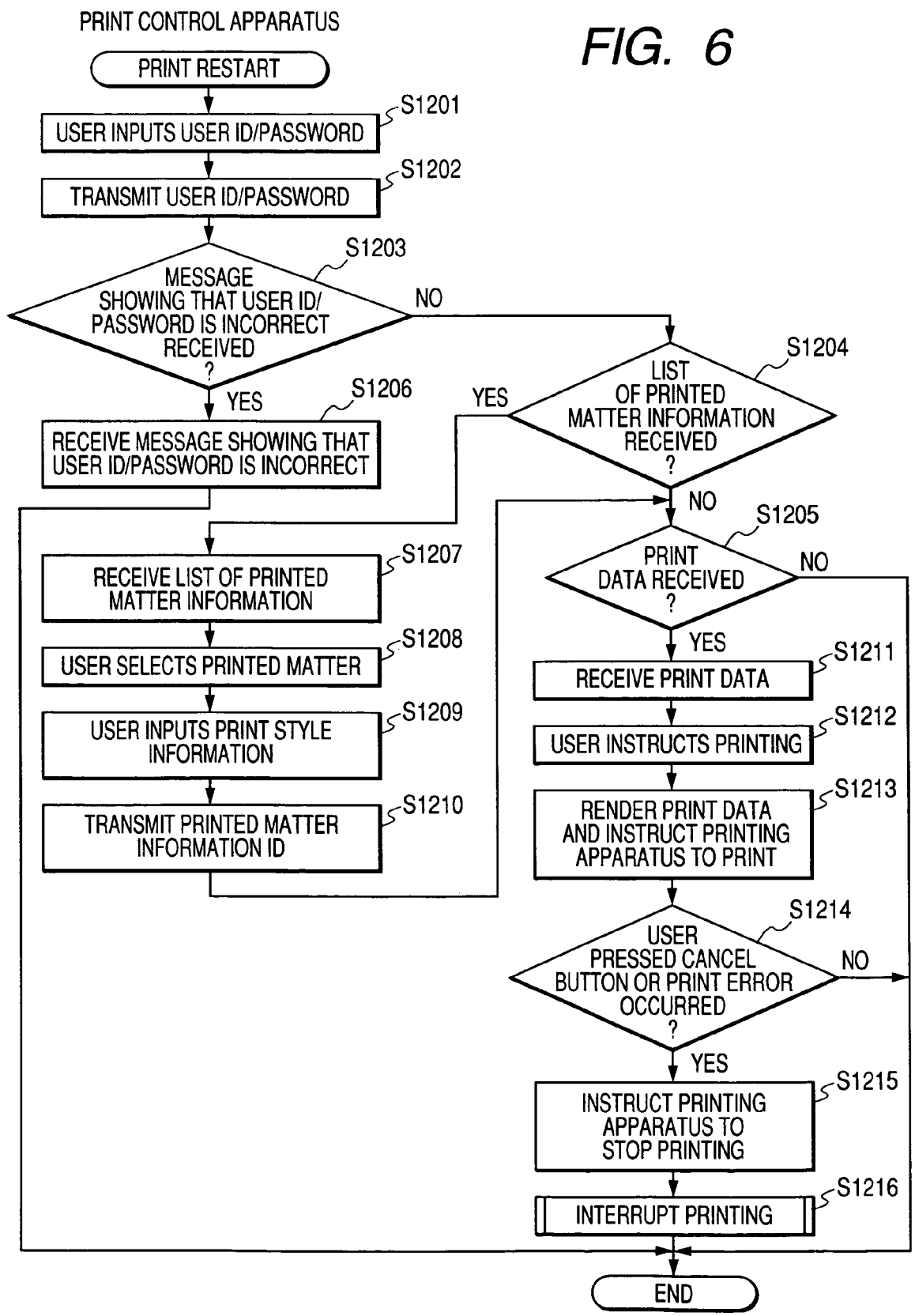
FIG. 6 is a flowchart showing an example of a first data processing procedure in the print control apparatuses and the print service server according to the invention.
Figure 7:
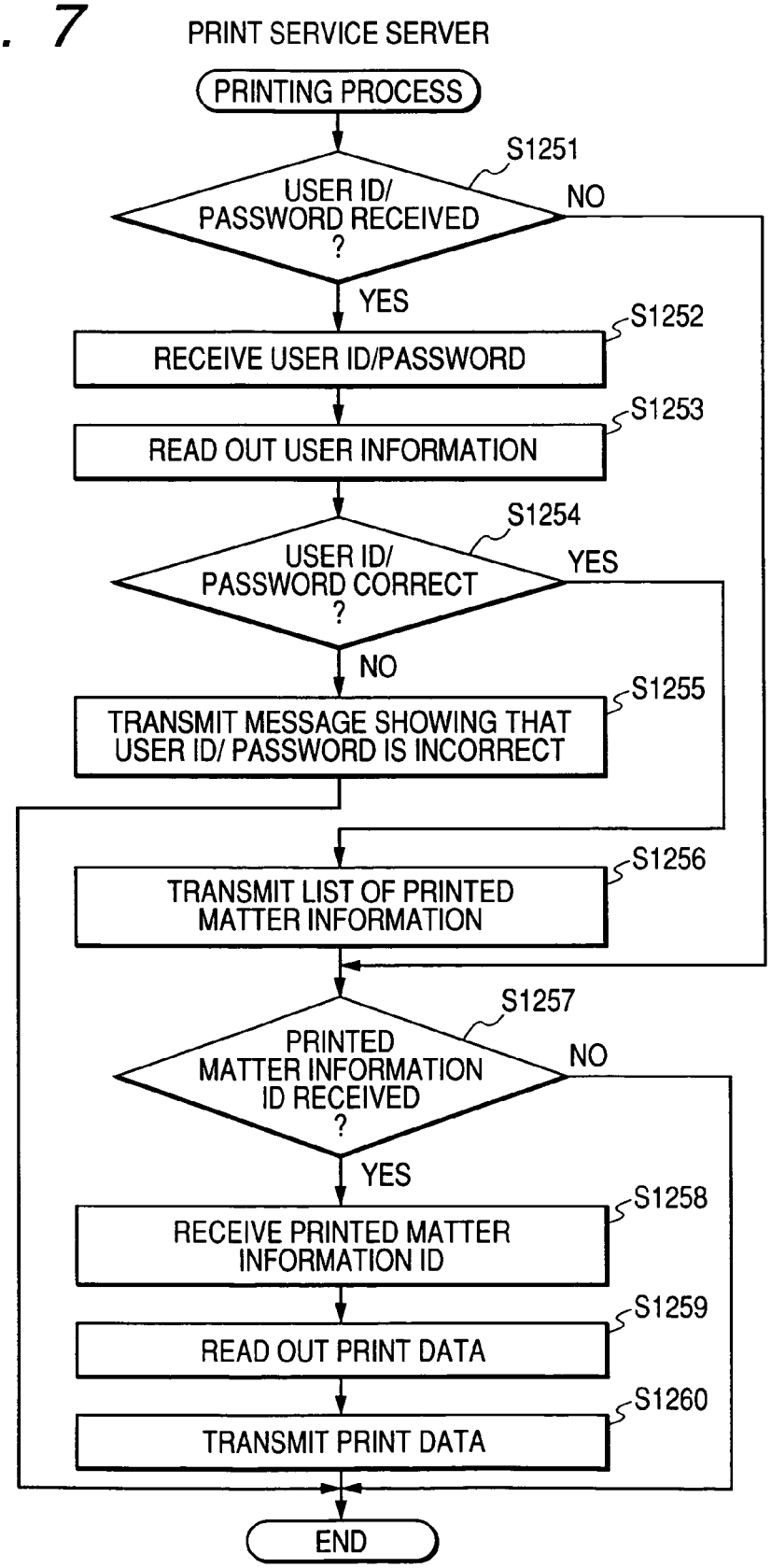
FIG. 7 is a flowchart showing the example of the first data processing procedure in the print control apparatuses and the print service server according to the invention.

FIGS. 6 and 7 are flowcharts showing an example of the first data processing procedure in the print control apparatuses and the print service server according to the invention. FIG. 6 corresponds to the procedure for the printing process by the first print control apparatus 114. FIG. 7 corresponds to the print processing procedure on the print service server 101 side. S1201 to S1216 denote processing steps on the first print control apparatus 114 side. S1251 to S1260 denote processing steps on the print service server 101 side.

In the first print control apparatus 114, first, in step S1201, in a user authenticating display screen 1001 (shown in FIG. 13) which has been displayed on the CRT 309 by the display unit 116 and will be explained hereinafter, the user inputs the user ID into a user ID input box 1002, inputs a password into a password input box 1003, and presses an OK button 1004. When the OK button 1004 is pressed, the print processing unit 117 transmits the user ID/password as user information to the communicating unit 115. The processing routine advances to step S1202'.

In step S1202, the communicating unit 115 transmits the user information to the communicating unit 113 and requests the user authentication. The processing routine advances to step S1203. The communicating unit 113 receives the user information transmitted from the communicating unit 115 in step S1202 and transmits the received user information to the request processing unit 112.

In step S1251, the communicating unit 113 of the print service server 101 discriminates whether or not the user information of the user ID/password has been received from the first print control apparatus 114. If it is determined that the user information is not received, step S1257 follows.

If it is determined in step S1251 that the user information has been received, to make the user authentication of the user information received in step S1202, the request processing unit 112 transmits the user ID of the received user information to the user information managing unit 109 and requests the unit 109 to read out the user information corresponding to the user ID. When the user information managing unit 109 receives the user information from the request processing unit 112 in step S1252, the user information managing unit 109 instructs the user information storing unit 104 to read out the user information corresponding to the received user ID.

The user information managing unit 109 transmits the user information read out by the user information storing unit 104 to the request processing unit 112. In next step S1254, the request processing unit 112 discriminates whether or not the user ID/password of the user information transmitted from the first print control apparatus 114 in step S1202 and the user ID/password of the user information stored in the user information storing unit 104 and received in step S1252 are correct.

If it is determined that the user ID/password of the user information transmitted from the first print control apparatus 114 and the user ID/password of the user information stored in the user information storing unit 104 are correct, step S1256 follows.

If it is determined in step S1254 that the user ID/password of the user information transmitted from the first print control apparatus 114 and the user ID/password of the user information stored in the user information storing unit 104 are different, step S1255 follows.

In step S1255, a message showing that the user information corresponding to the user ID does not exist or a message showing that the user ID/password are incorrect because it differs from the transmitted information is transmitted to the request processing unit 112 and the process is finished.

Assuming that the user ID/password of the user information transmitted from the first print control apparatus 114 and the user ID/password of the user information stored in the user information storing unit 104 are correct in step S1254, and the processing routine advances to step S1256.

In step S1256, if it is determined that the user information corresponding to the user ID exists in the user information storing unit 104, in order to transmit a list of printed matter information stored in the printed matter information storing unit 102 to the communicating unit 115 of the first print control apparatus 114, the request processing unit 112 requests the printed matter information managing unit 107 to read out the list of printed matter information stored in the printed matter information storing unit 102.

In response to such a request, the printed matter information managing unit 107 requests the printed matter information storing unit 102 to read out the list of printed matter information stored in the printed matter information storing unit 102. If the list of printed matter information is read out, the printed matter information managing unit 107 transmits the read-out printed matter information list to the request processing unit 112. When the request processing unit 112 receives the read-out printed matter information list, it transmits the read-out printed matter information list to the communicating unit 115 on the first print control apparatus 114 through the communicating unit 113.

In this manner, the information showing that the user ID/password is incorrect or the printed matter information list is transmitted from the print service server 101 to the first print control apparatus 114.

In response to it, in the first print control apparatus 114, whether or not the information showing that the user ID/password is incorrect has been received from the print service server 101 is discriminated. If it is determined that the information showing that the user ID/password is incorrect is not received, whether or not the printed matter information list has been received from the print service server 101 is discriminated in step S1204. If it is determined that the printed matter information list has been received, step S1207 follows.

If it is determined in step S1203 that the information showing that the user ID/password is incorrect has been received, the communicating unit 115 receives the information which shows that the user ID/password inputted by the user is incorrect and which has been transmitted by the communicating unit 113. The communicating unit 115 transmits the received information showing that the user ID/password inputted by the user is incorrect to the print processing unit 117, and the process is finished.

If it is determined in step S1204 that the printed matter information list has been received from the print service server 101, in step S1207, the print processing unit 117 receives the printed matter information list transmitted from the request processing unit 112 through the communicating unit 115 of the first print control apparatus through the communicating unit 113. When the communicating unit 115 receives the printed matter information list, it transmits the printed matter information list to the print processing unit 117. The print processing unit 117 receives the printed matter information list and transmits it to the display unit 116. The display unit 116 allows the CRT 309 to display it.

In step S1208, the user selects a print matter to be printed on a printed matter selecting display screen. When the print matter is selected, the selected printed matter information is transmitted to the print processing unit 117. In step S1209, the print processing unit 117 requests the display unit 116 to input print style information. The user sets a print style in a print style setting display screen displayed on the CRT 309 by the display unit 116.

When the print style is set, the set print style information is transmitted to the print processing unit 117. In step S1210, the print processing unit 117 transmits the user-selected printed matter information ID to the communicating unit 115. The communicating unit 115 transmits the printed matter information ID to the communicating unit 113 of the print service server 101.

In step S1257, the communicating unit 113 of the print service server 101 discriminates whether or not the printed matter information ID has been received from the first print control apparatus 114. If it is decided that the printed matter information ID is not received, the process is finished.

If it is decided in step S1257 that the printed matter information ID has been received from the communicating unit 115 of the first print control apparatus 114, in step S1258, the communicating unit 113 transmits the received printed matter information ID to the request processing unit 112.

The request processing unit 112 transmits the received printed matter information ID to the printed matter information managing unit 107 and requests the unit 107 to read out the printed matter information corresponding to the printed matter information ID stored in the printed matter information storing unit 102. The printed matter information managing unit 107 transmits the received printed matter information ID to the printed matter information storing unit 102 and requests the unit 102 to read out the printed matter information corresponding to the printed matter information ID.

In step S1259, the printed matter information storing unit 102 reads out the printed matter information corresponding to the printed matter information ID received in step S1213 and transmits it to the printed matter information managing unit 107. The printed matter information managing unit 107 transmits the received printed matter information to the request processing unit 112. In step S1260, the request processing unit 112 reads out the print data corresponding to the received printed matter information from the HDD 213 shown in FIG. 2. In step S1214, the request processing unit 112 transmits the printed matter information corresponding to the printed matter information ID and the print data received by the request processing unit 112 in step S1258 to the communicating unit 115 of the first print control apparatus 114 through the communicating unit 113 and the process is finished.

In the first print control apparatus 114, if it is determined in step S1204 that the printed matter information list is not received or after step S1210, the processing routine advances to step S1205. Whether or not the print data has been received from the print service server 101 is discriminated. If it is determined that the print data is not received, the process is finished.

If it is determined in step S1205 that the print data has been received, in step S1211, the communicating unit 115 receives the printed matter information and the print data transmitted by the request processing unit 112 of the print service server 101 and transmits the received printed matter information and print data to the print processing unit 117. The processing routine advances to step S1212.

In step S1212, the print processing unit 117 requests the display unit 116 to display a print instructing display screen. The user instructs the printing in the print instructing display screen displayed on the CRT 309 by the display unit 116 which received the request.

In step S1213, the print processing unit 117 executes a rendering process from the printed matter information and the print data received in step S1211. After the rendering process is finished, the print processing unit 117 transmits rendering data to the printing apparatus control unit 119 of the first printing apparatus 118 and requests the unit 119 to print.

The printing apparatus control unit 119 which received the request instructs the output unit 120 to print the rendering data. The output unit 120 which received the printing instruction starts the printing of the received rendering data.

In step S1214, whether or not the user has instructed the cancellation of the printing or whether or not an abnormality has occurred and a print error has occurred in the first printing apparatus 118 in an under-printing display screen displayed on the CRT 309 by the display unit 116 in the middle of the printing process in the output unit 120 is discriminated.

If it is determined that the user has instructed the cancellation or if it is decided that the print error has occurred in the first printing apparatus 118, the processing routine advances to step S1215.

If the user does not instruct the cancellation or if it is decided that the print error does not occur in the first printing apparatus 118, the process is finished.

It is now assumed that the user has instructed the cancellation or the print error has occurred in the first printing apparatus 118, the processing routine advances to step S1215.

Since the user has instructed the cancellation or the print error has occurred in the first printing apparatus 118 in step S1214, the printing apparatus control unit 119 of the first printing apparatus 118 is requested to stop the printing process in step S1215. The printing apparatus control unit 119 which received the request instructs the output unit 120 to stop the printing process which is at present being processed and the processing routine advances to step S1216.

In step S1216, the print processing unit 117 executes the print interrupting process and stores the print interruption information into the print interruption information storing unit 106 of the print service server 101. Step S1216 is a subroutine and the process in step S1216 will be described in detail in FIG. 8.

In the embodiment, the request processing unit 112 transmits the printed matter information list in step S1256, the print processing unit 117 receives the printed matter information list in step S1207, and the user selects a print matter to be printed from the printed matter information list in step S1208. However, those processes are shown as an example. It is also possible that steps S1256 and S1207 are omitted and the user directly inputs the printed matter information ID in step S1208.

Figure 8:
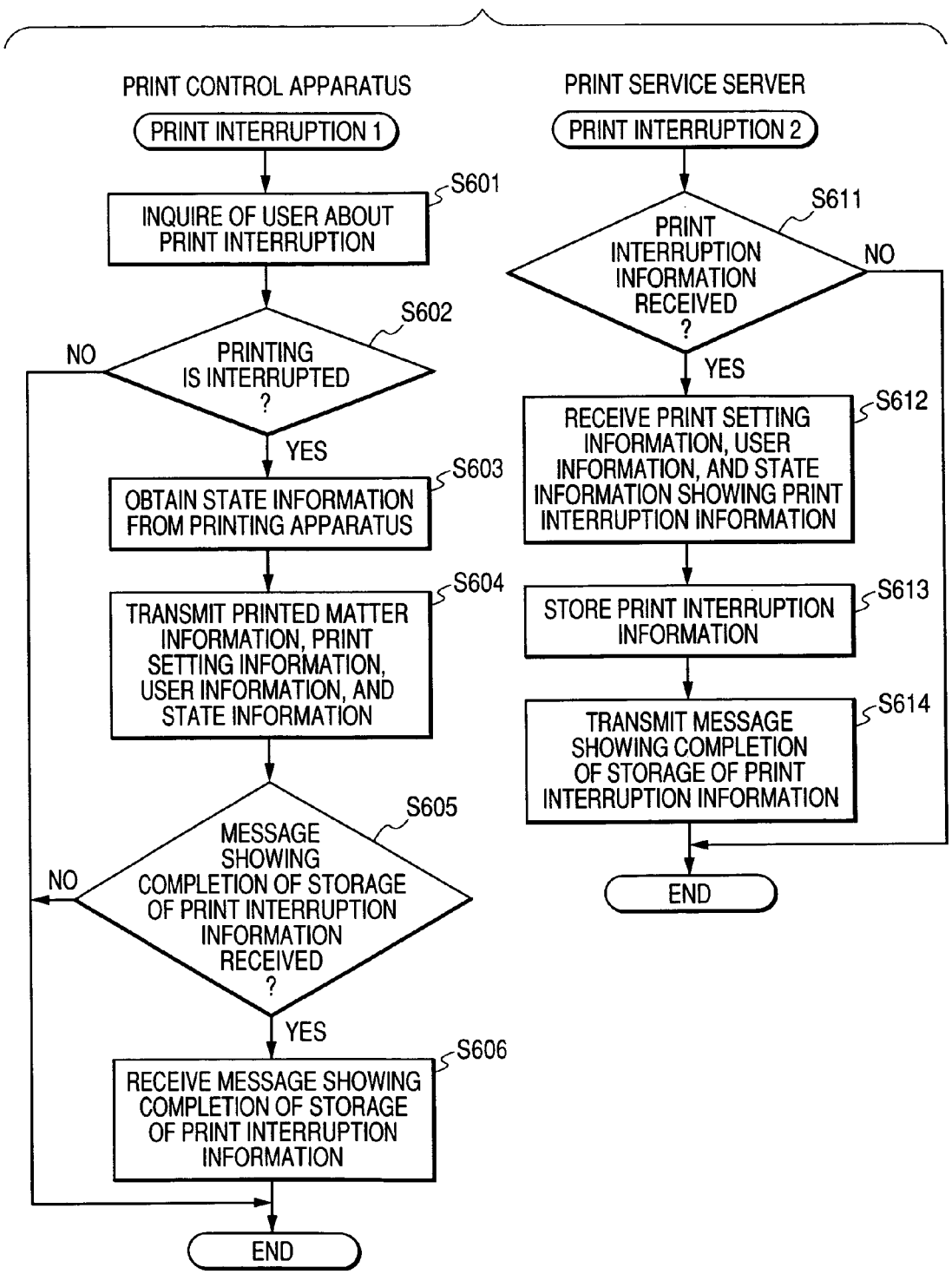
FIG. 8 is a flowchart showing an example of the second data processing procedure in the print control apparatuses and the print service server according to the invention.

FIG. 8 is a flowchart showing an example of the second data processing procedure in the print control apparatuses and the print service server according to the invention and corresponds to the detailed procedure of the print interrupting process (print interrupting process by the first print control apparatus 114 and the print service server 101 shown in FIG. 1) routine of step S1216 shown in FIG. 6.

S601 to S606 and S611 to S614 denote processing steps. Processing steps S601 to S606 are realized by a method whereby the CPU 301 shown in FIG. 3 loads the control programs stored in the ROM 303, the hard disk 313, or the like into the RAM 302 and executes them.

Processing steps S611 to S614 are realized by a method whereby the CPU 201 of the print service server 101 loads the control programs stored in the ROM 203, HDD 213, or the like into the RAM 202 and executes them.

Figure 12:
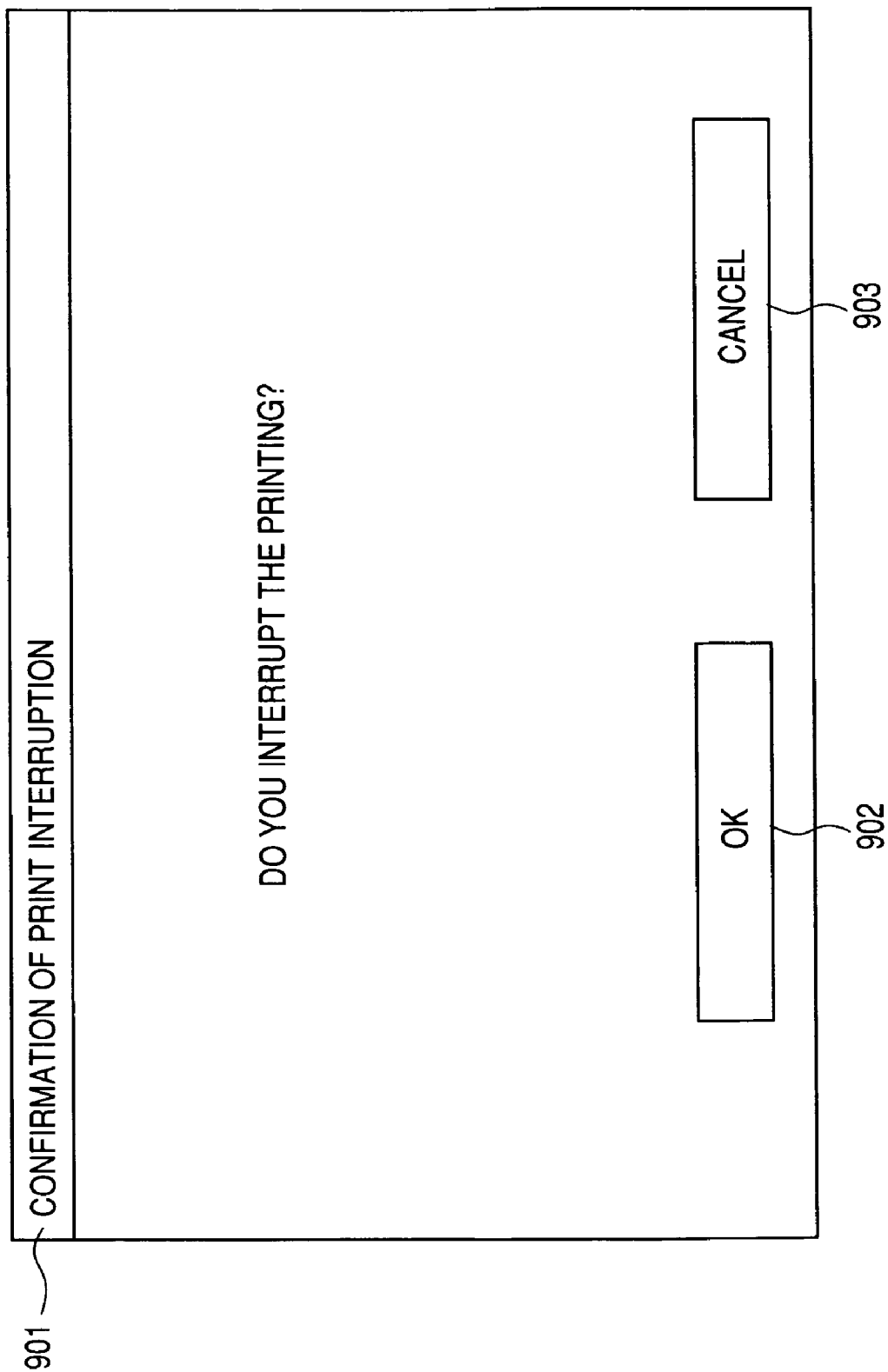
FIG. 12 is a diagram showing an example of a print interruption instructing display screen which is displayed on the display unit of the first print control apparatus shown in FIG. 1.

In the first print control apparatus 114, as shown in FIG. 8, first in step S601, to inquire of the user whether or not the printing is interrupted, the print processing unit 117 requests the display unit 116 to display, for example, a print interruption instructing display screen 901 shown in FIG. 12. The display unit 116 allows the CRT 309 to display the print interruption instructing display screen 901. The processing routine advances to step S602.

In step S602, the discrimination about whether or not the user has instructed the print interruption is made by the CPU 301 as follows on the print interruption instructing display screen 901 (shown in FIG. 12) which has been displayed in step S601 and will be explained hereinafter.

When the user presses an OK button 902 in the print interruption instructing display screen 901, it is determined that the print interruption has been instructed by the user, so that step S603 follows. If it is decided that a cancel button 903 has been pressed, it is determined that the print interruption is not instructed by the user, and the process is finished. It is now assumed that the OK button 902 has been pressed in the print interruption instructing display screen 901, and the processing routine advances to step S603.

In step S603, the print processing unit 117 requests the printing apparatus control unit 119 to stop the printing and obtain the present state information. The print processing unit 117 requests the printing apparatus control unit 119 to stop the printing. When the printing apparatus control unit 119 instructs the output unit 120 to stop the printing, the output unit 120 stops the printing.

When the output unit 120 stops the printing, the printing apparatus control unit 119 returns a message indicative of the stop of the printing to the print processing unit 117.

Subsequently, when the print processing unit 117 receives the message indicative of the stop of the printing from the printing apparatus control unit 119, the unit 117 requests the printing apparatus control unit 119 to obtain the state information. The printing apparatus control unit 119 discriminates the state of the output unit 120, obtains the number of copies which are at present being printed, the page number, and layout information, and returns them to the print processing unit 117. The processing routine advances to step S604.

In step S604, the print processing unit 117 transmits the print interruption information to the print service server 101 through the communicating unit 115 via the communicating unit 113 and requests the server 101 to store the print interruption information.

The print interruption information which is transmitted from the print processing unit 117 to the communicating unit 113 is constructed by the printed matter information, print setting information, user information, and state information. The processing routine advances to the processes of the print service server side.

In step S611, whether or not the communicating unit 113 of the print service server 101 has received the print interruption information transmitted from the print processing unit 117 of the first print control apparatus 114 is discriminated. If it is decided that the print interruption information is not received, the process is finished.

If it is decided in step S611 that the communicating unit 113 has received the print interruption information transmitted from the print processing unit 117 of the first print control apparatus 114, the print interruption information is received and transmitted to the request processing unit 112 in step S612. The processing routine advances to step S613.

In step S613, the print interruption information received by the request processing unit 112 in step S612 is stored into the HDD 213 shown in FIG. 2. When the request processing unit 112 receives the print interruption information, the unit 112 transmits the printed matter information to the printed matter information managing unit 107, requests the unit 107 to store the printed matter information, transmits the print setting information to the print setting information managing unit 108, requests the unit 108 to store the print setting information, transmits the state information to the state information managing unit 110, and requests the unit 110 to store the state information.

The printed matter information managing unit 107 instructs the printed matter information storing unit 102 to store the printed matter information and transmits the printed matter information ID as a key upon storing to the request processing unit 112.

The print setting information managing unit 108 instructs the print setting information storing unit 103 to store the print setting information and transmits the print setting information ID as a key upon storing to the request processing unit 112.

Further, the state information managing unit 110 instructs the state information storing unit 105 to store the state information and transmits the state information ID as a key upon storing to the request processing unit 112.

The request processing unit 112 transmits the received printed matter information ID, print setting information ID, and state information ID and the user ID in the user information of the print interruption information to the print interruption information managing unit 111 and requests the unit 111 to store the print interruption information. The print interruption information managing unit 111 instructs the print interruption information storing unit 106 to store the printed matter information ID, print setting information ID, user ID, and state information ID. If the storage of the print interruption information is normally finished, step S614 follows.

In step S614, the request processing unit 112 transmits a message indicative of the completion of the storage of the print interruption information to the print processing unit 117 via the communicating unit 115 through the communicating unit 113. The process of the print service server 101 side is finished.

After the print processing unit 117 transmitted the print interruption information to the print service server 101 via the communicating unit 115 through the communicating unit 113 in step S604, the first print control apparatus 114 side waits for a response from the print service server 101 side. In step S605, whether or not the message indicative of the completion of the storage of the print interruption information transmitted from the request processing unit 112 of the print service server 101 has been received is discriminated. If it is determined that such a message is not received, the process is finished.

If it is determined in step S605 that the message indicative of the completion of the storage of the print interruption information transmitted from the request processing unit 112 of the print service server 101 has been received, in step S606, the communicating unit 122 transmits the message indicative of the completion of the storage of the print interruption information to the print processing unit 117 through the Internet 128. When the print processing unit 117 receives the message indicative of the completion of the storage of the print interruption information from the communicating unit 122, the process is finished.

<Process at the Time of Print Restart>

The print restarting process by the second print control apparatus 121 after the end of the interrupting process by the first print control apparatus 114 will now be described with reference to FIGS. 9A and 9B.

Figure 9B:
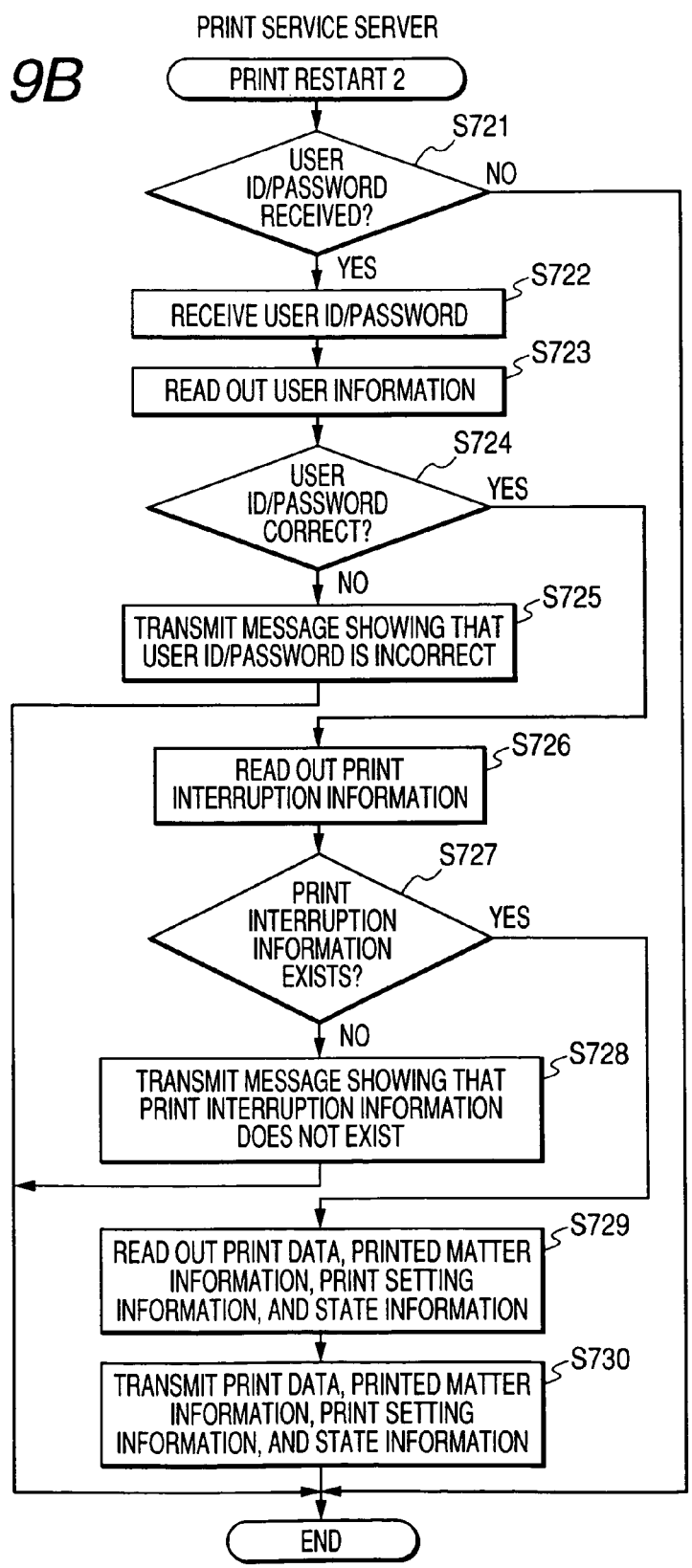
FIG. 9 is comprised of FIGS. 9A and 9B are flowcharts showing an example of the third data processing procedure in the print control apparatuses and the print service server according to the invention.

FIGS. 9A and 9B are flowcharts showing an example of the third data processing procedure in the print control apparatuses and the print service server according to the invention and corresponds to the print restart processing procedure by the second print control apparatus 121 and the print service server 101 shown in FIG. 1. S701 to S712 and S721 to S730 denote processing steps. Processing steps S701 to S712 are realized by a method whereby the CPU 301 shown in FIG. 3 in the second print control apparatus 121 loads the control programs stored in the ROM 303, HDD 313, or the like into the RAM 302 and executes them. Processing steps S721 to S730 are realized by a method whereby the CPU 201 of the print service server 101 loads the control programs stored in the ROM 203, HDD 213, or the like into the RAM 202 and executes them.

In the second print control apparatus 121, as shown in FIGS. 9A and 9B, first in step S701, the user inputs the user ID into the user ID input box 1002, inputs the password into the password input box 1003, and presses the OK button 1004 in the user authenticating display screen 1001 (shown in FIG. 13) which has been displayed on the CRT 309 by the display unit 123 and will be explained hereinafter. When the OK button 1004 is pressed, the print processing unit 124 transmits the user ID/password as user information to the communicating unit 122. In step S702, the communicating unit 122 transmits the user information to the communicating unit 113 and requests the user authentication.

In response to such a request, the print service server 101 discriminates whether or not the user information transmitted by the communicating unit 122 of the second print control apparatus 121 has been received in step S721. If it is determined that the user information is not received, the process is finished.

If it is determined in step S721 that the user information transmitted by the communicating unit 122 of the second print control apparatus 121 has been received, in step S722, the communicating unit 113 receives the user information transmitted by the communicating unit 122 of the second print control apparatus 121 and transmits the received user information to the request processing unit 112.

In step S723, to make the user authentication to the user information received from the second print control apparatus 121, the request processing unit 112 transmits the user ID of the received user information to the user information managing unit 109 and requests the unit 109 to read out the user information corresponding to the user ID.

The user information managing unit 109 instructs the user information storing unit 104 to read out the user information corresponding to the received user ID. The user information managing unit 109 transmits the user information read out by the user information storing unit 104 to the request processing unit 112.

If the user information corresponding to the user ID does not exist in the user information storing unit 104, a message showing that the user information corresponding to the user ID does not exist is transmitted to the request processing unit 112.

In step S724, the request processing unit 112 discriminates whether or not the user ID/password of the user information transmitted from the second print control apparatus 121 and the user ID/password of the user information stored in the user information storing unit 104 and received in step S723 are correct.

If it is determined that the user ID/password of the user information transmitted from the second print control apparatus 121 and the user ID/password of the user information stored in the user information storing unit 104 are correct, the processing routine advances to step S726.

If it is determined in step S724 that the user ID/password of the user information transmitted from the second print control apparatus 121 and the user ID/password of the user information stored in the user information storing unit 104 are different or if it is decided in step S724 that the user information corresponding to the user ID is not stored in the user ID storing unit 104, step S725 follows.

In step S725, if it is decided in step S724 that the user information transmitted from the second print control apparatus 121 is incorrect, the request processing unit 112 transmits the message showing that the user information transmitted from the second print control apparatus 121 is incorrect to the second print control apparatus 121 through the communicating unit 122 via the communicating unit 113. The process is finished.

It is now assumed that the user ID/password of the user information transmitted from the second print control apparatus 121 and the user ID/password of the user information stored in the user information storing unit 104 are correct, and the processing routine advances to step S726.

In step S726, to discriminate whether or not the print interruption information corresponding to the user information exists, the request processing unit 112 transmits the user information to the print interruption information managing unit 111 and requests the unit 111 to read out the print interruption information according to the user ID of the user information.

The print interruption information managing unit 111 transmits the received user ID to the print interruption information storing unit 106 and requests the unit 106 to read out the print interruption information according to the user ID. When the print interruption information is read out, the print interruption information managing unit 111 transmits the read-out print interruption information to the request processing unit 112.

In step S727, whether or not the print interruption information storing unit 106 could read out the print interruption information corresponding to the user ID, that is, whether or not the print interruption information exists is discriminated. If it is decided in step S726 that the print interruption information corresponding to the user ID could be read out, step S729 follows.

If it is decided in step S727 that the print interruption information corresponding to the user ID could not be read out, step S728 follows. It is now assumed that the print interruption information storing unit 106 could read out the print interruption information corresponding to the user ID in step S727, and step S729 follows.

If it is decided in step S727 that the print interruption information storing unit 106 cannot read out the print interruption information corresponding to the user ID, the communicating unit 113 transmits the message indicative of the absence of the print interruption information to the communicating unit 122 of the second print control apparatus 121 in step S728, and the process is finished.

In step S729, the request processing unit 112 transmits the print interruption information read out in step S726 to the printed matter information managing unit 107, print setting information managing unit 108, and state information managing unit 110 and requests them to read out the print data, the printed matter information, the print setting information, and the state information.

The printed matter information managing unit 107 transmits the printed matter information ID of the print interruption information to the printed matter information storing unit 102 and instructs the unit 102 to read out the printed matter information. The printed matter information managing unit 107 transmits the printed matter information read out from the printed matter information storing unit 102 to the request processing unit 112.

The print setting information managing unit 108 transmits the print setting information ID of the print interruption information to the print setting information storing unit 103 and instructs the unit 103 to read out the print setting information. The print setting information managing unit 108 transmits the print setting information read out from the print setting information storing unit 103 to the request processing unit 112.

The state information managing unit 110 transmits the state information ID of the print interruption information to the state information storing unit 105 and instructs the unit 105 to read out the state information. The state information managing unit 110 transmits the state information read out from the state information storing unit 105 to the request processing unit 112.

The request processing unit 112 reads out the print data corresponding to the printed matter information read out by the printed matter information managing unit 107 from the HDD 213. In addition to the read-out print data, the request processing unit 112 transmits the read-out printed matter information, print setting information, and state information as print interruption information to the communicating unit 113.

In step S730, the communicating unit 113 receives the print data and the print interruption information received from the request processing unit 112 in step S729. Further, the communicating unit 113 transmits the received print data and print interruption information to the communicating unit 122 of the second print control apparatus 121 and the communicating unit 122, and the processes of the print service server 101 side are finished.

In the second print control apparatus 121, after the user ID/password was transmitted to the print service server 101, the apparatus 121 waits for a response from the print service server 101, and discriminates whether or not the message showing that the user ID/password is incorrect has been received from the print service server 101 in step S703. If it is decided that the message showing that the user ID/password is incorrect is not received, step S705 follows.

In step S703, whether or not the message showing that the user ID/password is incorrect has been received from the print service server 101 is discriminated. If the message showing that the user ID/password is incorrect is received from the print service server 101 in step S704, the process is finished.

In step S705, whether or not the message showing that the print interruption information does not exist has been received from the print service server 101 is discriminated. If it is decided that the message showing that the print interruption information does not exist is not received from the print service server 101, step S707 follows.

If it is decided in step S705 that the message showing that the print interruption information does not exist has been received from the print service server 101, the communicating unit 122 receives the message indicative of the absence of the print interruption information transmitted from the communicating unit 113 of the print service server 101 in step S706.

Further, the communicating unit 122 transmits the received print data and print interruption information to the print processing unit 124. Moreover, the print processing unit 124 sends the print interruption information to the display unit 123 and requests the unit 123 to display a print restart instructing display screen 1101 (shown in FIG. 14), which will be explained hereinafter. The display unit 123 displays the print restart instructing display screen 1101 onto the CRT 309 by using the received print interruption information, and the process is finished.

In step S707, whether or not the communicating unit 122 has received the print data and the print interruption information, that is, the printed matter information, print setting information, and state information from the print service server 101. If it is decided that the print data and the print interruption information, that is, the printed matter information, print setting information, and state information are not received, the process is finished.

If it is decided in step S707 that the communicating unit 122 has received the print data and the print interruption information, that is, the printed matter information, print setting information, and state information from the print service server 101, the communicating unit 122 receives the print data and the print interruption information, that is, the printed matter information, print setting information, and state information from the print service server 101 in step S708. Whether or not the user restarts the printing is inputted in the print restart instructing display screen 1101 in step S709.

Whether or not the user restarts the printing is discriminated in step S710. If the user pressed an OK button 1106 in the print restart instructing display screen 1101, it is decided that the print restarting process is executed, and step S711 follows. If the user pressed a cancel button 1107 in the print restart instructing display screen 1101, it is decided that the print restarting process is not executed, and the process is finished.

It is now assumed that the user pressed the OK button, and step S711 follows.

In step S711, the print processing unit 124 transmits the print data and the print interruption information, that is, the printed matter information, print setting information, and state information received in step S712 to the printing apparatus control unit 126. The printing apparatus control unit 126 sets the received print data and the print interruption information into the output unit 127 so that they can be printed. The print processing unit 124 requests the printing apparatus control unit 126 to restart the printing. The printing apparatus control unit 126 instructs the output unit 127 to restart the printing. The printing is restarted in the output unit 127. The printing is restarted from the state where the printing has been interrupted by the print processing unit 117 in step S603 shown in FIG. 8 as a flowchart for the print interrupting process.

A processing routine for instructing the printing apparatus to restart the printing is executed in step S712 and the process is finished.

Step S712 is a subroutine and the process in step S712 will be explained in detail with reference to FIGS. 10A and 10B.

<Flowchart for Print Restarting Instruction>

Step S712 shown in FIG. 9A, that is, a print restart instructing process which is executed by the second print control apparatus 121 to the second printing apparatus 125 will now be described with reference to FIGS. 10A and 10B.

Figure 10B:
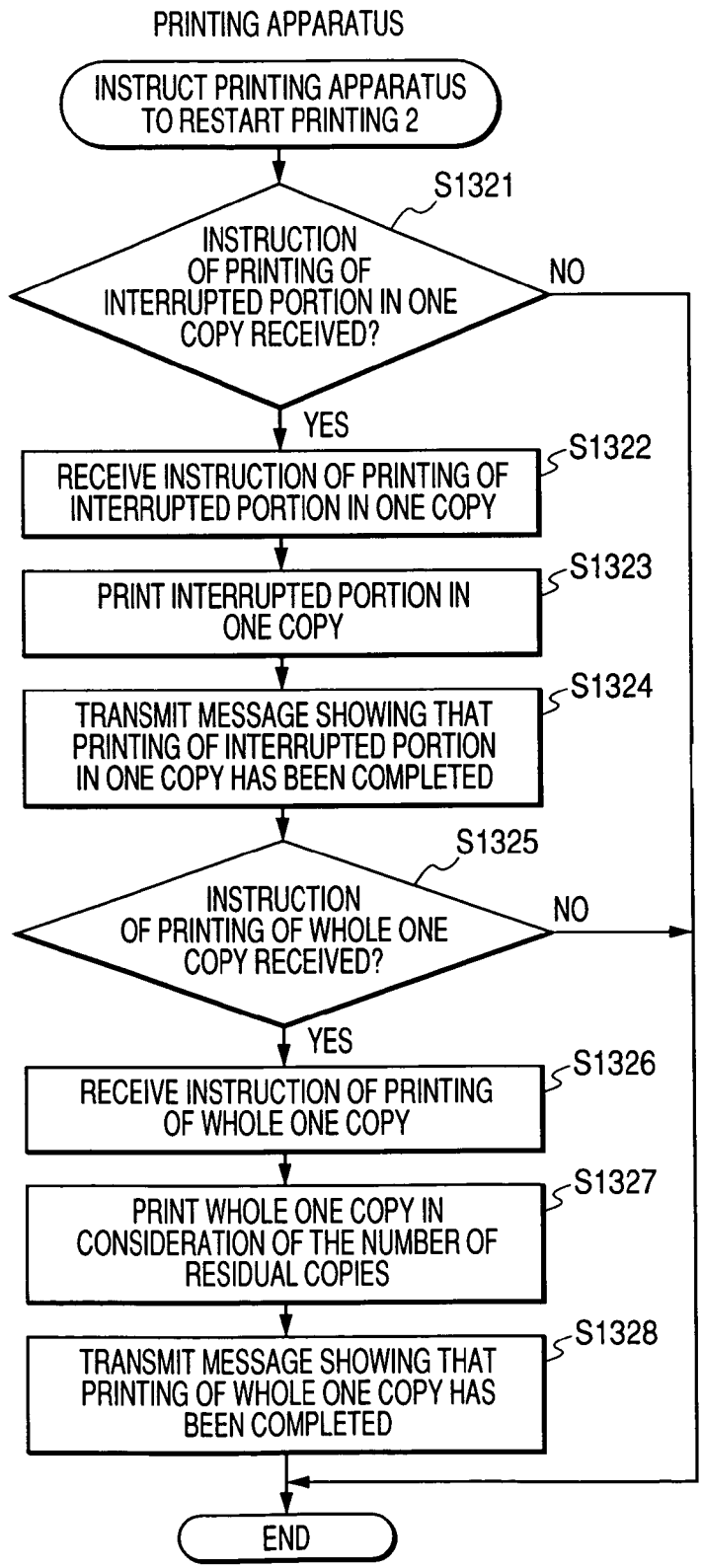
FIG. 10 is comprised of FIGS. 10A and 10B are flowcharts showing an example of the fourth data processing procedure in the print control apparatuses and the print service server according to the invention.

FIGS. 10A and 10B are flowcharts showing an example of the fourth data processing procedure in the print control apparatuses and the printing apparatus according to the invention and corresponds to the procedure for print restart instructing process to the second printing apparatus 125 by the second print control apparatus 121. S1301 to S1313 and S1321 to S1328 denote processing steps. S1301 to S1313 correspond to the processing steps of the second print control apparatus 121 side. S1321 to S1328 correspond to the processing steps of the second printing apparatus 125 side. This procedure is executed by the CPU 301.

In the second print control apparatus 121, first, in step S1301, the print processing unit 124 discriminates whether or not the page less than one copy is printed.

Specifically speaking, when the print interruption page number of the state information is equal to "0" or if it is equal to the total number of pages of the printed matter information, it is determined that it is unnecessary to print the page less than one copy, and step S1306 follows.

If the print interruption page number of the state information is not equal to "0" and if it differs from the number of pages of the printed matter information, it is determined that it is necessary to print the page less than one copy, and step S1302 follows.

It is now assumed that it is necessary to print the page less than one copy, and the processing routine advances to step S1302.

In step S1302, the print processing unit 124 calculates the print start page.

The print start page is calculated by the following equation.

The print start page=(the print interruption page number+1)

At this time, the layout information is also considered. In step S1303, the print processing unit 124 renders the print data as a print amount less than one copy in accordance with the print start page number calculated in step S1302 and converts the print data into a format which can be printed by the second printing apparatus 125. The print processing unit 124 transmits the rendering data to the printing apparatus control unit 126 and requests the unit 126 to print.

The processing routine advances to step S1321 of the printing apparatus 125 side. In step S1321, whether or not the printing apparatus control unit 126 has received the rendering data as a print amount less than one copy and the printing instruction transmitted from the print processing unit 124 is discriminated. If it is determined that the printing apparatus control unit 126 does not receive them, the process of the printing apparatus 125 side is finished.

If it is determined in step S1321 that the printing apparatus control unit 126 has received the rendering data of a print amount less than one copy and the printing instruction transmitted from the print processing unit 124, in step S1322, the printing apparatus control unit 126 transmits the rendering data as a print amount less than one copy received from the second print control apparatus 121 in step S1321 to the output unit 127 and instructs the unit 127 to print. In step S1323, the output unit 127 prints the received rendering data as a print amount less than one copy.

In step S1324, when the output unit 127 completes the printing of the received rendering data as a print amount less than one copy, the output unit 127 transmits a message indicative of the completion of the printing to the printing apparatus control unit 126.

In step S1325, whether or not the printing apparatus control unit 126 has received the rendering data of the whole one copy transmitted from the print processing unit 124 and the number of residual print copies is discriminated. If it is determined that the control unit 126 does not receive them, the process of the printing apparatus side is finished.

If it is determined in step S1325 that the control unit 126 has received the rendering data of the whole one copy and the number of residual print copies, in step S1326, the printing apparatus control unit 126 receives the rendering data of the whole one copy and the number of residual print copies transmitted from the print processing unit 124. In step S1327, the printing apparatus control unit 126 transmits the rendering data of the whole one copy and the number of residual print copies received in step S1314 to the output unit 127 and instructs the unit 127 to print. The output unit 127 which received the printing instruction prints the rendering data of the whole one copy by the number of residual print copies.

When the printing executed by the output unit 127 in step S1327 is completed, in step S1328, the output unit 127 transmits a message indicative of the completion of the printing of the copy unit to the second print control apparatus 121 through the printing apparatus control unit 126 and the processes of the second print control apparatus 121 side are finished.

After step S1303, the second print control apparatus 121 waits for a response from the printing apparatus. In step S1304, whether or not a message showing that the printing of the interrupted portion in one copy was completed has been received from the printing apparatus is discriminated. If it is decided that the message showing that the printing of the interrupted portion in one copy has been completed from the printing apparatus is not received, step S1306 follows.

If it is decided in step S1304 that the message showing that the printing of the interrupted portion in one copy has been completed from the printing apparatus has been received, a message showing that the printing of the interrupted portion in one copy (print sentence less than one copy) has been completed is received from the printing apparatus in step S1305. The print processing unit 124 receives the message which indicates the completion of the printing of the print sentence less than one copy and which has been transmitted from the printing apparatus control unit 126. In step S1307, whether or not the print processing unit 124 needs to execute the printing on a copy unit basis is discriminated.

Specifically speaking, if (the number of copies of the print style information) is equal to (the number of interruption copies of the interruption information+1), it is determined that there is no need to print on a copy unit basis, and the process is finished.

If (the total number of copies in the print style information) is not equal to (the number of interruption copies in the interruption information+1) in step S1307, it is decided that the printing on a copy unit basis is necessary, and the processing routine advances to step S1309. It is now assumed that it is determined here that the printing on a copy unit basis is necessary, and step S1309 follows. The print processing unit 124 calculates the number of residual print copies which need to be printed. Specifically speaking, (the number of residual print copies which need to be printed) is calculated by the following expression.

(the number of residual print copies which need to be printed)=[(the total number of copies in the print style information)-(the number of print interruption copies in the interruption information)-1].

The processing routine advances to step S1310.

If the print interruption page number in the state information is equal to "0" in step S1301 or if the print interruption page number is equal to the number of pages in the printed matter information, it is decided that there is no need to print the page less than one copy. In step S1306, if it is determined that the print sentence less than one copy does not exist in step S1301, the print processing unit 124 discriminates whether or not the printing on a copy unit basis is necessary.

Specifically speaking, when the number of copies in the print style information is equal to the number of interruption copies in the interruption information, it is determined that the printing on a copy unit basis is unnecessary, and the process is finished.

If it is determined in step S1306 that the number of copies in the print style information is not equal to the number of interruption copies in the interruption information, it is decided that the printing on a copy unit basis is necessary, and step S1308 follows. It is now assumed that it is decided that the printing on a copy unit basis is necessary, the processing routine advances to step S1308, and the print processing unit 124 calculates the number of residual print copies which need to be printed.

Specifically speaking, it is calculated by the following equation.

(the number of residual print copies whose printing is necessary)=[(the total number of copies in the print style information)-(the number of print interruption copies in the interruption information)]

In step S1310, as a preparation for requesting the printing apparatus control unit 126 to print on a copy unit basis by the print processing unit 124, the rendering process of the whole one copy is executed and the print data is converted into the format which can be printed by the second printing apparatus 125.

In step S1311, the print processing unit 124 transmits the number of residual print copies calculated from the print processing unit 124 in step S1308 or S1309 and the rendering data of the whole one copy processed in step S1310 to the printing apparatus control unit 126 and requests the unit 126 to print.

Whether or not the message indicative of the completion of the print amount of the whole one copy has been received from the second printing apparatus 125 is discriminated in step S1312. If it is not received, the process is finished.

If it is determined in step S1312 that the message indicative of the completion of the print amount of the whole one copy has been received from the second printing apparatus 125, a message indicative of the completion of the printing on a copy unit basis in the output unit 127 is received from the printing apparatus control unit 126, and the process is finished.

In the embodiment, whether or not the printing process on a page unit basis is necessary or whether or not the printing on a copy unit basis is necessary has separately been discriminated in step S1301, S1308, and S1310. However, whether or not the printing process on a page unit basis is necessary and whether or not the printing on a copy unit basis is necessary can be also simultaneously discriminated.

<Under-Printing Display Screen>

An under-printing display screen 801 will now be described with reference to FIG. 11.

FIG. 11 is a diagram showing an example of the under-printing display screen which is displayed on the display unit 116 of the first print control apparatus 114 shown in FIG. 1. The displaying process of this display screen is executed by the display unit 116 on the basis of a command of the CPU 301. The keyboard 311, mouse 312, and the like are used for the inputting operation by the user on this display screen.

As shown in FIG. 11, a file name display 802, a print situation display 803, a cancel button 804, and the like are displayed on the under-printing display screen 801. A file size or the like can be added as printed matter information into the under-printing display screen 801. A distinction display of duplex/simplex print mode, a color/monochromatic display, and the like can be also added as print setting information into the under-printing display screen 801.

The file name display 802 is a display column to display the name of the file which is at present being printed. Although the file name display 802 is provided on the under-printing display screen 801 in the embodiment, the file name display 802 is not always necessary.

The print situation display 803 is a display column to display the number of copies in which the printing is finished at present and the number of pages.

The print processing unit 117 obtains the number of printed copies and the number of pages from the printing apparatus control unit 119 and the print situation display 803 is displayed by the display unit 116. Although the print situation display 803 is provided on the under-printing display screen 801, the print situation display 803 is not always necessary.

The cancel button 804 is a button for the user to instruct the first print control apparatus 114 to interrupt the printing process which is at present being executed and allow the print interruption instructing display screen 901 (shown in FIG. 12), which will be explained hereinafter, to be displayed.

When the cancel button 804 is pressed, the display screen is shifted to the print interruption instructing display screen 901 in the embodiment. However, it is an example and, naturally, it is also possible to construct in such a manner that when the cancel button 804 is pressed, the display screen is not shifted to the print interruption instructing display screen 901 but the processing routine advances to a process which is executed in the case where the OK button 902 in the print interruption instructing display screen 901 is pressed.

Further, although the display screen is shifted to the print interruption instructing display screen 901 when the cancel button 804 is pressed in the embodiment, the print processing unit 117 can also instruct the printing apparatus control unit 119 to temporarily interrupt the printing before the display screen is shifted to the print interruption instructing display screen 901.

<Print Interruption Instructing Display Screen>

The print interruption instructing display screen 901 will now be described with reference to FIG. 12.

FIG. 12 is a diagram showing an example of the print interruption instructing display screen which is displayed on the display unit 116 of the first print control apparatus 114 shown in FIG. 1.

The displaying process of such a display screen is executed by the display unit 116 on the basis of a command of the CPU 301.

The keyboard 311, mouse 312, and the like are used for the inputting operation by the user on this display screen.

The OK button 902, cancel button 903, and the like are displayed in the print interruption instructing display screen 901. For example, a file size display and the like can be added as printed matter information to the print interruption instructing display screen 901, or the distinction display of the duplex/simplex print mode, the color/monochromatic display, and the like can be added as print setting information to the print interruption instructing display screen 901.

The OK button 902 is a button for the user to instruct the first print control apparatus 114 to interrupt the printing. When the OK button is pressed, the print processing unit 117 requests the printing apparatus control unit 119 to obtain the state information and requests the print stop. The printing apparatus control unit 119 which received the request from the print processing unit 117 instructs the output unit 120 to stop the printing, obtains the state information, and returns it to the print processing unit 117.

The print processing unit 117 transmits the obtained state information, printed matter information, print setting information, and user information to the request processing unit 112 through the communicating unit 115 and requests the unit 112 to store the print interruption information. Further, when a message showing that the storage of the print interruption information has correctly been finished is received from the request processing unit 112 via the communicating unit 115, the display screen is shifted to a print interruption completing display screen.

The cancel button 903 is a button for the user to instruct the first print control apparatus 114 to continue the printing process which is at present being executed without requesting the print interruption. When the cancel button 903 is pressed, the display screen is shifted to the under-printing display screen 801.

<User Authenticating Display Screen>

The user authenticating display screen 1001 will now be described with reference to FIG. 13.

Figure 13:
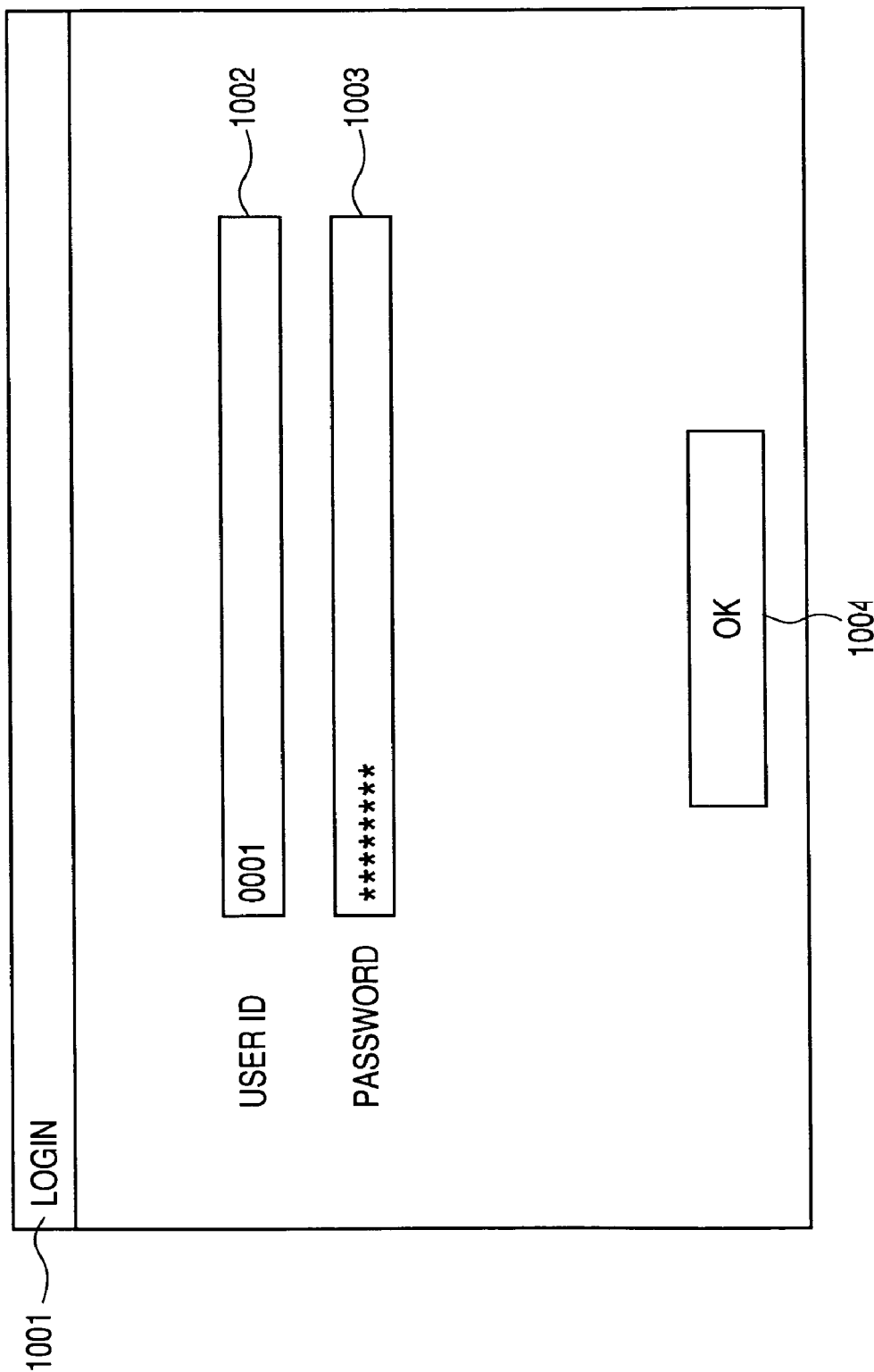
FIG. 13 is a diagram showing an example of a user authenticating display screen which is displayed on a display unit of the second print control apparatus shown in FIG. 1.

FIG. 13 is a diagram showing an example of the user authenticating display screen (login display screen) which is displayed on the display unit 123 of the second print control apparatus 121 shown in FIG. 1.

The displaying process of this display screen is executed by the display unit 123 on the basis of a command of the CPU 301. The keyboard 311, mouse 312, and the like are used for the inputting operation by the user on this display screen.

The user ID input box 1002, password input box 1003, OK button 1004, and the like are displayed in the user authenticating display screen 1001. For example, an input column for inputting a belonging section of the user and the like can be also added to the user authenticating display screen 1001.

The user ID input box 1002 is an input box for the user to input the user ID in the user information into the second print control apparatus 121. The inputted user ID is transmitted to the request processing unit 112 from the print processing unit 124 via the communicating unit 122 and used for the user authentication.

The password input box 1003 is an input box for the user to input the password in the user information into the second print control apparatus 121. The inputted password is transmitted to the request processing unit 112 from the print processing unit 124 via the communicating unit 122 and used for the user authentication.

The OK button 1004 is a button for the user to instruct the second print control apparatus 121 to transmit the user information to the print service server 101 and make the user authentication.

When the OK button 1004 is pressed, the user ID inputted to the user ID input box 1002 and the password inputted to the password input box 1003 are transmitted as user information from the print processing unit 124 from the communicating unit 122, the Internet 128, and the communicating unit 113 to the request processing unit 112.

After completion of the user authenticating process and the print interruption information reading process in the request processing unit 112 of the print service server 101, a user authentication result or the print interruption information are transmitted to the print processing unit 124 of the second print control apparatus 121 through the communicating unit 122 via the Internet 128.

When the user authentication result is returned, if it indicates that the authentication is impossible, a message showing that the authentication is impossible is displayed on the user authenticating display screen 1001. If the user authentication result indicates that the authentication has successfully been made, the display screen is shifted to the printed matter selecting display screen. If the print interruption information is transmitted, the display screen is shifted to the print restart instructing display screen 1101 (shown in FIG. 14), which will be explained hereinafter.

<Print Restart Instructing Display Screen>

The print restart instructing display screen 1101 will now be described with reference to FIG. 14.

Figure 14:
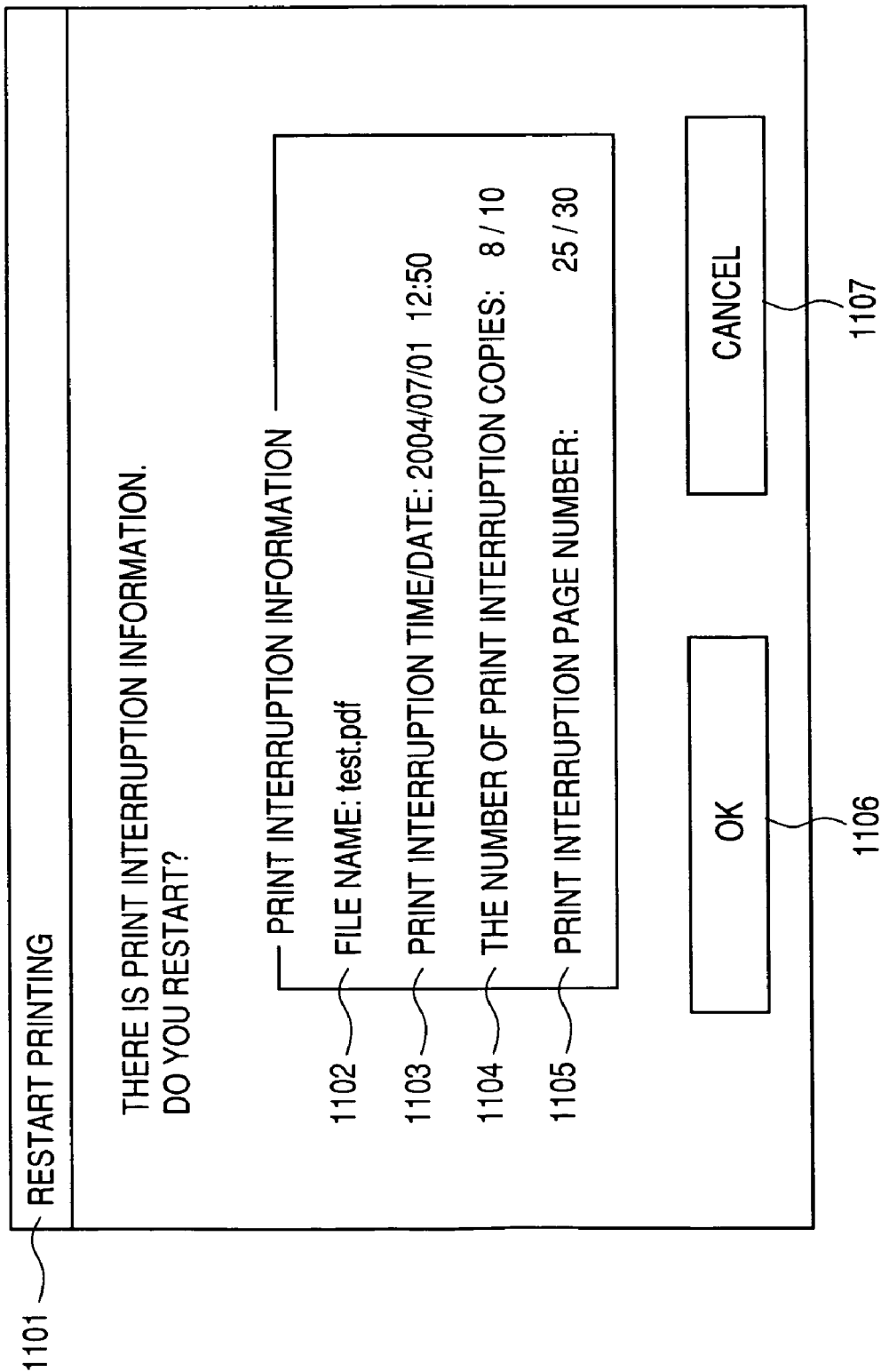
FIG. 14 is a diagram showing an example of a print restart instructing display screen which is displayed on the display unit of the second print control apparatus shown in FIG. 1.

FIG. 14 is a diagram showing an example of the print restart instructing display screen which is displayed on the display unit 123 of the second print control apparatus 121 shown in FIG. 1.

The displaying process of this display screen is executed by the display unit 123 on the basis of a command of the CPU 301. The keyboard 311, mouse 312, and the like are used for the inputting operation by the user on this display screen.

A file name 1102, print interruption time/date 1103, the number of print interruption copies 1104, a print interruption page number 1105, the OK button 1106, the cancel button 1107, and the like are displayed on the print restart instructing display screen 1101. For example, the input box to input a file size display or the like can be added as printed matter information to the print restart instructing display screen 1101. An input box to input the distinction display of the duplex/simplex print mode, the color/monochromatic display, and the number of copies to restart the printing, an input box to input the page number from which the printing is restarted, and the like can be also added as print setting information to the print restart instructing display screen 1101.

The file name 1102 is a display column to display the name of the file in the printed matter information of the print interruption information. Although the file name 1102 is provided on the print restart instructing display screen 1101 in the embodiment, the file name 1102 is not always necessary.

The print interruption time/date 1103 is a display column to display the print interruption time/date in the state information of the print interruption information. Although the print interruption time/date 1103 is provided on the print restart instructing display screen 1101 in the embodiment, the print interruption time/date 1103 is not always necessary.

The number of print interruption copies 1104 is a display column to display the number of print interruption copies in the state information of the print interruption information. Although the number of print interruption copies 1104 is provided on the print restart instructing display screen 1101 in the embodiment, the number of print interruption copies 1104 is not always necessary.

The print interruption page number 1105 is a display column to display the print interruption page number in the state information of the print interruption information. Although the print interruption page number 1105 is provided on the print restart instructing display screen 1101 in the embodiment, the print interruption page number 1105 is not always necessary.

The OK button 1106 is a button for the user to instruct the second print control apparatus 121 to restart the printing by using the print interruption information. When the OK button 1106 is pressed, the print processing unit 124 transmits the print interruption information to the printing apparatus control unit 126 and instructs the unit 126 to restart the printing. The display screen is shifted to the under-printing display screen 801.

The cancel button 1107 is a button for the user to instruct the second print control apparatus 121 to stop the print restart and start the ordinary printing process. When the cancel button 1107 is pressed, the print processing unit 124 deletes the holding print interruption information and the display screen is shifted to the printed matter selecting display screen or the like for the ordinary printing process.

Thus, in a print service system in which the print service server and the print base are connected by the Internet, when the user prints the data at the print base, even if a fault of the print base occurred or the printing was interrupted by the user's cancellation or even if the print base to restart the printing is not determined at the time of the print interruption, the user does not re-input the printed matter information, print setting information, and the like at an arbitrary print base such as same print base or another print base or does not execute such operations that the user detaches by himself an external storing apparatus or the like attached to the print control apparatus or the like, conveys the detached apparatus to another print control apparatus, and attaches it thereto, and the like, but the user can restart the printing from the state upon interruption by a simple operating instruction.

Second Embodiment

Although the first embodiment has been described with respect to the case where the ordinary printing process, the interruption of the printing process, and the restart of the interrupted printing process are constructed as independent control, the ordinary printing process, the interruption of the printing process, and the restart of the interrupted printing process can be also constructed as single control. Such an embodiment will be described hereinbelow. A construction of the second embodiment is substantially the same as that of the first embodiment except for the construction of FIGS. 6 to 9 in the first embodiment.

Figure 15:
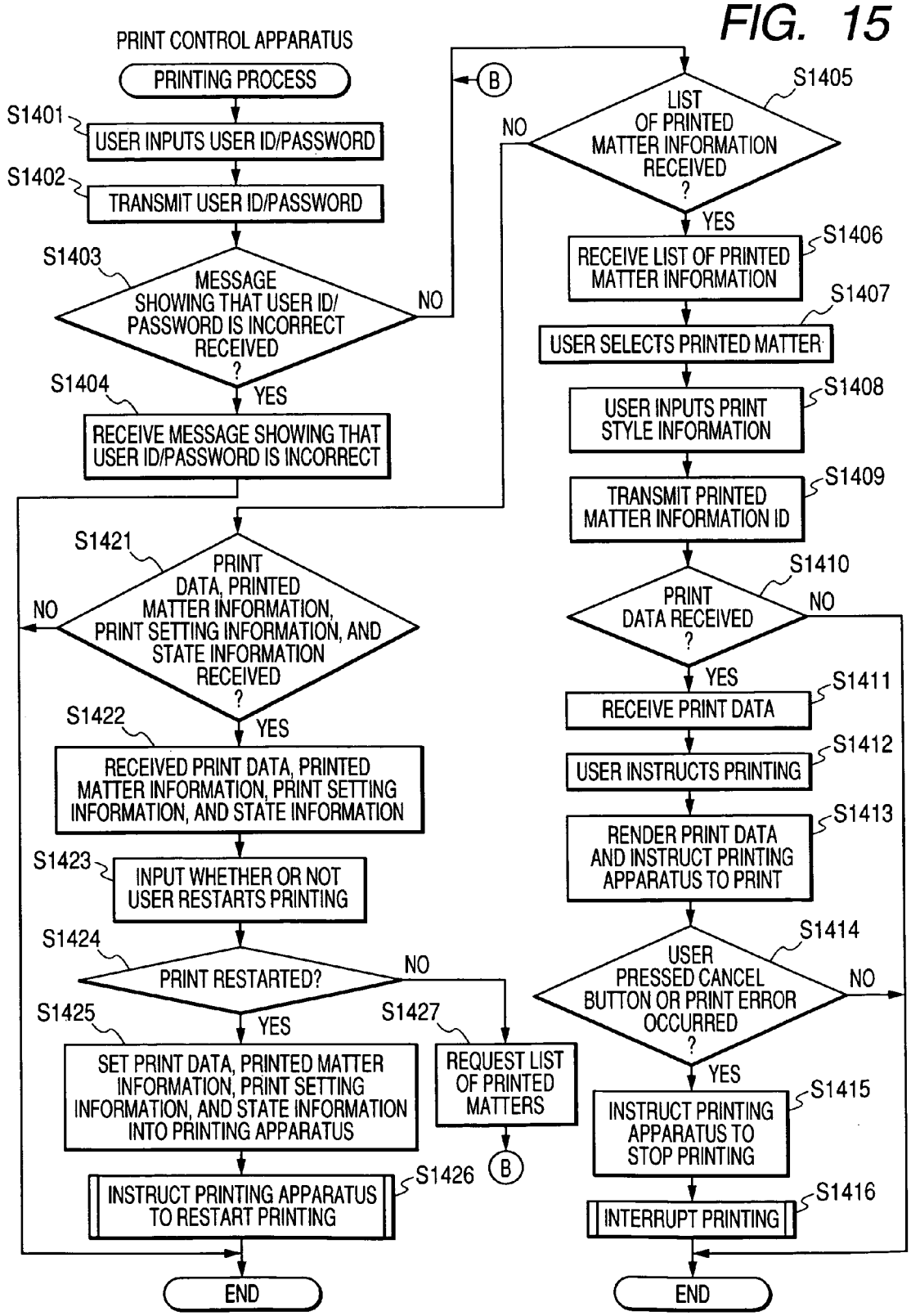
FIG. 15 is a flowchart showing an example of the fifth data processing procedure in the print control apparatuses and the print service server according to the invention.
Figure 16:
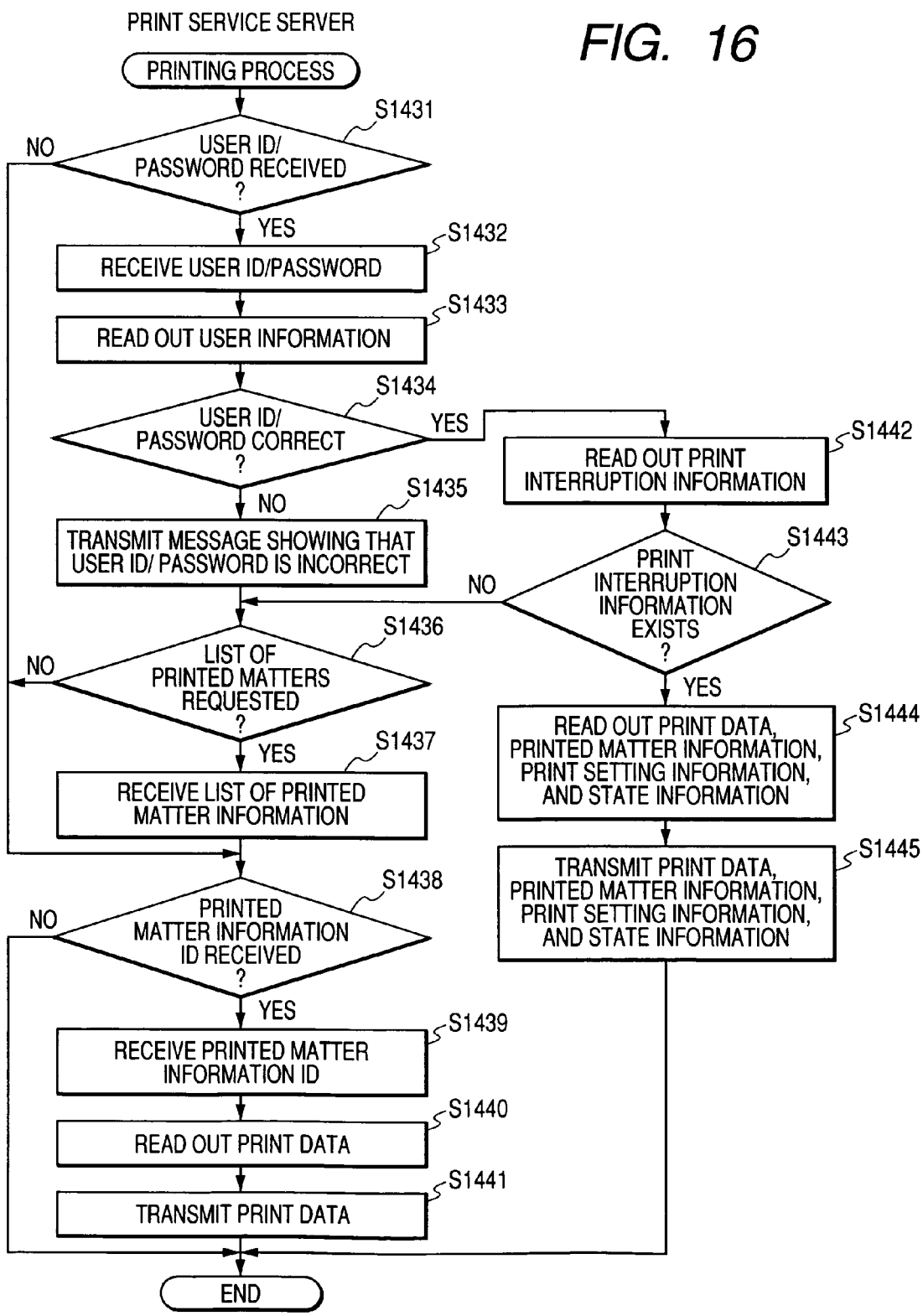
FIG. 16 is a flowchart showing an example of the fifth data processing procedure in the print control apparatuses and the print service server according to the invention.

FIGS. 15 and 16 are flowcharts showing an example of the fifth data processing procedure in the print control apparatuses and the print service server according to the invention and correspond to the procedure for the print restart instructing process of the first print control apparatus 114 and the print service server 101.

S1401 to S1416, S1421 to S1427, S1431 to S1435, and S1436 to S1445 denote processing steps. Processing steps S1401 to S1427 are realized by a method whereby the CPU 301 shown in FIG. 3 in the first print control apparatus 114 loads the control programs stored in the ROM 303, HDD 313, or the like into the RAM 302 and executes them. Processing steps S1431 to S1445 are realized by a method whereby the CPU 201 of the print service server 101 loads the control programs stored in the ROM 203, HDD 213, or the like into the RAM 202 and executes them.

In the first print control apparatus 114, first, in step S1401, in the user authenticating display screen 1001 (shown in FIG. 13) displayed on the CRT 309 by the display unit 116, the user inputs the user ID into the user ID input box 1002, inputs the password into the password input box 1003, and presses the OK button 1004. When the OK button 1004 is pressed, the print processing unit 117 transmits the user ID/password as user information to the communicating unit 122. The processing routine advances to step S1402.

In step S1402, the communicating unit 115 transmits the user information to the communicating unit 113 and requests the user authentication. In step S1403, whether or not the response issued from the print service server 101 indicates a message showing that the user ID/password is incorrect is discriminated. If it is determined that the message showing that the user ID/password is incorrect has been received, in step S1404, the communicating unit 115 receives the message which shows that the user ID/password inputted by the user is incorrect and which has been transmitted by the communicating unit 113. The communicating unit 115 transmits the received message showing the user ID/password inputted by the user is incorrect to the print processing unit 117 and the process is finished.

If it is determined that the user ID/password transmitted to the print service server 101 is correct, whether or not the response from the print service server 101 is the printed matter information list is discriminated in step S1405. If it is determined that it is not the printed matter information list, step S1421 follows.

If it is determined in step S1405 that the response from the print service server 101 is the printed matter information list, in step S1406, the printed matter information list is received as a response from the print service server 101. When the communicating unit 115 receives the printed matter information list, it transmits the printed matter information list to the print processing unit 117.

In step S1407, the print processing unit 117 transmits the received printed matter information list to the display unit 116. The user selects a print matter to be printed on the printed matter selecting display screen displayed on the CRT 309 by the display unit 116. When the print matter is selected, the selected printed matter information is transmitted to the print processing unit 117 and the processing routine advances to step S1408.

In step S1408, the print processing unit 117 requests the display unit 116 to input the print style information and the user sets the print style in the print style setting display screen displayed on the CRT 309 by the display unit 116. When the print style is set, the set print style information is transmitted to the print processing unit 117.

In step S1409, the print processing unit 117 transmits the ID of the printed matter selected by the user in step S1407 to the communicating unit 115. The communicating unit 115 transmits the printed matter information ID to the communicating unit 113 of the print service server 101.

In step S1410, the apparatus waits for a response from the print service server 101 and discriminates whether or not the print data has been received. If it is decided that the print data is not received, the process is finished.

If it is decided in step S1410 that the response from the print service server 101 indicates the print data, in step S1411, the communicating unit 115 of the first print control apparatus 114 receives the printed matter information and the print data transmitted by the request processing unit 112 of the print service server 101 and transmits the received printed matter information and print data to the print processing unit 117.

In step S1412, the print processing unit 117 requests the display unit 116 to display the print instructing display screen. The user instructs the printing on the print instructing display screen displayed on the CRT 309 by the display unit 116 which received the request. In step S1413, the print processing unit executes a rendering process from the printed matter information and the print data received in step S1411. After the rendering process, the print processing unit 117 transmits the rendering data to the printing apparatus control unit 119 of the first printing apparatus 118 and requests the printing. The printing apparatus control unit 119 which received the request instructs the output unit 120 to print the rendering data. The output unit 120 which received the printing instruction starts the printing of the received rendering data.

In step S1414, while the output unit 120 is executing the printing process, in the under-printing display screen 801 (shown in FIG. 11) displayed on the CRT 309 by the display unit 116, whether or not the user has instructed the print cancellation is discriminated or whether or not the abnormality occurred and the print error occurred in the first printing apparatus 118 is discriminated.

If it is decided in step S1414 that the user has instructed the print cancellation or if it is decided that the print error occurred in the first printing apparatus 118, the processing routine advances to step S1415.

If it is decided in step S1414 that the user does not instruct the print cancellation or if it is determined that no print errors occur in the first printing apparatus 118, the process is finished.

It is now assumed that the user has instructed the print cancellation or the print error has occurred in the first printing apparatus 118, and step S1415 follows.

Since the user has instructed the print cancellation or the print error has occurred in the first printing apparatus 118 in step S1414, in step S1415, the print processing unit 117 requests the printing apparatus control unit 119 of the first printing apparatus 118 to stop the printing process. The printing apparatus control unit 119 which received such a request instructs the output unit 120 to stop the printing process which is at present being processed.

In step S1416, the print processing unit 117 executes the print interrupting process and stores the print interruption information into the print interruption information storing unit 106 of the print service server 101, and the process is finished.

Step S1416 is a subroutine and details of the process in step S1416 are similar to those described in FIG. 8.

In the case of restarting the interrupted printing process, the first print control apparatus 114 discriminates in step S1421 whether or not the response from the print service server 101 indicates the print data, printed matter information, print setting information, and state information. If it is decided that the response from the print service server 101 does not indicate the print data, printed matter information, print setting information, and state information, the process is finished.

If it is decided in step S1421 that the response from the print service server 101 indicates the print data, printed matter information, print setting information, and state information, in step S1422, the communicating unit 115 receives the print data and the print interruption information transmitted from the communicating unit 113 of the print service server 101. Further, the communicating unit 115 transmits the received print data and print interruption information to the print processing unit 117.

Further, the print processing unit 117 transmits the print interruption information to the display unit 116 and requests the display unit 116 to display the print restart instructing display screen 1101 (shown in FIG. 14), which will be explained hereinafter, to display. The display unit 116 displays the print restart instructing display screen 1101 onto the CRT 309 by using the received print interruption information.

In step S1423, whether or not the user restarts the printing is inputted on the print restart instructing display screen 1101. In step S1424, whether or not the user restarts the printing is discriminated.

In the print restart instructing display screen 1101, if it is determined that the user has pressed the OK button 1106, it is decided that the print restarting process is executed, and step S1425 follows. In the print restart instructing display screen 1101, if it is determined that the user has pressed the cancel button 1107, it is decided that the print restarting process is not executed, and step S1427 follows.

It is now assumed that the user has pressed the OK button 1106, and the processing routine advances to step S1425.

In step S1425, the print processing unit 117 transmits the print data and the print interruption information, that is, the printed matter information, print setting information, and state information received in step S1422 to the printing apparatus control unit 119. The printing apparatus control unit 119 sets the received print data and print interruption information into the output unit 120 so that they can be printed, and the processing routine advances to step S1426.

In step S1426, the print processing unit 117 requests the printing apparatus control unit 119 to restart the printing. The printing apparatus control unit 119 instructs the output unit 120 to restart the printing. The printing is restarted in the output unit 120. The printing is restarted from the state where the printing has been interrupted in the print processing unit 117 in step S603 shown in FIG. 8 as a flowchart for the print interrupting process, and the process is finished.

If it is determined in step S1424 that the user does not select the print restart, in step S1427, the communicating unit 115 requests the request processing unit 112 of the print service server 101 to obtain the printed matter list via the communicating unit 113, and the processing routine advances to step S1405.

Step S1426 is a subroutine. Details of the process in Step S1426 have already been described in conjunction with FIG. 10.

On the print service server 101 side, in step S1431, the apparatus waits for a response from the first print control apparatus 114 and whether or not the user ID/password has been received is discriminated. If it is determined that the user ID/password is not received, step S1438 follows.

If it is determined in step S1431 that the response from the first print control apparatus 114 indicates the user ID/password, in step S1432, the communicating unit 113 receives the user information transmitted from the communicating unit 115 of the first print control apparatus 114 and transmits the received user information to the request processing unit 112.

In step S1433, to make the user authentication to the user information received in step S1432, the request processing unit 112 transmits the user ID of the received user information to the user information managing unit 109 and requests the unit 109 to read out the user information corresponding to the user ID.

The user information managing unit 109 instructs the user information storing unit 104 to read out the user information corresponding to the received user ID. The user information managing unit 109 transmits the user information read out by the user information storing unit 104 to the request processing unit 112.

If it is determined that the user information corresponding to the user ID does not exist in the user information storing unit 104, a message showing that the user information corresponding to the user ID does not exist is transmitted to the request processing unit 112.

In step S1434, the request processing unit 112 discriminates whether or not the user ID/password of the user information transmitted from the first print control apparatus 114 in step S1432 and the user ID/password of the user information which was received in step S1433 and has been stored in the user information storing unit 104 are correct.

If it is determined that the user ID/password of the user information transmitted from the first print control apparatus 114 and the user ID/password of the user information stored in the user information storing unit 104 are correct, step S1442 follows. If it is determined that the user ID/password of the user information transmitted from the first print control apparatus 114 and the user ID/password of the user information stored in the user information storing unit 104 are different or if it is decided in step S1433 that the user information corresponding to the user ID is not stored in the user information storing unit 104, step S1435 follows.

It is now assumed that the user ID/password of the user information transmitted from the first print control apparatus 114 and the user ID/password of the user information stored in the user information storing unit 104 are correct, and step S1442 follows.

In step S1442, to discriminate the presence or absence of the print interruption information for the user information, the request processing unit 112 transmits the user information to the print interruption information managing unit 111 and requests the unit 111 to read out the print interruption information by the user ID of the user information.

The print interruption information managing unit 111 transmits the received user ID to the print interruption information storing unit 106 and requests the unit 106 to read out the print interruption information by the user ID. When the print interruption information is read out, the print interruption information managing unit 111 transmits the read-out print interruption information to the request processing unit 112.

In step S1443, whether or not the print interruption information storing unit 106 could read out the print interruption information corresponding to the user ID in step S1442 is discriminated. If it is decided that the print interruption information corresponding to the user ID could be read out, step S1444 follows.

If it is determined in step S1443 that the print interruption information corresponding to the user ID cannot be read out, step S1436 follows.

It is now assumed that the print interruption information storing unit 106 cannot read out the print interruption information corresponding to the user ID in step S1443, and the processing routine advances to step S1436.

In step S1436, whether or not the response from the first print control apparatus 114 is the request of the printed matter list is discriminated. If it is decided that the response is not the request of the printed matter list, the processing routine advances to step S1438 and subsequent steps.

If it is decided in step S1436 that the response from the first print control apparatus 114 is the request of the printed matter list, to transmit the printed matter information list stored in the printed matter information storing unit 102 to the communicating unit 115 of the first print control apparatus 114, the request processing unit 112 requests the printed matter information managing unit 107 to read out the printed matter information list stored in the printed matter information storing unit 102.

The printed matter information managing unit 107 requests the printed matter information storing unit 102 to read out the printed matter information list stored in the printed matter information storing unit 102. When the printed matter information list is read out, the printed matter information managing unit 107 transmits the read-out printed matter information list to the request processing unit 112.

When the read-out printed matter information list is received in step S1437, the request processing unit 112 transmits the read-out printed matter information list to the communicating unit 115 on the first print control apparatus 114 via the communicating unit 113.

Whether or not the response from the first print control apparatus 114 indicates the reception of the printed matter information ID is discriminated in step S1438. If it is decided that the response from the first print control apparatus 114 indicates the reception of the printed matter information ID, the communicating unit 113 receives the printed matter information ID from the communicating unit 115 in step S1439. When the printed matter information ID is received, the communicating unit 113 transmits the received printed matter information to the request processing unit 112.

In step S1440, the request processing unit 112 transmits the received printed matter information ID to the printed matter information managing unit 107 and requests the unit 107 to read out the printed matter information corresponding to the printed matter information ID stored in the printed matter information storing unit 102.

The printed matter information managing unit 107 transmits the received printed matter information ID to the printed matter information storing unit 102 and requests the unit 102 to read out the printed matter information corresponding to the printed matter information ID. The printed matter information storing unit 102 reads out the printed matter information corresponding to the received printed matter information ID and transmits it to the printed matter information managing unit 107. The printed matter information managing unit 107 transmits the received printed matter information to the request processing unit 112. The request processing unit 112 reads out the print data corresponding to the received printed matter information from, for example, the HDD 213.

In step S1441, the request processing unit 112 transmits the printed matter information corresponding to the printed matter information ID received by the request processing unit 112 in step S1440 and the print data to the communicating unit 115 of the first print control apparatus 114 via the communicating unit 113, and the process is finished.

If it is determined in step S1434 of the print service server 101 that the user ID/password inputted by the user is incorrect, in step S1435, the request processing unit 112 transmits a message showing that the user ID/password inputted by the user is incorrect to the communicating unit 115 of the first print control apparatus 114 via the communicating unit 113.

If it is decided that the print interruption information exists in step S1443 of the print service server 101 side, in step S1444, the request processing unit 112 transmits the print interruption information read out in step S1442 to the printed matter information managing unit 107, print setting information managing unit 108, and state information managing unit 110 and requests them to read out the printed matter information, print setting information, and state information.

The printed matter information managing unit 107 transmits the printed matter information ID of the print interruption information to the printed matter information storing unit 102 and instructs the unit 102 to read out the printed matter information. The printed matter information managing unit 107 transmits the printed matter information read out from the printed matter information storing unit 102 to the request processing unit 112. The print setting information managing unit 108 transmits the print setting information ID of the print interruption information to the print setting information storing unit 103 and instructs the unit 103 to read out the print setting information. The print setting information managing unit 108 transmits the print setting information read out from the print setting information storing unit 103 to the request processing unit 112.

The state information managing unit 110 transmits the state information ID of the print interruption information to the state information storing unit 105 and instructs the unit 105 to read out the state information. The state information managing unit 110 transmits the state information read out from the state information storing unit 105 to the request processing unit 112. Further, the request processing unit 112 reads out the print data corresponding to the printed matter information read out by the printed matter information managing unit 107 from the HDD 213.

The request processing unit 112 transmits the read-out printed matter information, print setting information, and state information as print interruption information in addition to the read-out print data to the communicating unit 113.

In step S1445, the communicating unit 113 receives the print data and the print interruption information received from the request processing unit 112 in step S1444. Further, the communicating unit 113 transmits the received print data and print interruption information to the communicating unit 115 of the first print control apparatus 114.

Although the request processing unit 112 transmits the printed matter information list in step S1437, the print processing unit 117 receives the printed matter information list in step S1404, and the user selects the print matter to be printed from the printed matter information list in step S1443 in the embodiment, such a construction is an example. It is also possible that steps S1437 and S1403 are omitted and the user directly inputs the printed matter information ID in step S1412.

Thus, in a print service system in which the print service server and the print base are connected by the Internet, when the user prints the data at the print base, even if a fault of the print base occurred or the printing was interrupted by the user's cancellation or even if the print base to restart the printing is not determined at the time of the print interruption, the user does not re-input the printed matter information, print setting information, and the like at an arbitrary print base such as same print base or another print base, but the user simply inputs the user information and, after the authenticating process on the server side, whether or not the interruption information has been registered is automatically searched and confirmed, and if the interruption information has been registered, the user can restart the printing from the state upon interruption by a simple operating instruction.

Third Embodiment

The print interrupting process by the first print control apparatus 114 will now be described with reference to FIGS. 17 and 18.

Figure 17:
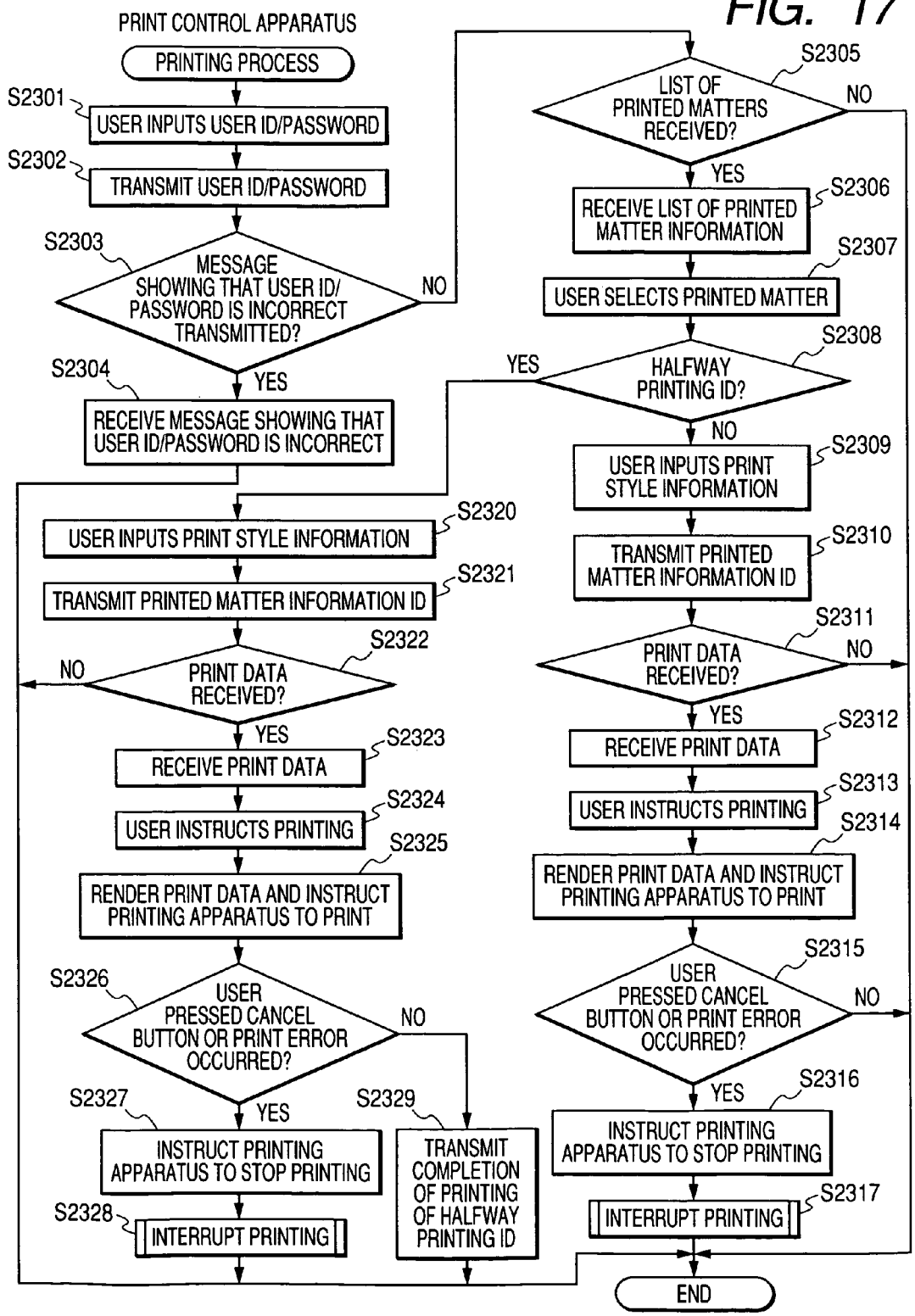
FIG. 17 is a flowchart showing an example of the sixth data processing procedure in the print control apparatuses and the print service server according to the invention.
Figure 18:
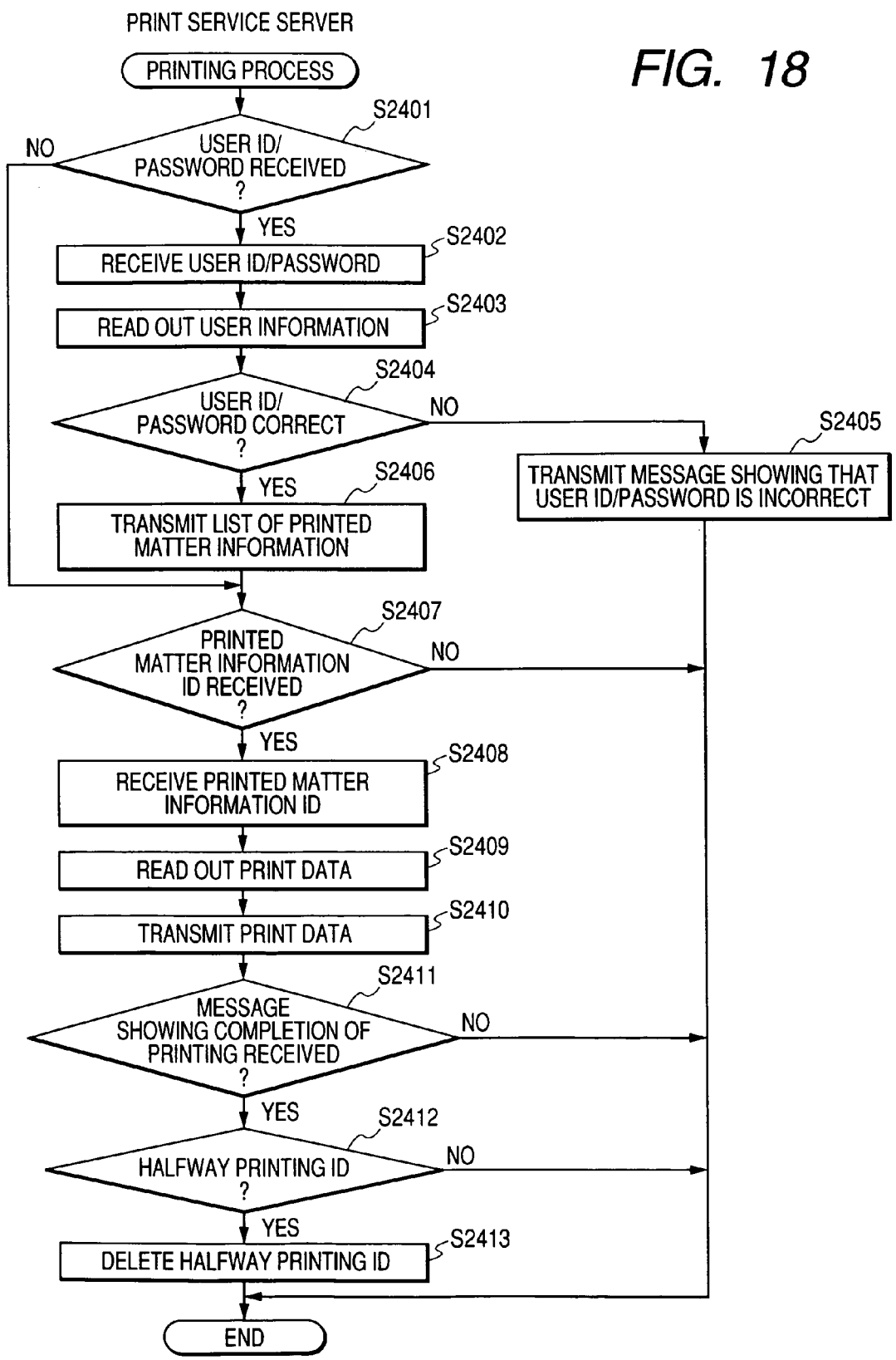
FIG. 18 is a flowchart showing an example of the sixth data processing procedure in the print control apparatuses and the print service server according to the invention.

FIGS. 17 and 18 are flowcharts showing an example of the sixth data processing procedure in the print control apparatuses and the print server according to the invention. FIG. 17 corresponds to the procedure for the printing process by the first print control apparatus 114. FIG. 18 corresponds to the procedure for the printing process of the print service server 101 side. S2301 to S2329 denote processing steps of the first print control apparatus 114 side. S2401 to S2412 denote processing steps of the print service server 101 side.

In the first print control apparatus 114, first, in step S2301, in user authenticating display screen 1001 (shown in FIG. 13) which has been displayed on the CRT 309 by the display unit 116 and will be explained hereinafter, the user inputs the user ID into the user ID input box 1002, inputs the password into the password input box 1003, and presses the OK button 1004. When the OK button 1004 is pressed, the print processing unit 117 transmits the user ID/password as user information to the communicating unit 115. The processing routine advances to step S2302.

In step S2302, the communicating unit 115 transmits the user information to the communicating unit 113 of the print service server 101 and requests the user authentication. The processing routine advances to step S2303 and the apparatus waits for the response from the print service server 101.

The communicating unit 113 of the print service server 101 receives the user information transmitted from the communicating unit 115 in step S2302 and transmits the received user information to the request processing unit 112.

In step S2401, the communicating unit 113 of the print service server 101 discriminates whether or not the user information of the user ID/password has been received from the first print control apparatus 114. If it is determined that the user information is not received, step S2407 follows.

If it is determined in step S2401 that the user information has been received, to make the user authentication of the user information received by the communicating unit 113 for the transmission in step S2302, the request processing unit 112 transmits the user ID of the received user information to the user information managing unit 109 and requests the unit 109 to read out the user information corresponding to the user ID.

When the user information managing unit 109 receives the user information from the request processing unit 112 in step S2402, the user information managing unit 109 instructs the user information storing unit 104 to read out the user information corresponding to the received user ID in step S2403.

The user information managing unit 109 transmits the user information read out by the user information storing unit 104 to the request processing unit 112. In next step S2404, the request processing unit 112 discriminates whether or not the user ID/password of the user information transmitted from the first print control apparatus 114 in step S2302 and the user ID/password of the user information stored in the user information storing unit 104 and received in step S2402 are correct.

If it is determined that the user ID/password of the user information transmitted from the first print control apparatus 114 and the user ID/password of the user information stored in the user information storing unit 104 are correct, step S2406 follows.

If it is determined in step S2404 that the user ID/password of the user information transmitted from the first print control apparatus 114 and the user ID/password of the user information stored in the user information storing unit 104 are different, step S2405 follows.

In step S2405, a message showing that the user information corresponding to the user ID does not exist or a message showing that user ID/password is incorrect because it differs from the transmitted information is transmitted to the request processing unit 112 and the process is finished.

Assuming that the user ID/password of the user information transmitted from the first print control apparatus 114 and the user ID/password of the user information stored in the user information storing unit 104 are correct in step S2404, and the processing routine advances to step S2406.

In step S2406, if it is determined that the user information corresponding to the user ID exists in the user information storing unit 104, in order to transmit the printed matter information list stored in the printed matter information storing unit 102 to the communicating unit 115 of the first print control apparatus 114, the request processing unit 112 requests the printed matter information managing unit 107 to read out the printed matter information list stored in the printed matter information storing unit 102.

In response to such a request, the printed matter information managing unit 107 requests the printed matter information storing unit 102 to read out the printed matter information list stored in the printed matter information storing unit 102. If the printed matter information list is read out, the printed matter information managing unit 107 transmits the read-out printed matter information list to the request processing unit 112. When the request processing unit 112 receives the read-out printed matter information list, it transmits the read-out printed matter information list to the communicating unit 115 on the first print control apparatus 114 through the communicating unit 113.

In this manner, the information showing that the user ID/password is incorrect or the printed matter information list is transmitted from the print service server 101 to the first print control apparatus 114.

In response to it, in the first print control apparatus 114, whether or not the information showing that the user ID/password is incorrect has been received from the print service server 101 is discriminated. If it is determined that the information showing that the user ID/password is incorrect is not received (when the user ID/password is correct), whether or not the printed matter information list has been received from the print service server 101 is discriminated in step S2305. If it is determined that the printed matter information list has been received, step S2306 follows. If it is determined in step S2305 that the printed matter information list is not received from the print service server 101, the process is finished.

If it is determined in step S2303 that the information showing that the user ID/password is incorrect has been received, the communicating unit 115 receives the information which shows that the user ID/password inputted by the user is incorrect and which has been transmitted by the communicating unit 113. The communicating unit 115 transmits the received information showing that the user ID/password inputted by the user is incorrect to the print processing unit 117, and the process is finished.

If it is determined in step S2305 that the printed matter information list has been received from the print service server 101, in step S2306, the print processing unit 117 receives the printed matter information list transmitted from the request processing unit 112 through the communicating unit 113 via the communicating unit 115 of the first print control apparatus. When the communicating unit 115 receives the printed matter information list, it transmits the printed matter information list to the print processing unit 117. The print processing unit 117 receives the printed matter information list and transmits it to the display unit 116. The display unit 116 allows the CRT 309 to display it.

In step S2307, the user selects a print matter to be printed on the printed matter selecting display screen. When the print matter is selected, the selected printed matter information is transmitted to the print processing unit 117.

In step S2308, if it is decided by the print service server 101 that the selected printed matter is not a halfway printing ID, in step S2309, the print processing unit 117 requests the display unit 116 to input print style information. The user sets the print style in the print style setting display screen displayed on the CRT 309 by the display unit 116.

When the print style is set, the set print style information is transmitted to the print processing unit 117. In step S2310, the print processing unit 117 transmits the user-selected printed matter information ID to the communicating unit 115. The communicating unit 115 transmits the printed matter information ID to the communicating unit 113 of the print service server 101.

In step S2407, the communicating unit 113 of the print service server 101 discriminates whether or not the printed matter information ID has been received from the first print control apparatus 114. If it is decided that the printed matter information ID is not received, the process is finished.

If it is decided in step S2407 that the printed matter information ID has been received from the communicating unit 115 of the first print control apparatus 114, in step S2408, the communicating unit 113 transmits the received printed matter information ID to the request processing unit 112.

The request processing unit 112 transmits the received printed matter information ID to the printed matter information managing unit 107 and requests the unit 107 to read out the printed matter information corresponding to the printed matter information ID stored in the printed matter information storing unit 102. The printed matter information managing unit 107 transmits the received printed matter information ID to the printed matter information storing unit 102 and requests the unit 102 to read out the printed matter information corresponding to the printed matter information ID.

In step S2409, the printed matter information storing unit 102 reads out the printed matter information corresponding to the printed matter information ID received in step S2314 and transmits it to the printed matter information managing unit 107. The printed matter information managing unit 107 transmits the received printed matter information to the request processing unit 112. In step S2410, the request processing unit 112 reads out the print data corresponding to the received printed matter information from the HDD 213 shown in FIG. 2. In step S2315, the request processing unit 112 transmits the printed matter information corresponding to the printed matter information ID and the print data received by the request processing unit 112 in step S2408 to the communicating unit 115 of the first print control apparatus 114 through the communicating unit 113.

In step S2411, when the information of the message indicative of the completion of the printing is not received from the communicating unit 115 of the first print control apparatus 114, the process is finished. If it is decided that such information has been received, step S2412 follows. In step S2412, whether or not the printed matter information ID after completion of the printing is the halfway printing ID is discriminated. If it is decided that the printed matter information ID is not the halfway printing ID, the process is finished.

If it is decided in step S2412 that the printed matter information ID is the halfway printing ID, the halfway printing ID is deleted in step S2413 and the process is finished.

In the first print control apparatus 114, if it is determined in step S2305 that the printed matter information list is not received or after step S2310, the processing routine advances to step S2311. Whether or not the print data has been received from the print service server 101 is discriminated in step S2311. If it is determined that the print data is not received, the process is finished.

If it is determined in step S2311 that the print data has been received, in step S2312, the communicating unit 115 receives the printed matter information and the print data transmitted by the request processing unit 112 of the print service server 101 and transmits the received printed matter information and print data to the print processing unit 117. The processing routine advances to step S2313.

In step S2313, the print processing unit 117 requests the display unit 116 to display the print instructing display screen. The user instructs the printing in the print instructing display screen displayed on the CRT 309 by the display unit 116 which received the request.

In step S2314, the print processing unit 117 executes the rendering process from the printed matter information and the print data received in step S2312. After the rendering process is finished, the print processing unit 117 transmits the rendering data to the printing apparatus control unit 119 of the first printing apparatus 118 and requests the unit 119 to print.

The printing apparatus control unit 119 which received the request instructs the output unit 120 to print the rendering data. The output unit 120 which received the printing instruction starts the printing of the received rendering data.

In step S2315, whether or not the user has instructed the cancellation of the printing or whether or not an abnormality has occurred and a print error has occurred in the first printing apparatus 118 in the under-printing display screen displayed on the CRT 309 by the display unit 116 in the middle of the printing process in the output unit 120 is discriminated.

If it is determined that the user has instructed the cancellation or if it is decided that the print error has occurred in the first printing apparatus 118, the processing routine advances to step S1216.

If it is decided that the user does not instruct the cancellation or if it is decided that the print error does not occur in the first printing apparatus 118, the process is finished.

It is now assumed that the user has instructed the cancellation or the print error has occurred in the first printing apparatus 118, the processing routine advances to step S2316.

Since the user has instructed the cancellation or the print error has occurred in the first printing apparatus 118 in step S2315, the printing apparatus control unit 119 of the first printing apparatus 118 is requested to stop the printing process in step S2316. The printing apparatus control unit 119 which received the request instructs the output unit 120 to stop the printing process which is at present being processed and the processing routine advances to step S2317.

In step S2317, the print processing unit 117 executes the print interrupting process and stores the print interruption information into the print interruption information storing unit 106 of the print service server 101. Step S2317 is a subroutine and the print interrupting process in step S2317 will be described in detail in FIGS. 19, 20, and 21.

If it is decided in step S2308 that the halfway printing ID has been selected by the print service server 101, step S2320 follows.

In step S2320, the print processing unit 117 requests the display unit 116 to input the print style information. In the print style setting display screen displayed on the CRT 309 by the display unit 116, the user sets the print style.

When the print style is set, the set print style information is transmitted to the print processing unit 117. In step S2321, the print processing unit 117 transmits the printed matter information ID selected by the user to the communicating unit 115. The communicating unit 115 transmits the printed matter information ID to the communicating unit 113 of the print service server 101.

The communicating unit 113 of the print service server 101 discriminates whether or not the printed matter information ID has been received from the first print control apparatus 114 in step S2407. If it is determined that the printed matter information ID is not received, the processing routine shown in FIG. 18 is finished.

If it is determined in step S2407 that the printed matter information ID has been received from the communicating unit 115 of the first print control apparatus 114, the communicating unit 113 transmits the received printed matter information ID to the request processing unit 112.

The request processing unit 112 transmits the received printed matter information ID to the printed matter information managing unit 107 and requests the unit 107 to read out the printed matter information corresponding to the printed matter information ID stored in the printed matter information storing unit 102. The printed matter information managing unit 107 transmits the received printed matter information ID to the printed matter information storing unit 102 and requests the unit 102 to read out the printed matter information corresponding to the printed matter information ID.

In step S2409, the printed matter information storing unit 102 reads out the printed matter information corresponding to the printed matter information ID received in step S2325 and transmits it to the printed matter information managing unit 107. The printed matter information managing unit 107 transmits the received printed matter information to the request processing unit 112.

The request processing unit 112 reads out the print data corresponding to the received printed matter information from the HDD 213 shown in FIG. 2 in step S2410. In step S2326, the request processing unit 112 transmits the printed matter information corresponding to the printed matter information ID and the print data received by the request processing unit 112 in step S2408 to the communicating unit 115 of the first print control apparatus 114 via the communicating unit 113.

In step S2411, if the information indicative of the completion of the printing is not received from the communicating unit 115 of the first print control apparatus 114, the processing routine is finished. If it is decided that the information indicative of the completion of the printing has been received, step S2412 follows. In step S2412, whether or not the printed matter information ID after completion of the printing is the halfway printing ID is discriminated. If it is decided that the printed matter information ID is not the halfway printing ID, the process is finished.

If it is decided in step S2412 that the printed matter information ID is the halfway printing ID, the halfway printing ID is deleted in step S2413 and the process is finished.

In the first print control apparatus 114, if it is determined in step S2305 that the printed matter information list is not received, the processing routine is finished.

If it is determined in step S2322 that the print data has been received, in step S2323, the communicating unit 115 receives the printed matter information and the print data transmitted by the request processing unit 112 of the print service server 101 in step S2410 and transmits the received printed matter information and print data to the print processing unit 117. The processing routine advances to step S2324.

In step S2324, the print processing unit 117 requests the display unit 116 to display the print instructing display screen. The user instructs the printing in the print instructing display screen displayed on the CRT 309 by the display unit 116 which received the request.

In step S2325, the print processing unit 117 executes the rendering process from the printed matter information and the print data received in step S2323. After the rendering process is finished, the print processing unit 117 transmits the rendering data to the printing apparatus control unit 119 of the first printing apparatus 118 and requests the unit 119 to print.

The printing apparatus control unit 119 which received the request instructs the output unit 120 to print the rendering data. The output unit 120 which received the printing instruction starts the printing of the received rendering data.

In step S2326, whether or not the user has instructed the cancellation of the printing or whether or not the abnormality has occurred and the print error has occurred in the first printing apparatus 118 in the under-printing display screen displayed on the CRT 309 by the display unit 116 in the middle of the printing process in the output unit 120 is discriminated.

If it is determined that the user has instructed the cancellation or if it is decided that the print error has occurred in the first printing apparatus 118, the processing routine advances to step S2327.

If it is decided that the user does not instruct the cancellation or if it is decided that the print error does not occur in the first printing apparatus 118, the process is finished.

It is now assumed that the user has instructed the cancellation or the print error has occurred in the first printing apparatus 118, the processing routine advances to step S2327.

Since the user has instructed the cancellation or the print error has occurred in the first printing apparatus 118 in step S2326, the printing apparatus control unit 119 of the first printing apparatus 118 is requested to stop the printing process in step S2327. The printing apparatus control unit 119 which received the request instructs the output unit 120 to stop the printing process which is at present being processed and the processing routine advances to step S2328.

If the printing of the halfway printing ID is not interrupted in step S2326, the message indicative of the completion of the printing of the halfway printing ID is transmitted to the print service server 101 in step S2329, and the process is finished.

In step S2328, the print processing unit 117 executes the print interrupting process and stores the print interruption information into the print interruption information storing unit 106 of the print service server 101. Step S2328 is a subroutine and the process in step S2328 will be described in detail with reference to flowcharts shown in FIGS. 25 and 26.

Although the request processing unit 112 transmits the printed matter information list in step S2406, the print processing unit 117 receives the printed matter information list in step S2306, and the user selects the print matter to be printed from the printed matter information list in step S2307 in the embodiment, such a construction is an example. It is also possible that steps S2406 and S2306 are omitted and the user directly inputs the printed matter information ID in step S2307.

Figure 19:
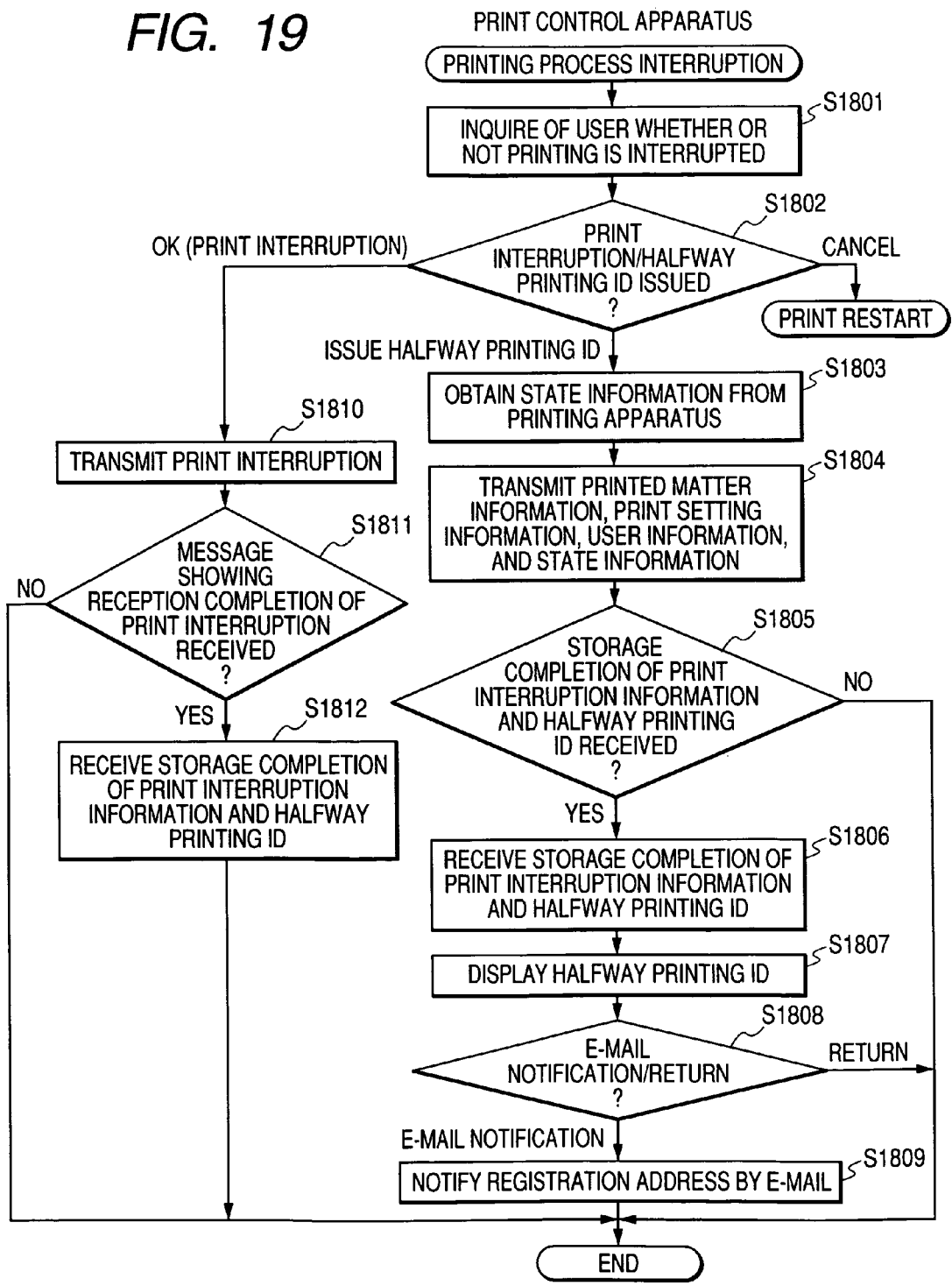
FIG. 19 is a flowchart showing an example of the seventh data processing procedure in the print control apparatuses and the print service server according to the invention.
Figure 20:
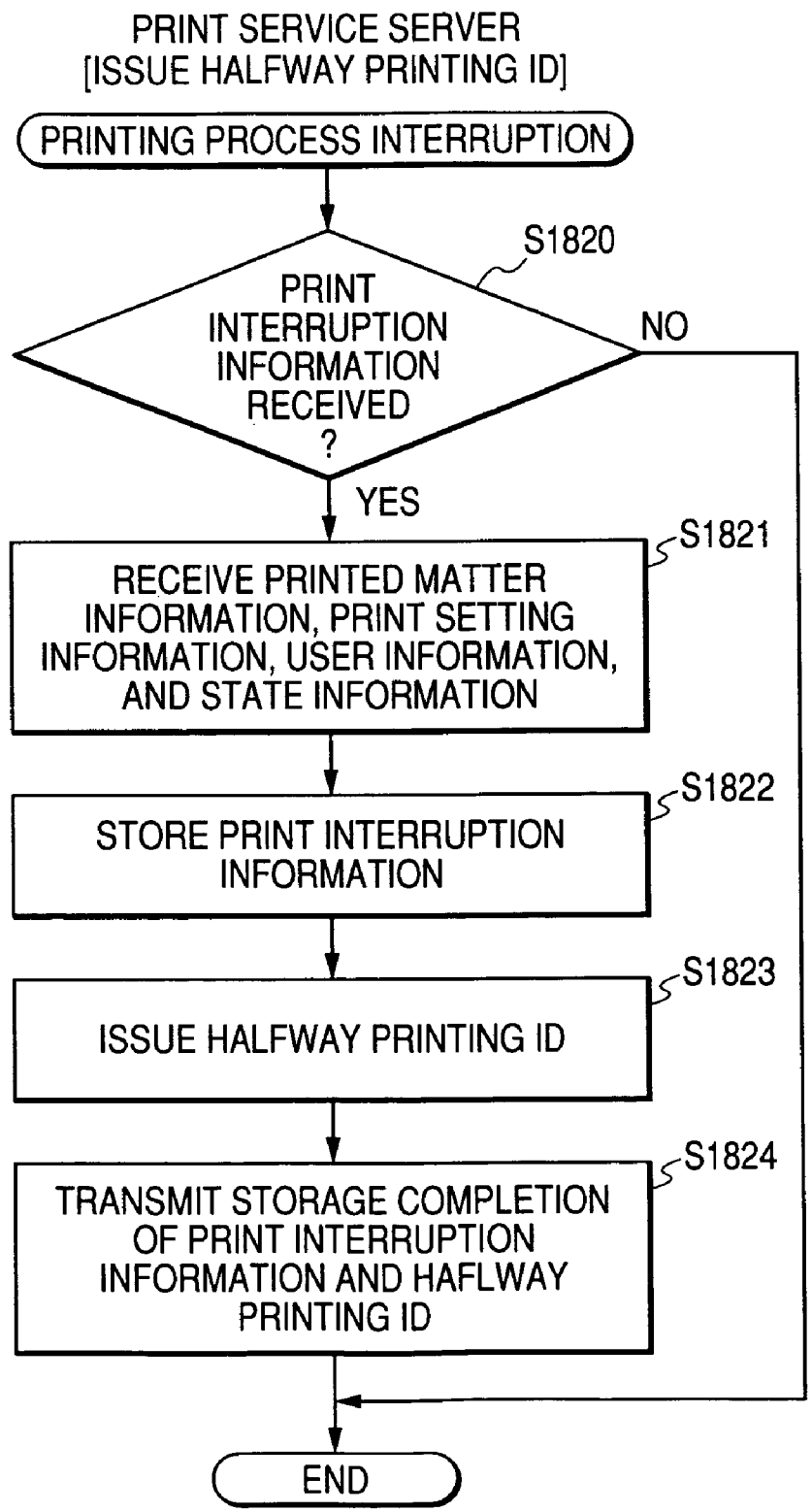
FIG. 20 is a flowchart showing an example of the seventh data processing procedure in the print control apparatuses and the print service server according to the invention.
Figure 21:
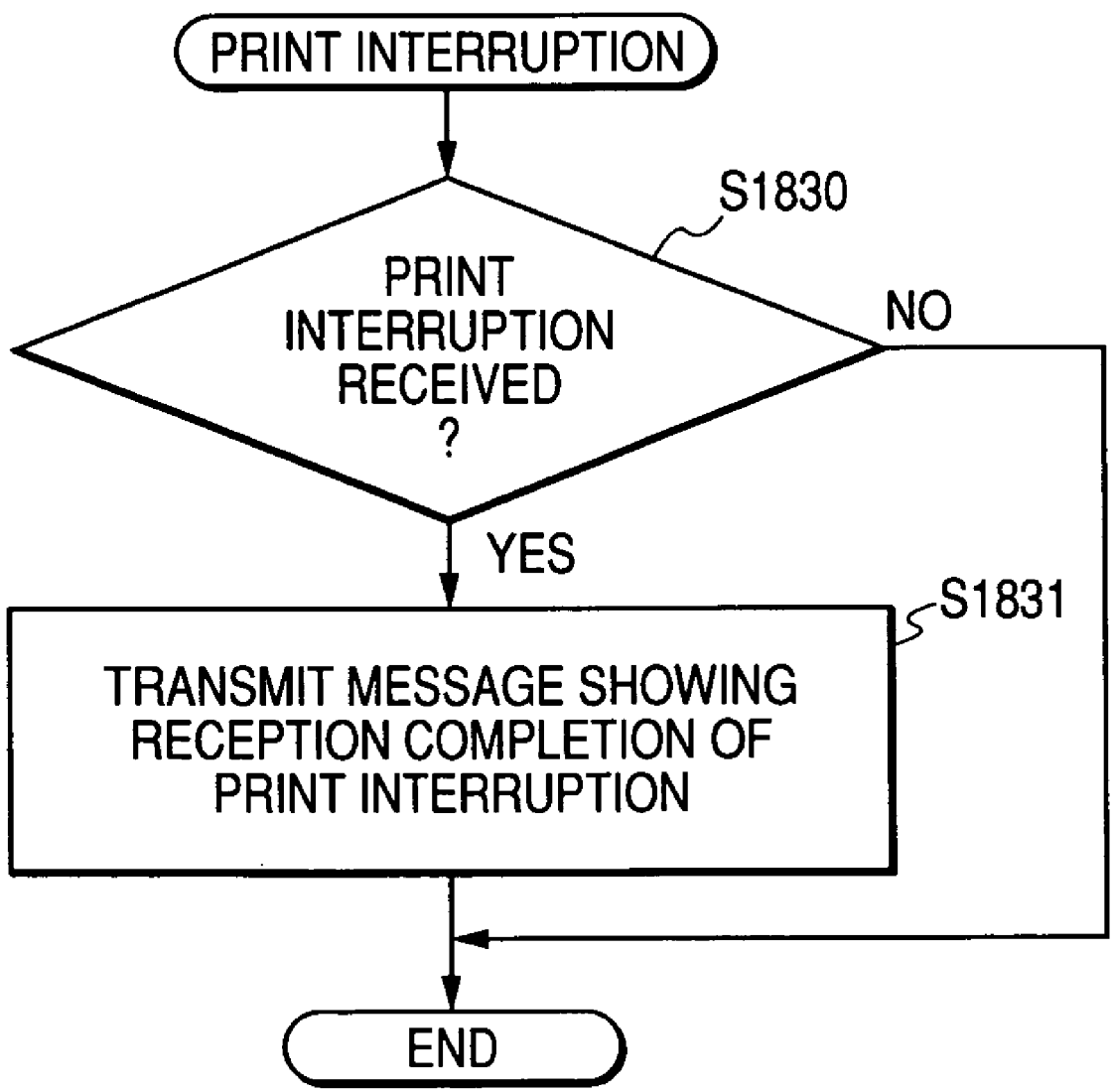
FIG. 21 is a flowchart showing an example of the seventh data processing procedure in the print control apparatuses and the print service server according to the invention.

FIGS. 19, 20, and 21 are flowcharts showing an example of the seventh data processing procedure in the print control apparatuses and the print server according to the invention and correspond to the detailed procedure for the print interrupting process of step S2317 shown in FIG. 17 (print interrupting process by the first print control apparatus 114 and the print service server 101 shown in FIG. 1).

S1801 to S1812, S1820 to S1824, and S1830 to S1831 denote processing steps. Processing steps S1801 to S1812 are realized by a method whereby the CPU 301 shown in FIG. 3 loads the control programs stored in the ROM 303, the hard disk 313, or the like into the RAM 302 and executes them.

Processing steps S1820 to S1824 and S1830 to S1831 are realized by a method whereby the CPU 201 of the print service server 101 loads the control programs stored in the ROM 203, HDD 213, or the like into the RAM 202 and executes them.

Figure 22:
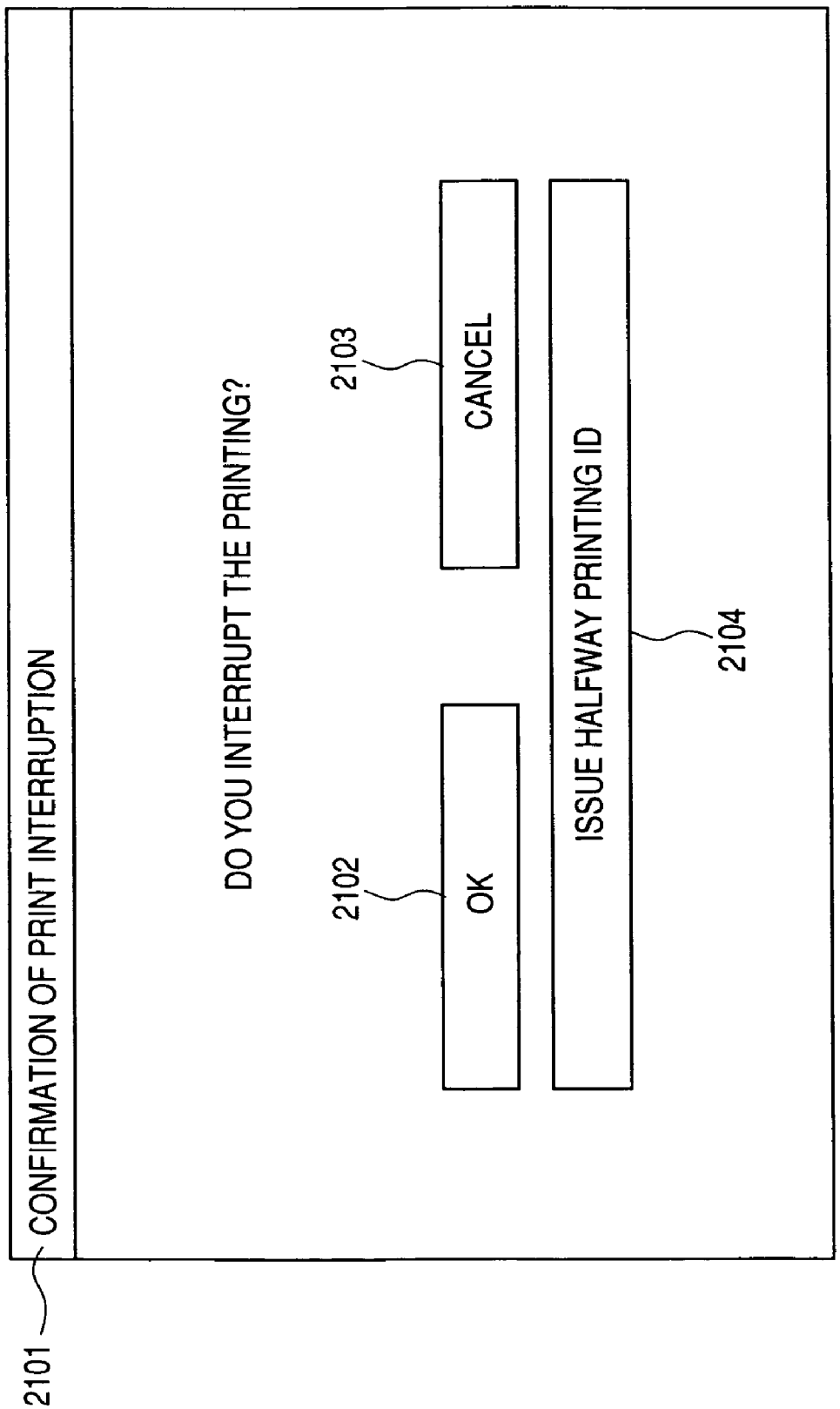
FIG. 22 is a diagram showing an example of a confirming display screen of a print interruption which is displayed on the display unit of the first print control apparatus shown in FIG. 1.

In the first print control apparatus 114, as shown in FIG. 19, first in step S1801, to inquire of the user whether or not the printing is interrupted, the print processing unit 117 requests the display unit 116 to display, for example, a print interruption instructing display screen 2101 shown in FIG. 22. The display unit 116 allows the CRT 309 to display the print interruption instructing display screen 2101. The processing routine advances to step S1802.

In step S1802, the discrimination about whether or not the user has instructed the print interruption or the discrimination about whether or not he has instructed the issuance of the halfway printing ID is made by the CPU 301 as follows on the print interruption instructing display screen 2101 (shown in FIG. 22) which has been displayed in step S1801 and will be explained hereinafter.

When the user presses an OK button 2102 in the print interruption instructing display screen 2101, it is determined that the print interruption has been instructed by the user, so that the process is finished.

If it is decided that a cancel button 2103 has been pressed, it is determined that the print interruption is not instructed by the user, and the printing is restarted. If a trouble such as absence of paper, absence of toner, or the like is not eliminated in this instance, the processing routine is returned to step S1214 shown in FIG. 6.

It is now assumed that a button 2104 to issue the halfway printing ID has been pressed in the print interruption instructing display screen 2101, and the processing routine advances to step S1803.

In step S1803, the print processing unit 117 requests the printing apparatus control unit 119 to stop the printing and obtain the present state information. The print processing unit 117 requests the printing apparatus control unit 119 to stop the printing. When the printing apparatus control unit 119 instructs the output unit 120 to stop the printing, the output unit 120 stops the printing.

When the output unit 120 stops the printing, the printing apparatus control unit 119 returns a message indicative of the stop of the printing to the print processing unit 117.

Subsequently, when the print processing unit 117 receives the message indicative of the stop of the printing from the printing apparatus control unit 119, the unit 117 requests the printing apparatus control unit 119 to obtain the state information. The printing apparatus control unit 119 discriminates the state of the output unit 120, obtains the number of copies which are at present being printed and the page number, and returns them to the print processing unit 117. The processing routine advances to step S1804.

In step S1804, the print processing unit 117 transmits the print interruption information to the communicating unit 113 in the print service server 101 through the communicating unit 115 and requests the print service server 101 to store the print interruption information.

The print interruption information which is transmitted from the print processing unit 117 to the communicating unit 113 is constructed by the printed matter information, print setting information, user information, and state information. The processing routine advances to the processes of the print service server side.

In step S1820 shown in FIG. 20, whether or not the communicating unit 113 of the print service server 101 has received the print interruption information transmitted from the print processing unit 117 of the first print control apparatus 114 is discriminated. If it is decided that the print interruption information is not received, the process is finished.

If it is decided in step S1820 that the communicating unit 113 has received the print interruption information transmitted from the print processing unit 117 of the first print control apparatus 114, the print interruption information is received and transmitted to the request processing unit 112 in step S1821. The processing routine advances to step S1822.

In step S1822, the print interruption information received by the request processing unit 112 in step S1821 is stored into the HDD 213 shown in FIG. 2. When the request processing unit 112 receives the print interruption information, the unit 112 transmits the printed matter information to the printed matter information managing unit 107, requests the unit 107 to store the printed matter information, transmits the print setting information to the print setting information managing unit 108, requests the unit 108 to store the print setting information, transmits the state information to the state information managing unit 110, and requests the unit 110 to store the state information.

The printed matter information managing unit 107 instructs the printed matter information storing unit 102 to store the printed matter information and transmits the printed matter information ID as a key upon storing to the request processing unit 112.

The print setting information managing unit 108 instructs the print setting information storing unit 103 to store the print setting information and transmits the print setting information ID as a key upon storing to the request processing unit 112.

Further, the state information managing unit 110 instructs the state information storing unit 105 to store the state information and transmits the state information ID as a key upon storing to the request processing unit 112.

The request processing unit 112 transmits the received printed matter information ID, print setting information ID, and state information ID and the user ID in the user information of the print interruption information to the print interruption information managing unit 111 and requests the unit 111 to store the print interruption information. The print interruption information managing unit 111 instructs the print interruption information storing unit 106 to store the printed matter information ID, print setting information ID, user ID, and state information ID. If the storage of the print interruption information is normally finished, step S1823 follows.

When the message showing that the print interruption information has normally been stored is received, in step S1823, an another ID for the halfway printing different from the printed matter ID of the print-interrupted matter is issued, and the processing routine advances to step S1824.

In step S1824, the request processing unit 112 transmits a message indicative of the completion of the storage of the print interruption information and the registered document ID which was newly issued to the print processing unit 117 via the communicating unit 115 through the communicating unit 113. The process of the print service server 101 side is finished.

After the print processing unit 117 transmitted the print interruption information to the print service server 101 via the communicating unit 115 through the communicating unit 113 in step S1804, the first print control apparatus 114 side waits for a response from the print service server 101 side. In step S1805, whether or not the message indicative of the completion of the storage of the print interruption information and the halfway printing ID which were transmitted from the request processing unit 112 of the print service server 101 have been received is discriminated. If it is determined that they are not received, the process is finished.

If it is determined in step S1805 that the message indicative of the completion of the storage of the print interruption information and the halfway printing ID which were transmitted from the request processing unit 112 of the print service server 101 have been received, in step S1806, the communicating unit 122 transmits the message indicative of the completion of the storage of the print interruption information to the print processing unit 117 through the Internet 128. The print processing unit 117 receives the message indicative of the completion of the storage of the print interruption information from the communicating unit 122.

In step S1807, a halfway printing ID confirming display screen 2201 received in step S1806 is displayed on the display unit 116.

The presence or absence of an E-mail notifying instruction or a returning instruction (return button 2204) is discriminated in step S1808'. If the returning instruction exists, the process is finished.

If the E-mail notification is instructed in step S1808, the E-mail notification is performed to a registration address in step S1809 and the process is finished.

The halfway printing ID confirming display screen 2201 which is displayed will be described hereinbelow with reference to FIG. 23.

In the halfway printing ID confirming display screen 2201, by displaying the halfway printing ID issued in step S1823 into a box 2203 and selecting the return button 2204 for interrupting the printing, the process is finished.

In the first print control apparatus 114, as shown in FIG. 19, first, in step S1801, to inquire of the user whether or not the printing is interrupted, the print processing unit 117 requests the display unit 116 to display, for example, the print interruption instructing display screen 2101 shown in FIG. 22. The display unit 116 allows the CRT 309 to display the print interruption instructing display screen 2101. The processing routine advances to step S1802.

In step S1802, whether or not the user has instructed the print interruption on the print interruption instructing display screen 2101 (shown in FIG. 22) which has been displayed in step S1801 and will be explained hereinafter is discriminated by the CPU 301 as follows.

When the user presses the OK button 2102 in the print interruption instructing display screen 2101, it is determined that the print interruption has been instructed by the user, and step S1810 follows.

In step S1810, the print service server 101 is notified that the print interruption has been instructed by the user.

In step S1830 shown in FIG. 21, if it is determined that the print interruption information (for example, the printed matter information/print setting information/user information/state information) transmitted from the print processing unit 117 of the first print control apparatus 114 has been received, a message indicative of the completion of the reception of the print interruption information is transmitted in step S1831, and the process is finished.

If the print interruption information cannot be received in step S1830, the process is finished.

If it is decided that the cancel button 2103 has been pressed, it is determined that the print interruption and the issuance of the halfway printing ID are not instructed by the user, and the process is finished.

The button 2104 to issue the halfway printing ID is not always displayed at the time of the print interrupting process.

In this instance, such a condition that one or more printed sheets have been outputted is necessary. If the print interruption occurred during the printing of the first copy or before the printing of the first copy is started, only "OK" 902 and "Cancel" 903 are displayed as shown in FIG. 12.

Figure 24:
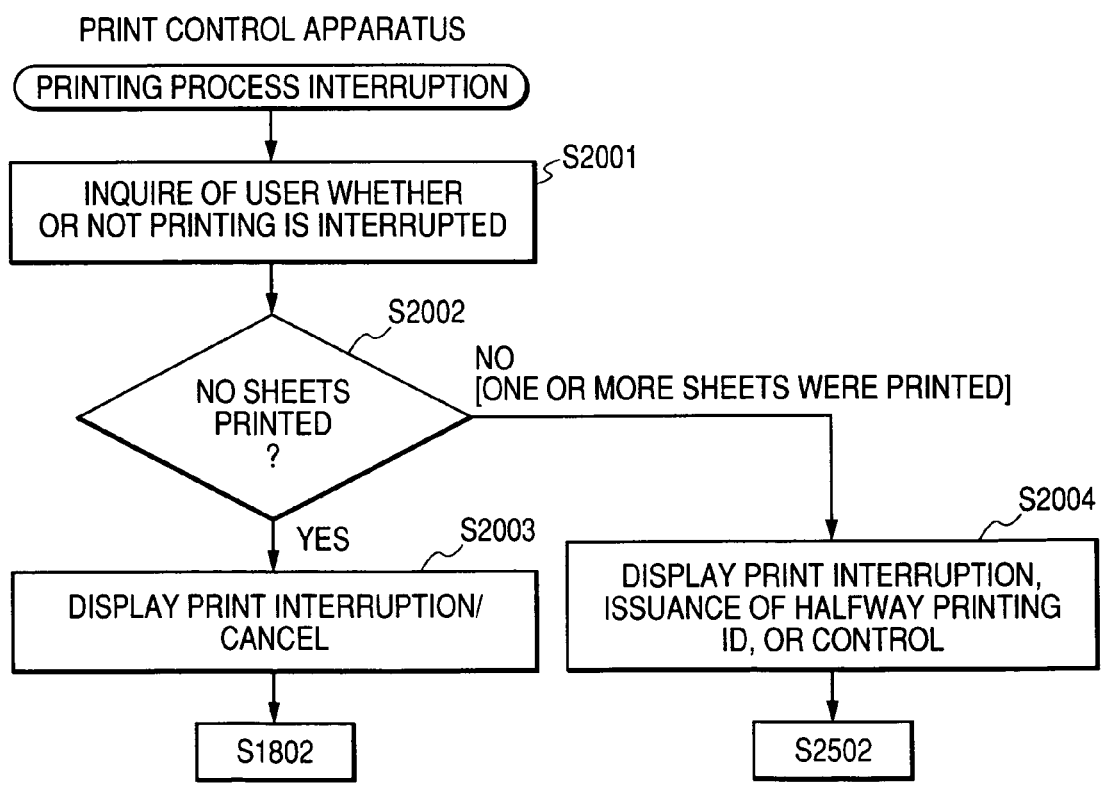
FIG. 24 is a flowchart showing an example of the eighth data processing procedure in the print control apparatuses and the print service server according to the invention.

FIG. 24 is a flowchart showing an example of the eighth data processing procedure in the print control apparatuses and according to the invention. S2001 to S2004 denote processing steps. Processing steps S2001 to S2004 are realized by a method whereby the CPU 301 shown in FIG. 3 loads the control programs stored in the ROM 303, the hard disk 313, or the like into the RAM 302 and executes them.

In FIG. 24, explanation will be made with respect to the case where the print control apparatus 114 or 121 switches the display screen which is inquired of the user at the number of copies in which the print interruption occurred.

In the print interrupting process, in step S2001, the apparatus inquires of the user whether or not the printing is interrupted, and the processing routine advances to step S2002.

In step S2002, the apparatus communicates with the printing apparatus control unit 119 through the print processing unit 117 and confirms until which page the printing process of the output unit 120 has been completed.

In step S2003, in the case where the print interrupting process is requested before the start of the printing of the first copy or before the completion of the printing of the first copy, there is no need to newly issue an ID in order to re-print. Therefore, the print interrupting button 902 and the cancel button 903 in FIG. 12 are displayed. After they are displayed, step S1802 follows.

If it is determined that one or more copies have been printed, if the printing of one or more copies has been completed, since there is a possibility that the halfway printing ID is issued in step S2004, the print interruption instructing display screen 2101 of FIG. 22 is displayed. After it is displayed, step S2502 follows.

The case where the print interruption occurred while the printing process is being executed by the halfway printing ID will now be described.

Figure 23:
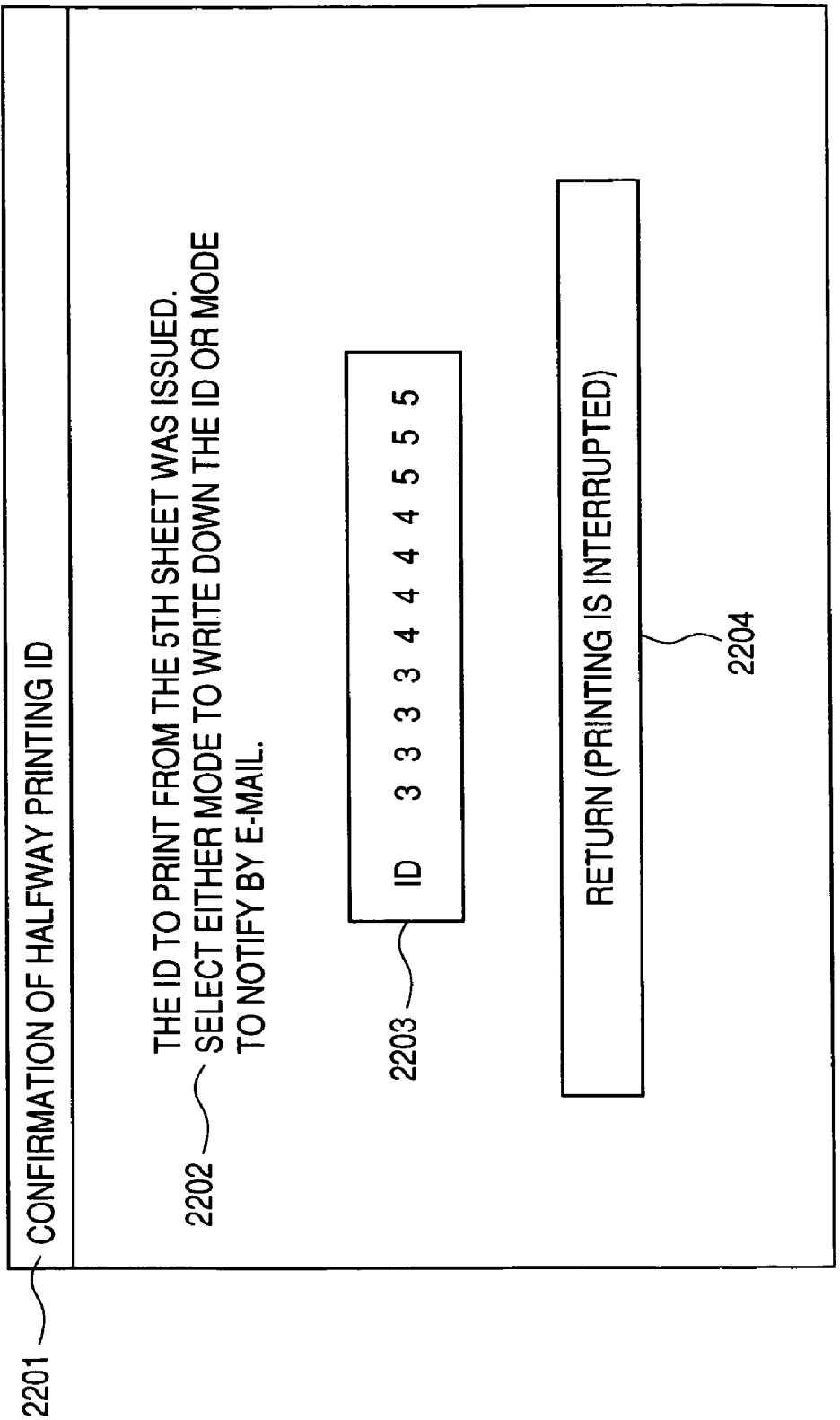
FIG. 23 is a diagram showing an example of a confirming display screen of a halfway printing ID which is displayed on the display unit of the first print control apparatus shown in FIG. 1.
Figure 25:
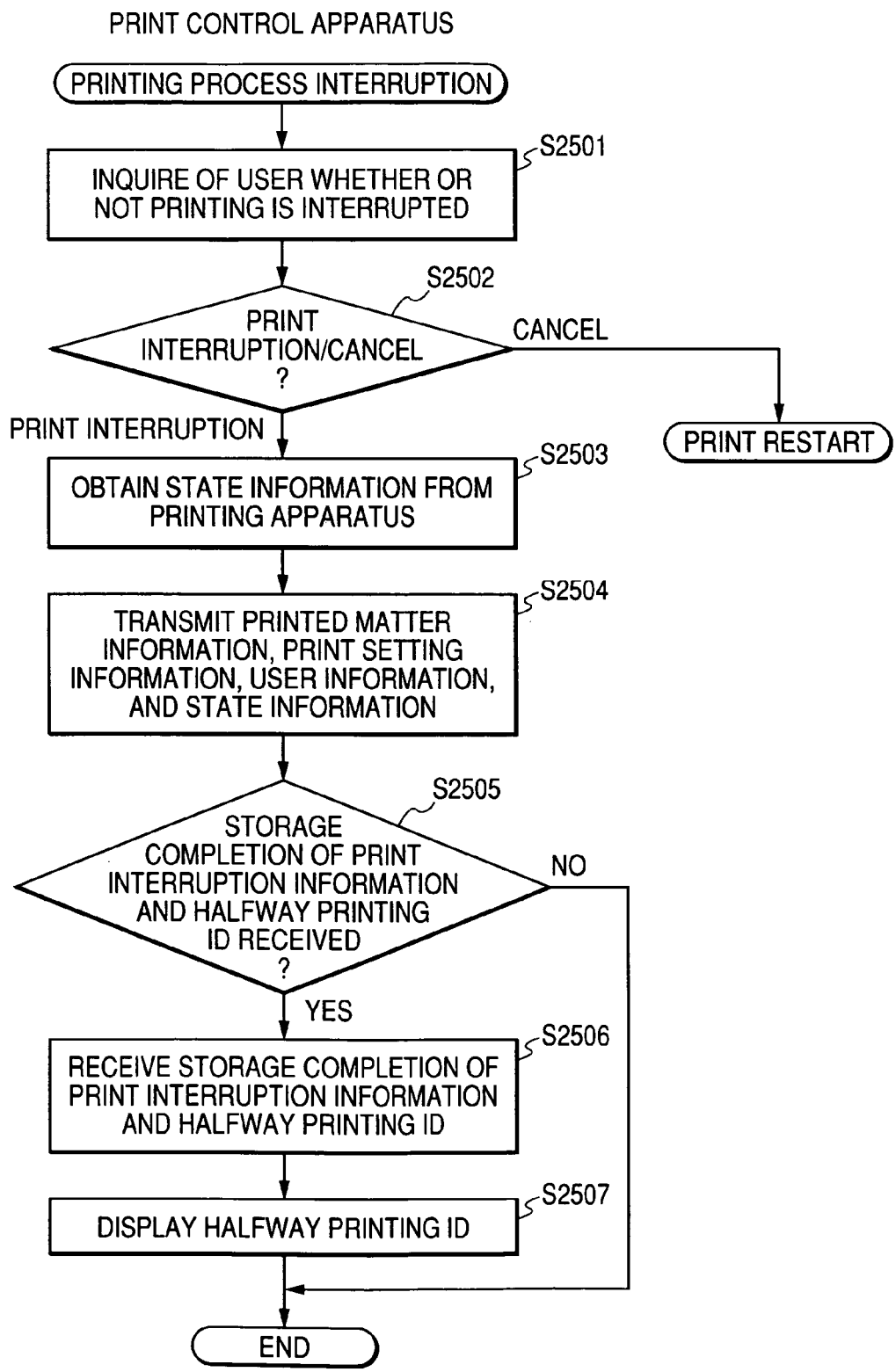
FIG. 25 is a flowchart showing an example of the ninth data processing procedure in the print control apparatuses and the print service server according to the invention.
Figure 26:
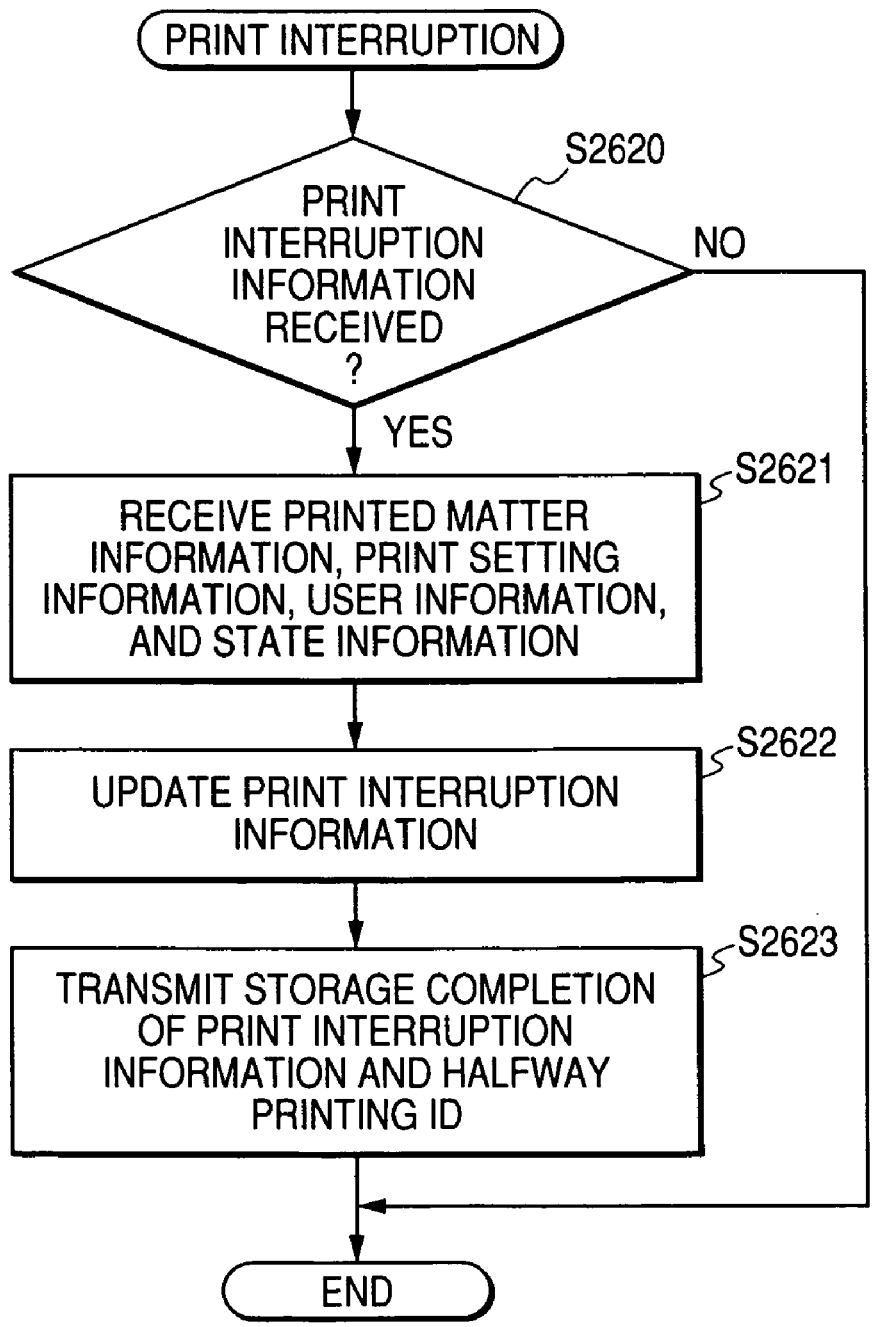
FIG. 26 is a flowchart showing an example of the ninth data processing procedure in the print control apparatuses and the print service server according to the invention.

FIGS. 25 and 26 are flowcharts showing an example of the ninth data processing procedure in the print control apparatuses and the print server according to the invention and correspond to a detailed procedure for the print interruption processing (print interrupting process which is executed by the first print control apparatus 114 and the print service server 101 shown in FIG. 1) routine of step S2328 shown in FIG. 23.

S2501 to S2507 and S2620 to S2623 denote processing steps. Processing steps S2501 to S2507 are realized by a method whereby the CPU 301 shown in FIG. 3 loads the control programs stored in the ROM 303, the hard disk 313, or the like into the RAM 302 and executes them. Processing steps S2620 to S2623 are realized by a method whereby the CPU 201 of the print service server 101 loads the control programs stored in the ROM 203, HDD 213, or the like into the RAM 202 and executes them.

In the first print control apparatus 114, as shown in FIG. 25, first, in step S2501, to inquire of the user whether or not the printing is interrupted, the print processing unit 117 requests the display unit 116 to display, for example, the print interruption instructing display screen 901 shown in FIG. 12. The display unit 116 allows the CRT 309 to display the print interruption instructing display screen 901. The processing routine advances to step S2502.

In step S2502, the discrimination about whether or not the user has instructed the print interruption or the cancellation on the print interruption instructing display screen 901 which has been displayed in step S2501 and will be explained hereinafter is made by the CPU 301 as follows.

When the user presses the OK button 902 in the print interruption instructing display screen 901, it is determined that the print interruption has been instructed by the user, so that step S2503 follows.

If it is decided that the cancel button 903 has been pressed, it is determined that the print interruption is not instructed by the user, and the printing is restarted. At this time, if a trouble such as absence of paper, absence of toner, or the like is not eliminated, the processing routine is returned to step S2326 shown in FIG. 17.

It is now assumed that the print interruption button 902 has been pressed in the print interruption instructing display screen 901, and the processing routine advances to step S2503.

In step S2503, the print processing unit 117 requests the printing apparatus control unit 119 to stop the printing and obtain the present state information. The print processing unit 117 requests the printing apparatus control unit 119 to stop the printing. When the printing apparatus control unit 119 instructs the output unit 120 to stop the printing, the output unit 120 stops the printing.

When the output unit 120 stops the printing, the printing apparatus control unit 119 returns the message indicative of the stop of the printing to the print processing unit 117.

Subsequently, when the print processing unit 117 receives the message indicative of the stop of the printing from the printing apparatus control unit 119, the unit 117 requests the printing apparatus control unit 119 to obtain the state information. The printing apparatus control unit 119 discriminates the state of the output unit 120, obtains the number of copies which are at present being printed and the page number, and returns them to the print processing unit 117. The processing routine advances to step S2504.

In step S2504, the print processing unit 117 transmits the print interruption information to the print service server 101 through the communicating unit 113 via the communicating unit 115 and requests the server 101 to store the print interruption information.

The print interruption information which is transmitted from the print processing unit 117 to the communicating unit 113 is constructed by the printed matter information, print setting information, user information, and state information. The processing routine advances to the processes of the print service server side.

In step S2620, whether or not the communicating unit 113 of the print service server 101 has received the print interruption information (including, for example, the printed matter information, print setting information, user information, and state information) transmitted from the print processing unit 117 of the first print control apparatus 114 is discriminated. If it is decided that the print interruption information is not received, the process is finished.

If it is decided in step S2620 that the communicating unit 113 has received the print interruption information transmitted from the print processing unit 117 of the first print control apparatus 114, the print interruption information is received and transmitted to the request processing unit 112 in step S2621. The processing routine advances to step S2622.

In step S2622, the print interruption information received by the request processing unit 112 in step S2621 is stored into the HDD 213 shown in FIG. 2. When the request processing unit 112 receives the print interruption information, the unit 112 transmits the printed matter information to the printed matter information managing unit 107, requests the unit 107 to store the printed matter information, transmits the print setting information to the print setting information managing unit 108, requests the unit 108 to store the print setting information, transmits the state information to the state information managing unit 110, and requests the unit 110 to store the state information.

The printed matter information managing unit 107 instructs the printed matter information storing unit 102 to store the printed matter information and transmits the printed matter information ID as a key upon storing to the request processing unit 112.

The print setting information managing unit 108 instructs the print setting information storing unit 103 to store the print setting information and transmits the print setting information ID as a key upon storing to the request processing unit 112.

Further, the state information managing unit 110 instructs the state information storing unit 105 to store the state information and transmits the state information ID as a key upon storing to the request processing unit 112.

The request processing unit 112 transmits the received printed matter information ID, print setting information ID, and state information ID and the user ID in the user information of the print interruption information to the print interruption information managing unit 111 and requests the unit 111 to store the print interruption information. The print interruption information managing unit 111 instructs the print interruption information storing unit 106 to store the printed matter information ID, print setting information ID, user ID, and state information ID. If the storage of the print interruption information is normally finished, step S2623 follows.

When the message showing that the print interruption information has normally been updated (stored) is received, in step S2623, the request processing unit 112 transmits the message indicative of the completion of the storage of the print interruption information and the registered document ID interrupted at present to the print processing unit 117 via the communicating unit 115 through the communicating unit 113. The process of the print service server 101 side is finished.

After the print processing unit 117 transmitted the print interruption information to the print service server 101 via the communicating unit 115 through the communicating unit 113 in step S2504, the first print control apparatus 114 side waits for a response from the print service server 101 side. In step S2505, whether or not the message indicative of the completion of the storage of the print interruption information and the halfway printing ID which were transmitted from the request processing unit 112 of the print service server 101 have been received is discriminated. If it is determined that they are not received, the process is finished.

If it is determined in step S2505 that the message indicative of the completion of the storage of the print interruption information and the halfway printing ID which were transmitted from the request processing unit 112 of the print service server 101 have been received, in step S2506, the communicating unit 122 transmits the message indicative of the completion of the storage of the print interruption information to the print processing unit 117 through the Internet 128. The print processing unit 117 receives the message indicative of the completion of the storage of the print interruption information from the communicating unit 122.

In step S2507, the halfway printing ID confirming display screen 2201 received in step S2506 is displayed on the display unit 116.

FIG. 27 is a diagram showing an example of a confirming display screen of updating of the halfway printing ID information which is displayed on the display unit 116 of the first print control apparatus 114 shown in FIG. 1.

In a confirming display screen 2701 (FIG. 27) of updating of the halfway printing ID information which is displayed in step S2507, the information updated by the print service server 101 is displayed, the user is notified of the updated contents, and the process is finished.

Fourth Embodiment

A construction of data processing programs which can be read by the print system including the print control apparatuses and the print service server according to the invention will be described hereinbelow with reference to a memory map shown in FIG. 28.

FIG. 28 is a diagram for explaining the memory map of a storing medium for storing the various data processing programs which can be read by the print system including the print control apparatuses and the print service server according to the invention.

Although not shown in particular, information for managing a program group which is stored in the storing medium, for example, version information, implementors, and the like are also stored. There is also a case where information which depends on an OS or the like on the program reading side, for example, icons and the like for identifying and display the programs are stored.

Further, data which depends on various programs is also managed in the directory. There is a case where a program to install the various programs into a computer is stored. In the case where a program to install has been compressed, there is also a case where a program for decompressing the compressed program and the like are stored.

The functions shown in FIGS. 6 to 10, 15, and 16 in the embodiments can be executed by a host computer by a program which is installed from the outside. In such a case, the invention is applied to the case where an information group including the programs is supplied to an output apparatus by a storing medium such as CD-ROM, flash memory, FD, or the like or from an external storing medium through a network.

Naturally, the objects of the invention are accomplished by a method whereby a storing medium in which program codes of software to realize the foregoing embodiments have been recorded as mentioned above is supplied to a system or an apparatus and a computer (or a CPU or an MPU) of the system or apparatus reads out and executes the program codes stored in the storing medium.

In this case, the program codes themselves read out of the storing medium realize the novel functions of the invention and the storing medium in which the program codes have been stored constructs the invention.

Therefore, the invention is not limited to a form of the program but it is possible to use any of a program which is executed by object codes and an interpreter, script data which is supplied to the OS, and the like so long as they have the functions of the program.

For example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used as a storing medium for supplying the program.

In this case, the program codes themselves read out of the storing medium realize the functions of the embodiments as mentioned above. The storing medium in which the program codes have been stored constructs the invention.

As another program supplying method, the program can be supplied by a method whereby a client computer is connected to Homepage of the Internet by using a browser of the client computer and the computer program itself of the invention is downloaded from the Homepage or a file in which the computer program has been compressed and includes an automatic installing function is downloaded onto a recording medium such as a hard disk or the like. The program of the invention can be also realized by a method whereby the program codes constructing the program of the invention are divided into a plurality of files and each file is downloaded from different Homepage. In other words, a WWW server, an ftp server, and the like for downloading the program files to realize the functional processes of the invention by the computer onto a plurality of users are also incorporated in claims of the invention.

The program of the invention can be also realized by a method whereby the program of the invention is encrypted and stored into a storing medium such as a CD-ROM or the like and distributed to the users, the users who clear predetermined conditions are allowed to download key information for encrypting the encryption from Homepage through the Internet, and the encrypted program is decrypted by using the key information and installed into the computer.

Naturally, the invention incorporates not only the case where the computer executes the read-out program, so that the functions of the embodiments as mentioned above are realized but also the case where an OS (Operating System) or the like which is operating on the computer executes a part or all of the actual processes on the basis of instructions of the program codes, and the functions of the embodiments as mentioned above are realized by those processes.

Further, naturally, the invention also incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of the actual processes on the basis of instructions of the program codes, and the functions of the embodiments as mentioned above are realized by those processes.

The invention is not limited to the foregoing embodiments but many modifications (including an organic combination of the embodiments) based on the spirit of the invention are possible and they are not excluded from the scope of the invention.

Although the invention has been described above with respect to the embodiments, it will be understood by those skilled in the art that the spirit and scope of the invention are not limited to the specific explanation in the specification of the invention.

The invention is not limited to the foregoing embodiments but many variations and modifications are possible without departing from the essence of the invention. Such examples 1 to 26 will be described hereinbelow.

Example 1

A printing method in a system which receives a designated document from a server and prints the received document by a printer, comprising: an input step (step S1215 shown in FIG. 6) of inputting an interrupting instruction of the printing; a storing step (steps S611 to S614 shown in FIG. 8) of storing information indicative of an interrupting position of the printing of the designated document on the basis of the print interrupting instruction inputted in the input step; and an executing step (steps S701 to S712 shown in FIGS. 9A and 9B) of restarting the printing of the designated document on the basis of the information indicative of the print interrupting position of the designated document stored in the storing step.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 2

The printing method according to Example 1, wherein in the executing step, if the information indicative of the interrupting position of the printing of the designated document has been stored, the printing of the designated document is restarted on the basis of the information indicative of the interrupting position of the printing of the designated document stored in the storing step.

Thus, the presence or absence of the registration of the interruption information is automatically searched and confirmed and, if the interruption information has been registered, the printing can be restarted from the state upon interruption by the simple operating instruction.

Example 3

The printing method according to Example 1, wherein in the executing step, if the information indicative of the interrupting position of the printing of the designated document has been stored, the printing of the designated document is restarted on the basis of the information indicative of the interrupting position of the printing of the designated document stored in the storing step, and if the information indicative of the interrupting position of the printing of the designated document is not stored, the printing of the designated document is executed from the beginning.

Thus, the presence or absence of the registration of the interruption information is automatically searched and confirmed and, if the interruption information has been registered, the printing can be restarted from the state upon interruption or from the beginning of the document by the simple operating instruction.

Example 4

The printing method according to Example 1, wherein a plurality of information indicative of the interrupting position of the printing can exist for one document, and the method further has a step of selecting the information indicative of the interrupting position of the printing from the plurality of information indicative of the interrupting position of the printing.

Thus, the presence or absence of the registration of the interruption information is automatically searched and confirmed and, if the interruption information has been registered, the printing can be restarted from the state upon interruption by the simple operating instruction.

Example 5

The printing method according to Example 1, wherein the information indicative of the interrupting position includes the page number and/or the number of print copies.

Thus, the presence or absence of the registration of the page number and/or the number of print copies is automatically searched and confirmed as interruption information and if the interruption information has been registered, the printing can be restarted from the selected state upon interruption by the simple operating instruction.

Example 6

A print system which receives a designated document from a server and prints the received document by a printer, comprising: input means (the operating unit and the like of the first print control apparatus 114 shown in FIG. 1) for inputting an interrupting instruction of the printing; storing means (the print interruption information storing unit 106 of the print service server 101 shown in FIG. 1) for storing information indicative of an interrupting position of the printing of the designated document on the basis of the print interruption instruction inputted by the input means; and printing means (the second print control apparatus 121 shown in FIG. 1 allows the document to be printed by the second printing apparatus 125) for printing the designated document from the middle on the basis of the information indicative of the print interrupting position of the designated document stored by the storing means.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 7

The print system according to Example 6, wherein if the information indicative of the interrupting position of the printing of the designated document has been stored, the printing means prints the designated document from the middle on the basis of the information indicative of the interrupting position of the printing of the designated document stored by the storing means.

Thus, the presence or absence of the registration of the interruption information is automatically searched and confirmed and, if the interruption information has been registered, the printing can be restarted from the state upon interruption by the simple operating instruction.

Example 8

The print system according to Example 6, wherein if the information indicative of the interrupting position of the printing of the designated document has been stored, the printing means prints the designated document from the middle on the basis of the information indicative of the interrupting position of the printing of the designated document stored by the storing means, and if the information indicative of the interrupting position of the printing of the designated document is not stored, the printing means prints the designated document from the beginning.

Thus, the presence or absence of the registration of the interruption information is automatically searched and confirmed and, if the interruption information has been registered, the printing can be restarted from the state upon interruption or from the beginning of the document by the simple operating instruction.

Example 9

The print system according to Example 6, wherein a plurality of information indicative of the interrupting position of the printing can exist for one document, and the system further has means for selecting the information indicative of the interrupting position of the printing from the plurality of information indicative of the interrupting position of the printing.

Thus, the presence or absence of the registration of the interruption information is automatically searched and confirmed and, if the interruption information has been registered, the printing can be restarted from the state upon interruption by the simple operating instruction.

Example 10

The print system according to Example 6, wherein the information indicative of the interrupting position includes the page number and/or the number of print copies.

Thus, the presence or absence of the registration of the page number and/or the number of print copies is automatically searched and confirmed as interruption information and if the interruption information has been registered, the printing can be restarted from the selected state upon interruption by the simple operating instruction.

Example 11

A printing method in a system which receives a designated document from a server and prints the received document by a printer, comprising: an input step (step S1215 shown in FIG. 6) of inputting an interrupting instruction of the printing; a transmitting step (steps S601 to S606 shown in FIG. 8) of transmitting information indicative of an interrupting position of the printing of the designated document to the server on the basis of the print interrupting instruction inputted in the input step; and an executing step (steps S701 to S712 shown in FIG. 9) of executing the printing process of the designated document on the basis of the information indicative of the print interrupting position of the designated document transmitted in the transmitting step.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 12

A print control apparatus which receives a designated document from a server and prints the received document, comprising: input means (the operating unit of the first print control apparatus 114 shown in FIG. 1) for inputting an interrupting instruction of the printing; transmitting means (the print processing unit 117 and the communicating unit 115 of the first print control apparatus 114 shown in FIG. 1) for transmitting information indicative of an interrupting position of the printing of the designated document to the server on the basis of the print interrupting instruction inputted by the input means; and executing means (the print processing unit 124 and the communicating unit 122 of the second print control apparatus 121 shown in FIG. 1) for executing the printing process of the designated document on the basis of the information indicative of the print interrupting position of the designated document transmitted by the transmitting means.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 13

A program which can be read by a computer that receives a designated document from a server and prints the received document, comprising: an input step (step S1215 shown in FIG. 6) of inputting an interrupting instruction of the printing; a transmitting step (steps S601 to S606 shown in FIG. 8) of transmitting information indicative of an interrupting position of the printing of the designated document to the server on the basis of the print interrupting instruction inputted in the input step; and an executing step (steps S701 to S712 shown in FIG. 9) of executing the printing of the designated document on the basis of the information indicative of the print interrupting position of the designated document transmitted in the transmitting step.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 14

A print system in which one of a plurality of print control apparatuses receives a designated document stored in storing means from a server and the received document is printed by a printer which is controlled by such one print control apparatus, wherein the server (the print service server 101 shown in FIG. 1) has document managing means (the request processing unit 112, print interruption information managing unit 111, printed matter information managing unit 107, printed matter information storing unit 102, print setting information storing unit 103, user information storing unit 104, state information storing unit 105, print setting information managing unit 108, user information managing unit 109, and state information managing unit 110 shown in FIG. 1) for receiving an interrupting instruction of the document, registering interruption information of the interrupted document into the storing means (the print interruption information storing unit 106 shown in FIG. 1), receiving a restart requesting instruction of the interrupted document, reading out the print-restarting document from the storing means on the basis of the interruption information, and transferring it to the print control apparatus of a restart requesting source side, and one (the first print control apparatus 114 or the second print control apparatus 121 shown in FIG. 1) of the plurality of print control apparatuses has: input means (for example, inputting through a UI display screen which is displayed in an operating unit provided for the first print control apparatus 114 shown in FIG. 1) for inputting the print interrupting instruction; transfer means (the communicating unit 115 shown in FIG. 1) for transferring interruption information showing an interrupting position of the printing in the designated document to the server on the basis of the print interrupting instruction inputted by the input means; restart requesting means (inputting through the UI display screen displayed in an operating unit provided for the second print control apparatus 121 shown in FIG. 1) for inputting a restarting request for the interruption-instructed document; obtaining means (the communicating unit 115 and the print processing unit 124 shown in FIG. 1) for obtaining print information, from the document managing means, for printing the interrupted document from the middle on the basis of the interruption information showing the print interrupting position of the document whose print-restart has been requested by the restart requesting means and which has been stored by the storing means; and print control means (the print processing unit 124) for allowing the printer (the second printing apparatus 125 shown in FIG. 1) to print the print information obtained by the obtaining means.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 15

A printing method in a system which receives a designated document from a server and prints the received document by a printer, comprising: an input step (step S2327 shown in FIG. 17) of inputting an interrupting instruction of the printing; a storing step (step S1831 shown in FIG. 21) of storing information indicative of an interrupting position of the printing of the designated document on the basis of the print interrupting instruction inputted in the input step; a registering step of registering the designated document stored in the storing step as a halfway print document; and an executing step of, when the document registered in the registering step is printed, restarting the printing of the designated document on the basis of the information indicative of the interrupting position.

Thus, in the print service system in which the server which offers the print service and the print base are connected by the Internet, when the user prints the data at the print base, even if a fault of the print base (fault in the printer which is controlled by the print control apparatus) occurred or the printing was interrupted by the user's cancellation or even if the print base to restart the printing is not directly determined by the user at the time of the print interruption, the user does not re-input the printed matter information, print setting information, and the like at an arbitrary print base such as same print base or another print base, but the user simply inputs the user information and whether or not the interruption information has been registered is automatically searched and confirmed, and if the interruption information has been registered, the user can restart the printing from the state upon interruption by a simple operating instruction.

Example 16

The printing method according to Example 15, wherein the information indicative of the interrupting position includes the page number and/or the number of print copies and a page layout.

Thus, the presence or absence of the registration of the page number and/or the number of print copies and the page layout is automatically searched and confirmed as interruption information and if the interruption information has been registered, the printing can be restarted from the selected state upon interruption by the simple operating instruction.

Example 17

The printing method according to Example 15, wherein when the halfway print document is printed, if the print interruption occurs, the interruption information is updated.

Thus, even if the interruption further occurred, the print document which was interrupted latest can be normally printed.

Example 18

The printing method according to Example 15, further comprising a display step of displaying the information registered in the registering step.

Thus, a list of the halfway print documents stored due to the interruption can be confirmed.

Example 19

The printing method according to Example 15, wherein the print interruption information depends on a print page upon printing.

Thus, the state information at the time of the print interruption, for example, the number of print interruption copies, the print interruption page number, the print interruption time/date, and the like are stored and only the interrupted pages can be printed on the basis of the page upon interruption.

Example 20

The printing method according to Example 15, further comprising a step of deleting the halfway print registration information when the printing of the halfway print document is completed.

Thus, such a situation that the storing means for storing is occupied with the interruption documents can be automatically eliminated.

Example 21

A print system which receives a designated document from a server and prints the received document by a printer, comprising: instructing means for receiving the designated document from the server and instructing print interruption when the received document is being printed; and means for allowing the document to be printed from the middle of the document whose print interruption has been instructed by the instructing means.

Example 22

The print system according to Example 21, wherein when information showing that the document has been printed to the middle exists in the server, the allowing means allows the document to be printed from the middle of the document whose print interruption has been instructed by the instructing means.

Example 23

The print system according to Example 21, wherein on the basis of identification information showing that the document is printed from the middle, the allowing means allows the document to be printed from the middle of the document whose print interruption has been instructed by the instructing means.

Example 24

A printing method in a system which receives a designated document from a server and prints the received document by a printer, comprising: an instructing step of receiving the designated document from the server and instructing print interruption when the received document is being printed; and a step of allowing the document to be printed from the middle of the document whose print interruption has been instructed in the instructing step.

Example 25

The printing method according to Example 24, wherein when information showing that the document has been printed to the middle exists in the server, in the allowing step, the document is allowed to be printed from the middle of the document whose print interruption has been instructed in the instructing step.

Example 26

The printing method according to Example 24, wherein in the allowing step, on the basis of identification information showing that the document is printed from the middle, the document is allowed to be printed from the middle of the document whose print interruption has been instructed in the instructing step.

As described above, according to the embodiments of the invention, in a print service system in which the print service server and a plurality of print bases are connected by the Internet, when the user prints the data at the print base, even if a fault of the print base occurred or the printing was interrupted by the user's cancellation or even if the print base to restart the printing is not determined at the time of the print interruption, by using the halfway printing ID issued at the time of the print interruption at an arbitrary print base such as same print base, another print base, or the like, the user does not re-input the printed matter information, print setting information, and the like or does not execute such operations that he detaches by himself an external storing apparatus or the like attached to the print control apparatus or the like, conveys the detached apparatus to another print control apparatus, and attaches it thereto, and the like, but the user can restart the printing from the state upon interruption by the simple operating instruction.

Even when the interrupting processes overlap, since the interruption information is updated, the interrupted print information can be normally print-outputted in the proper quantity in accordance with the state upon interruption.

Therefore, since the operability in the restarting operation is improved and the printing means is also left from the beginning, there are obtained such effects that a print processing environment which can avoid the uselessness of print resources at the time of restarting and has excellent use convenience can be freely constructed, and the like.

This application claims priority from Japanese Patent Application Nos. 2004-252334 filed on Aug. 31, 2004 and 2005-156884 filed on May 30, 2005, which are hereby incorporated by reference herein.

What is claimed is:

1. A print control apparatus for communication with a server that stores a printed matter information ID, print data and status information indicating a print interrupting position in correspondence to each other, the print control apparatus comprising:
   a transmission unit constructed to transmit a user ID and a password to a server;
   a reception unit constructed to receive a list of printed matter information, if the user ID and the password transmitted by the transmission unit to the server are correct;
   an instruction unit constructed to, if the user issues a halfway printing ID based on the list of printed matter information received by the reception unit, transmit the halfway printing ID to the server, receive print data corresponding to the transmitted halfway printing ID from the server, and instruct printing of the received print data, wherein, if the user does not issue the halfway printing ID, the instruction unit transmits printed matter information ID to the server, receives print data corresponding to the transmitted printed matter information ID from the server, and instructs printing of the received print data; and
   a display unit constructed to, if an interruption instruction is given after the instruction unit instructs the printing, transmit print interruption information including a printed matter information ID and status information to the server, receive a halfway printing ID issued based on the transmitted print interruption information from the server, the halfway printing ID being different from the printed matter information ID included in the print interruption information, and display a screen for confirming the received halfway printing ID,
   wherein in response to a print-completion notification received from the print control apparatus, the server determines whether the printed matter information ID for the print-completion notification corresponds to the halfway printing, and deletes the halfway printing ID if the printed matter information ID corresponds to the halfway printing, and does not delete the printed matter information ID if the printed matter information ID does not correspond to the halfway printing.

2. The print control apparatus according to claim 1, wherein the server updates the print interruption information and transmits the halfway printing ID to the print control apparatus, whenever the server receives the print interruption information from the print control apparatus, and the display unit displays the screen based on the received halfway printing ID to indicate a portion of the print data from which printing is started.

3. The print control apparatus according to claim 1, wherein the halfway printing ID includes information on a number of a copy and a number of a page at which print interruption occurs, and wherein the display unit displays a screen to distinguishably indicate that printing is to re-start from which page of which copy.

4. A print control method carried out in a print control apparatus for communication with a server that stores a printed matter information ID, print data and status information indicating a print interrupting position in correspondence to each other, the print control method comprising:
   a transmission step of transmitting a user ID and a password to a server;
   a reception step of receiving a list of printed matter information, if the user ID and the password transmitted by the transmission step to the server are correct;
   an instruction step of, if the user issues a halfway printing ID based on the list of printed matter information received by the reception step, transmitting the halfway printing ID to the server, receiving print data corresponding to the transmitted halfway printing ID from the server, and instructing printing of the received print data, wherein, if the user does not issue the halfway printing ID, the instruction step transmits printed matter information ID to the server, receives print data corresponding to the transmitted printed matter information ID from the server, and instructs printing of the received print data; and
   a display step of, if an interruption instruction is given after the instruction step instructs the printing, transmitting print interruption information including a printed matter information ID and status information to the server, receiving a halfway printing ID issued based on the transmitted print interruption information from the server, the halfway printing ID being different from the printed matter information ID included in the print interruption information, and displaying a screen for confirming the received halfway printing ID,
   wherein in response to a print-completion notification received from the print control apparatus, the server determines whether the printed matter information ID for the print-completion notification corresponds to the halfway printing, and deletes the halfway printing ID if the printed matter information ID corresponds to the halfway printing, and does not delete the printed matter information ID if the printed matter information ID does not correspond to the halfway printing.

5. A print control method according to claim 4, wherein the server updates the print interruption information and transmits the halfway printing ID to the print control apparatus, whenever the server receives the print interruption information from the print control apparatus, and the display step displays the screen based on the received halfway printing ID to indicate a portion of the print data from which printing is started.

6. The print control method according to claim 4, wherein the halfway printing ID includes information on a number of a copy and a number of a page at which print interruption occurs, and wherein the display unit displays a screen to distinguishably indicate that printing is to re-start from which page of which copy.

7. A non-transitory computer-readable storage medium that stores a computer program for causing a computer to execute a print control method carried out in a print control apparatus for communication with a server that stores a printed matter information ID, print data and status information indicating a print interrupting position in correspondence to each other, the print control apparatus, the method comprising:
   a transmission step of transmitting a user ID and a password to a server;
   a reception step of receiving a list of printed matter information, if the user ID and the password transmitted by the transmission step to the server are correct;
   an instruction step of, if the user issues a halfway printing ID based on the list of printed matter information received by the reception step, transmitting the halfway printing ID to the server, receiving print data corresponding to the transmitted halfway printing ID from the server, and instructing printing of the received print data, wherein, if the user does not issue the halfway printing ID, the instruction step transmits printed matter information ID to the server, receives print data corresponding to the transmitted printed matter information ID from the server, and instructs printing of the received print data; and
   a display step of, if an interruption instruction is given after the instruction step instructs the printing, transmitting print interruption information including a printed matter information ID and status information to the server, receiving a halfway printing ID issued based on the transmitted print interruption information from the server, the halfway printing ID being different from the printed matter information ID included in the print interruption information, and displaying a screen for confirming the received halfway printing ID,
   wherein in response to a print-completion notification received from the print control apparatus, the server determines whether the printed matter information ID for the print-completion notification corresponds to the halfway printing, and deletes the halfway printing ID if the printed matter information ID corresponds to the halfway printing, and does not delete the printed matter information ID if the printed matter information ID does not correspond to the halfway printing.

8. A non-transitory computer-readable storage medium according to claim 7, wherein the server updates the print interruption information and transmits the halfway printing ID to the print control apparatus, whenever the server receives the print interruption information from the print control apparatus, and the display step displays the screen based on the received halfway printing ID to indicate a portion of the print data from which printing is started.

9. The storage medium according to claim 7, wherein the halfway printing ID includes information on a number of a copy and a number of a page at which print interruption occurs, and wherein the display unit displays a screen to distinguishably indicate that printing is to re-start from which page of which copy.

* * * * *